(12) United States Patent
Noguchi

(10) Patent No.: US 9,292,229 B2
(45) Date of Patent: Mar. 22, 2016

(54) INFORMATION PROCESSING SYSTEM, AND CONTROL METHOD

(71) Applicant: FUJITSU LIMITED, Kawasaki-shi, Kanagawa (JP)

(72) Inventor: Yasuo Noguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 72 days.

(21) Appl. No.: 14/168,276

(22) Filed: Jan. 30, 2014

(65) Prior Publication Data

US 2014/0281220 A1    Sep. 18, 2014

(30) Foreign Application Priority Data

Mar. 18, 2013 (JP) ................................. 2013-054936

(51) Int. Cl.
| | | |
|---|---|---|
| *G06F 3/00* | (2006.01) | |
| *G06F 5/00* | (2006.01) | |
| *G06F 13/36* | (2006.01) | |
| *G06F 3/06* | (2006.01) | |
| *G06F 1/32* | (2006.01) | |
| *G06F 11/30* | (2006.01) | |
| *G06F 12/02* | (2006.01) | |
| *G06F 9/50* | (2006.01) | |

(52) U.S. Cl.
CPC ............ *G06F 3/0689* (2013.01); *G06F 1/3287* (2013.01); *G06F 3/0619* (2013.01); *G06F 3/0625* (2013.01); *G06F 3/0632* (2013.01); *G06F 3/0634* (2013.01); *G06F 9/50* (2013.01); *G06F 11/3006* (2013.01); *G06F 12/02* (2013.01)

(58) Field of Classification Search
CPC ....... G06F 9/50; G06F 11/3006; G06F 12/02; G06F 12/0223; G06F 12/0871
USPC ................ 710/8, 4, 53, 56, 57, 309
See application file for complete search history.

(56) References Cited

U.S. PATENT DOCUMENTS

| | | | |
|---|---|---|---|
| 5,852,747 A * | 12/1998 | Bennett ............. | G06F 17/30171 707/E17.007 |
| 6,374,332 B1 * | 4/2002 | Mackenthun ....... | G06F 12/0828 711/145 |
| 6,605,769 B1 | 8/2003 | Juszkiewicz | |
| 6,894,214 B2 | 5/2005 | Juszkiewicz | |

(Continued)

FOREIGN PATENT DOCUMENTS

| | | |
|---|---|---|
| JP | 2003-504673 | 2/2003 |
| JP | 2004-240697 | 8/2004 |

(Continued)

*Primary Examiner* — Idriss N Alrobaye
*Assistant Examiner* — Getente A Yimer
(74) *Attorney, Agent, or Firm* — Staas & Halsey LLP

(57) ABSTRACT

A control method for a control device which connects, via a connecting device, each of a plurality of processors that each executes processing to at least one of a plurality of memory devices that each stores data, the control method comprises controlling the connecting device so that a second memory device, which is one of the plurality of memory devices, is connected to the first processor in response to a connect request issued by a first processor, which is one of the plurality of processors, since a predetermined amount of data has been written into a first memory device, which is one of the plurality of memory devices, the control device; and controlling the connecting device so that the first memory device is disconnected from the first processor in response to a disconnect request issued by the first processor after starting to write data into the second memory device.

18 Claims, 55 Drawing Sheets

(56) References Cited

U.S. PATENT DOCUMENTS

| | | | |
|---|---|---|---|
| 2003/0093615 A1* | 5/2003 | De Jong | G06F 12/02 711/106 |
| 2005/0246388 A1 | 11/2005 | Yamatake | |
| 2010/0100696 A1 | 4/2010 | Suzuki | |
| 2010/0138574 A1* | 6/2010 | Watanabe | G06F 13/4081 710/108 |
| 2010/0161845 A1* | 6/2010 | Vyshetski | G06F 13/28 710/22 |

FOREIGN PATENT DOCUMENTS

| | | |
|---|---|---|
| JP | 2006-260376 | 9/2006 |
| JP | 2010-97533 | 4/2010 |
| WO | 01/04871 | 1/2001 |
| WO | 2005/003951 | 1/2005 |

\* cited by examiner

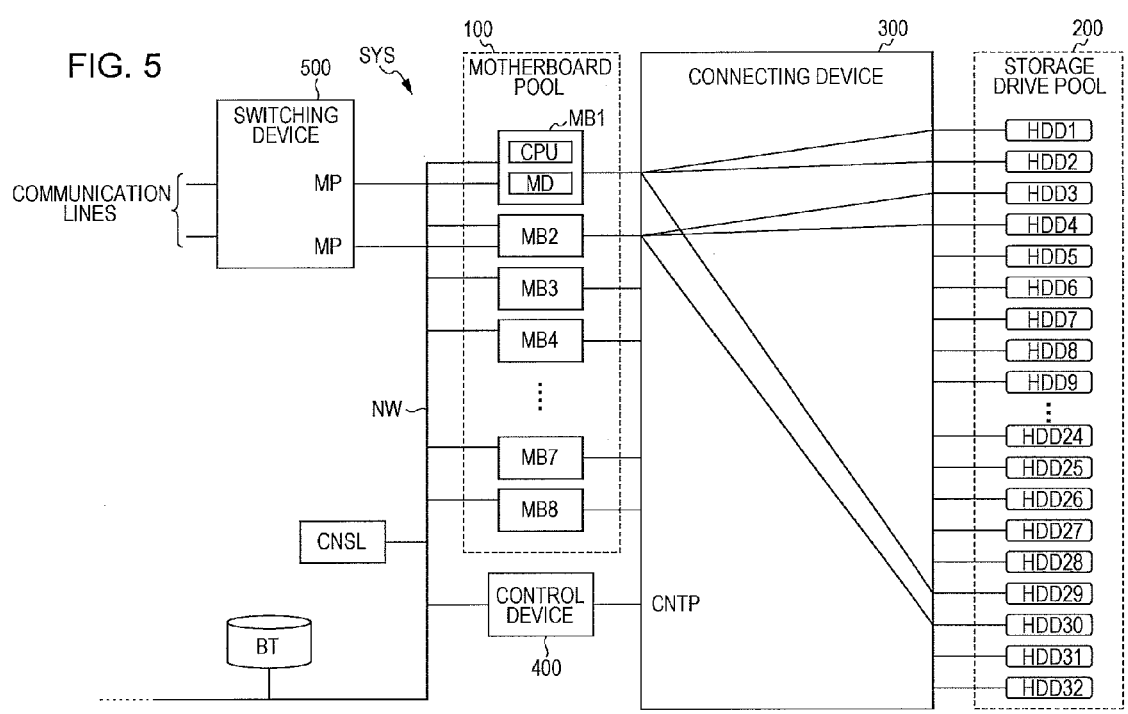

FIG. 10

| CNTBL | |
|---|---|
| MBPNo | HDDPNo |
| P(1,8) | P29 |
| P(2,8) | P30 |
| null | null |
| null | null |
| null | null |
| null | null |
| null | null |
| null | null |
| ⋮ | ⋮ |

| MSTBL | |
|---|---|
| MBNo | STATE |
| MB1 | CAPTURING |
| MB2 | CAPTURING |
| MB3 | NOT USED |
| MB4 | NOT USED |
| ⋮ | ⋮ |

| HSTBL | | |
|---|---|---|
| PURPOSE OF USE | HDDNo | STATE |
| DATA CAPTURING | HDD1 | NOT USED |
| | HDD2 | NOT USED |
| | HDD3 | NOT USED |
| | HDD4 | NOT USED |
| | HDD5 | NOT USED |
| | HDD6 | NOT USED |
| | HDD7 | NOT USED |
| | HDD8 | NOT USED |
| | HDD9 | NOT USED |
| | HDD10 | NOT USED |
| | HDD11 | NOT USED |
| | HDD12 | NOT USED |
| | HDD13 | NOT USED |
| | HDD14 | NOT USED |
| | HDD15 | NOT USED |
| | HDD16 | NOT USED |
| | HDD17 | NOT USED |
| | HDD18 | NOT USED |
| | HDD19 | NOT USED |
| | HDD20 | NOT USED |
| | HDD21 | NOT USED |
| | HDD22 | NOT USED |
| | HDD23 | NOT USED |
| | HDD24 | NOT USED |
| SPARE | HDD25 | NOT USED |
| | HDD26 | NOT USED |
| | HDD27 | NOT USED |
| | HDD28 | NOT USED |
| STARTUP | HDD29 | STARTED |
| | HDD30 | STARTED |
| | HDD31 | NOT USED |
| | HDD32 | NOT USED |

| INDTBL | | |
|---|---|---|
| START TIME | END TIME | HDDNo |
| null | null | null |
| null | null | null |
| null | null | null |
| null | null | null |
| null | null | null |
| null | null | null |
| null | null | null |
| ⋮ | ⋮ | ⋮ |

FIG. 11

CNTBL

| MBPNo | HDDPNo |
|---|---|
| P(1,8) | P29 |
| P(2,8) | P30 |
| P(1,1) | P1 |
| P(1,2) | P2 |
| P(2,1) | P3 |
| P(2,2) | P4 |
| null | null |
| null | null |
| ⋮ | ⋮ |

MSTBL

| MBNo | STATE |
|---|---|
| MB1 | CAPTURING |
| MB2 | CAPTURING |
| MB3 | NOT USED |
| MB4 | NOT USED |
| ⋮ | ⋮ |

HSTBL

| PURPOSE OF USE | HDDNo | STATE |
|---|---|---|
| DATA CAPTURING | HDD1 | CAPTURING |
| | HDD2 | CAPTURING |
| | HDD3 | CAPTURING |
| | HDD4 | CAPTURING |
| | HDD5 | NOT USED |
| | HDD6 | NOT USED |
| | HDD7 | NOT USED |
| | HDD8 | NOT USED |
| | HDD9 | NOT USED |
| | HDD10 | NOT USED |
| | HDD11 | NOT USED |
| | HDD12 | NOT USED |
| | HDD13 | NOT USED |
| | HDD14 | NOT USED |
| | HDD15 | NOT USED |
| | HDD16 | NOT USED |
| | HDD17 | NOT USED |
| | HDD18 | NOT USED |
| | HDD19 | NOT USED |
| | HDD20 | NOT USED |
| | HDD21 | NOT USED |
| | HDD22 | NOT USED |
| | HDD23 | NOT USED |
| | HDD24 | NOT USED |
| SPARE | HDD25 | NOT USED |
| | HDD26 | NOT USED |
| | HDD27 | NOT USED |
| | HDD28 | NOT USED |
| STARTUP | HDD29 | STARTED |
| | HDD30 | STARTED |
| | HDD31 | NOT USED |
| | HDD32 | NOT USED |

INDTBL

| START TIME | END TIME | HDDNo |
|---|---|---|
| t1 | CAPTURING | HDD1 |
| t2 | CAPTURING | HDD2 |
| t3 | CAPTURING | HDD3 |
| t4 | CAPTURING | HDD4 |
| null | null | null |
| null | null | null |
| null | null | null |
| ⋮ | ⋮ | ⋮ |

FIG. 12

CNTBL

| MBNo | HDDPNo |
|---|---|
| P(1,8) | P29 |
| P(2,8) | P30 |
| P(1,1) | P1 |
| P(1,2) | P2 |
| P(2,1) | P3 |
| P(2,2) | P4 |
| P(1,3) | P5 |
| P(1,4) | P6 |
| P(2,3) | P7 |
| P(2,4) | P8 |
| null | null |
| null | null |
| null | null |
| ⋮ | ⋮ |

MSTBL

| MBNo | STATE |
|---|---|
| MB1 | CAPTURING |
| MB2 | CAPTURING |
| MB3 | NOT USED |
| MB4 | NOT USED |
| ⋮ | ⋮ |

HSTBL

| PURPOSE OF USE | HDDNo | STATE |
|---|---|---|
| DATA CAPTURING | HDD1 | CAPTURING |
| | HDD2 | CAPTURING |
| | HDD3 | CAPTURING |
| | HDD4 | CAPTURING |
| | HDD5 | CAPTURING |
| | HDD6 | CAPTURING |
| | HDD7 | CAPTURING |
| | HDD8 | CAPTURING |
| | HDD9 | NOT USED |
| | HDD10 | NOT USED |
| | HDD11 | NOT USED |
| | HDD12 | NOT USED |
| | HDD13 | NOT USED |
| | HDD14 | NOT USED |
| | HDD15 | NOT USED |
| | HDD16 | NOT USED |
| | HDD17 | NOT USED |
| | HDD18 | NOT USED |
| | HDD19 | NOT USED |
| | HDD20 | NOT USED |
| | HDD21 | NOT USED |
| | HDD22 | NOT USED |
| | HDD23 | NOT USED |
| | HDD24 | NOT USED |
| SPARE | HDD25 | NOT USED |
| | HDD26 | NOT USED |
| | HDD27 | NOT USED |
| | HDD28 | NOT USED |
| STARTUP | HDD29 | STARTED |
| | HDD30 | STARTED |
| | HDD31 | NOT USED |
| | HDD32 | NOT USED |

INDTBL

| START TIME | END TIME | HDDNo |
|---|---|---|
| t1 | CAPTURING | HDD1 |
| t2 | CAPTURING | HDD2 |
| t3 | CAPTURING | HDD3 |
| t4 | CAPTURING | HDD4 |
| t5 | CAPTURING | HDD5 |
| t6 | CAPTURING | HDD6 |
| t7 | CAPTURING | HDD7 |
| t8 | CAPTURING | HDD8 |
| null | null | null |
| null | null | null |
| null | null | null |
| ⋮ | ⋮ | ⋮ |

FIG. 13

| CNTBL | |
|---|---|
| MBNo | HDDPNo |
| P(1,8) | P29 |
| P(2,8) | P30 |
| P(1,3) | P5 |
| P(1,4) | P6 |
| P(2,3) | P7 |
| P(2,4) | P8 |
| null | null |
| null | null |
| null | null |
| null | null |
| null | null |
| null | null |
| ⋮ | ⋮ |

| MSTBL | |
|---|---|
| MBNo | STATE |
| MB1 | CAPTURING |
| MB2 | CAPTURING |
| MB3 | NOT USED |
| MB4 | NOT USED |
| ⋮ | ⋮ |

| HSTBL | | |
|---|---|---|
| PURPOSE OF USE | HDDNo | STATE |
| DATA CAPTURING | HDD1 | STANDBY |
| | HDD2 | STANDBY |
| | HDD3 | STANDBY |
| | HDD4 | STANDBY |
| | HDD5 | CAPTURING |
| | HDD6 | CAPTURING |
| | HDD7 | CAPTURING |
| | HDD8 | CAPTURING |
| | HDD9 | NOT USED |
| | HDD10 | NOT USED |
| | HDD11 | NOT USED |
| | HDD12 | NOT USED |
| | HDD13 | NOT USED |
| | HDD14 | NOT USED |
| | HDD15 | NOT USED |
| | HDD16 | NOT USED |
| | HDD17 | NOT USED |
| | HDD18 | NOT USED |
| | HDD19 | NOT USED |
| | HDD20 | NOT USED |
| | HDD21 | NOT USED |
| | HDD22 | NOT USED |
| | HDD23 | NOT USED |
| | HDD24 | NOT USED |
| SPARE | HDD25 | NOT USED |
| | HDD26 | NOT USED |
| | HDD27 | NOT USED |
| | HDD28 | NOT USED |
| STARTUP | HDD29 | STARTED |
| | HDD30 | STARTED |
| | HDD31 | NOT USED |
| | HDD32 | NOT USED |

| INDTBL | | |
|---|---|---|
| START TIME | END TIME | HDDNo |
| t1 | t1 | HDD1 |
| t2 | t2 | HDD2 |
| t3 | t3 | HDD3 |
| t4 | t4 | HDD4 |
| t5 | CAPTURING | HDD5 |
| t6 | CAPTURING | HDD6 |
| t7 | CAPTURING | HDD7 |
| t8 | CAPTURING | HDD8 |
| null | null | null |
| null | null | null |
| null | null | null |
| ⋮ | ⋮ | ⋮ |

FIG. 14

CNTBL

| MBNo | HDDPNo |
|---|---|
| P(1,8) | P29 |
| P(2,8) | P30 |
| P(1,3) | P21 |
| P(1,4) | P22 |
| P(2,3) | P23 |
| P(2,4) | P24 |
| null | null |
| null | null |
| null | null |
| ⋮ | ⋮ |

MSTBL

| MBNo | STATE |
|---|---|
| MB1 | CAPTURING |
| MB2 | CAPTURING |
| MB3 | NOT USED |
| MB4 | NOT USED |
| ⋮ | ⋮ |

HSTBL

| PURPOSE OF USE | HDDNo | STATE |
|---|---|---|
| DATA CAPTURING | HDD1 | STANDBY |
| | HDD2 | STANDBY |
| | HDD3 | STANDBY |
| | HDD4 | STANDBY |
| | HDD5 | STANDBY |
| | HDD6 | STANDBY |
| | HDD7 | STANDBY |
| | HDD8 | STANDBY |
| | HDD9 | STANDBY |
| | HDD10 | STANDBY |
| | HDD11 | STANDBY |
| | HDD12 | STANDBY |
| | HDD13 | STANDBY |
| | HDD14 | STANDBY |
| | HDD15 | STANDBY |
| | HDD16 | STANDBY |
| | HDD17 | STANDBY |
| | HDD18 | STANDBY |
| | HDD19 | STANDBY |
| | HDD20 | STANDBY |
| | HDD21 | CAPTURING |
| | HDD22 | CAPTURING |
| | HDD23 | CAPTURING |
| | HDD24 | CAPTURING |
| SPARE | HDD25 | NOT USED |
| | HDD26 | NOT USED |
| | HDD27 | NOT USED |
| | HDD28 | NOT USED |
| STARTUP | HDD29 | STARTED |
| | HDD30 | STARTED |
| | HDD31 | NOT USED |
| | HDD32 | NOT USED |

INDTBL

| START TIME | END TIME | HDDNo |
|---|---|---|
| t1 | t1' | HDD1 |
| t2 | t2' | HDD2 |
| t3 | t3' | HDD3 |
| t4 | t4' | HDD4 |
| t5 | t5' | HDD5 |
| t6 | t6' | HDD6 |
| t7 | t7' | HDD7 |
| t8 | t8' | HDD8 |
| t9 | t9' | HDD9 |
| t10 | t10' | HDD10 |
| t11 | t11' | HDD11 |
| t12 | t12' | HDD12 |
| t13 | t13' | HDD13 |
| t14 | t14' | HDD14 |
| t15 | t15' | HDD15 |
| t16 | t16' | HDD16 |
| t17 | t17' | HDD17 |
| t18 | t18' | HDD18 |
| t19 | t19' | HDD19 |
| t20 | t20' | HDD20 |
| t21 | CAPTURING | HDD21 |
| t22 | CAPTURING | HDD22 |
| t23 | CAPTURING | HDD23 |
| t24 | CAPTURING | HDD24 |
| null | null | null |
| null | null | null |
| null | null | null |
| ⋮ | ⋮ | ⋮ |

FIG. 15

| CNTBL | |
|---|---|
| MBNo | HDDPNo |
| P(1,8) | P29 |
| P(2,8) | P30 |
| P(1,1) | P1 |
| P(1,2) | P2 |
| P(2,1) | P3 |
| P(2,2) | P4 |
| null | null |
| null | null |
| null | null |
| ⋮ | ⋮ |

| MSTBL | |
|---|---|
| MBNo | STATE |
| MB1 | CAPTURING |
| MB2 | CAPTURING |
| MB3 | NOT USED |
| MB4 | NOT USED |
| ⋮ | ⋮ |

| HSTBL | | |
|---|---|---|
| PURPOSE OF USE | HDDNo | STATE |
| DATA CAPTURING | HDD1 | CAPTURING |
| | HDD2 | CAPTURING |
| | HDD3 | CAPTURING |
| | HDD4 | CAPTURING |
| | HDD5 | STANDBY |
| | HDD6 | STANDBY |
| | HDD7 | STANDBY |
| | HDD8 | STANDBY |
| | HDD9 | STANDBY |
| | HDD10 | STANDBY |
| | HDD11 | STANDBY |
| | HDD12 | STANDBY |
| | HDD13 | STANDBY |
| | HDD14 | STANDBY |
| | HDD15 | STANDBY |
| | HDD16 | STANDBY |
| | HDD17 | STANDBY |
| | HDD18 | STANDBY |
| | HDD19 | STANDBY |
| | HDD20 | STANDBY |
| | HDD21 | STANDBY |
| | HDD22 | STANDBY |
| | HDD23 | STANDBY |
| | HDD24 | STANDBY |
| SPARE | HDD25 | NOT USED |
| | HDD26 | NOT USED |
| | HDD27 | NOT USED |
| | HDD28 | NOT USED |
| STARTUP | HDD29 | STARTED |
| | HDD30 | STARTED |
| | HDD31 | NOT USED |
| | HDD32 | NOT USED |

| INDTBL | | |
|---|---|---|
| START TIME | END TIME | HDDNo |
| t25 | CAPTURING | HDD1 |
| t26 | CAPTURING | HDD2 |
| t27 | CAPTURING | HDD3 |
| t28 | CAPTURING | HDD4 |
| t5 | t5' | HDD5 |
| t6 | t6' | HDD6 |
| t7 | t7' | HDD7 |
| t8 | t8' | HDD8 |
| t9 | t9' | HDD9 |
| t10 | t10' | HDD10 |
| t11 | t11' | HDD11 |
| t12 | t12' | HDD12 |
| t13 | t13' | HDD13 |
| t14 | t14' | HDD14 |
| t15 | t15' | HDD15 |
| t16 | t16' | HDD16 |
| t17 | t17' | HDD17 |
| t18 | t18' | HDD18 |
| t19 | t19' | HDD19 |
| t20 | t20' | HDD20 |
| t21 | t21' | HDD21 |
| t22 | t22' | HDD22 |
| t23 | t23' | HDD23 |
| t24 | t24' | HDD24 |
| null | null | null |
| null | null | null |
| null | null | null |
| ⋮ | ⋮ | ⋮ |

FIG. 26

CNTBL

| MBNo | HDDPNo |
|---|---|
| P(1,8) | P29 |
| P(2,8) | P30 |
| P(3,8) | P31 |
| P(4,8) | P32 |
| P(1,3) | P5 |
| P(1,4) | P6 |
| P(2,3) | P7 |
| P(2,4) | P8 |
| null | null |
| ⋮ | ⋮ |

MSTBL

| MBNo | STATE |
|---|---|
| MB1 | CAPTURING |
| MB2 | CAPTURING |
| MB3 | SEARCHING |
| MB4 | SEARCHING |
| ⋮ | ⋮ |

HSTBL

| PURPOSE OF USE | HDDNo | STATE |
|---|---|---|
| DATA CAPTURING | HDD1 | STANDBY |
| | HDD2 | STANDBY |
| | HDD3 | STANDBY |
| | HDD4 | STANDBY |
| | HDD5 | CAPTURING |
| | HDD6 | CAPTURING |
| | HDD7 | CAPTURING |
| | HDD8 | CAPTURING |
| | HDD9 | STANDBY |
| | HDD10 | STANDBY |
| | HDD11 | STANDBY |
| | HDD12 | STANDBY |
| | HDD13 | STANDBY |
| | HDD14 | STANDBY |
| | HDD15 | STANDBY |
| | HDD16 | STANDBY |
| | HDD17 | STANDBY |
| | HDD18 | STANDBY |
| | HDD19 | STANDBY |
| | HDD20 | STANDBY |
| | HDD21 | STANDBY |
| | HDD22 | STANDBY |
| | HDD23 | STANDBY |
| | HDD24 | STANDBY |
| SPARE | HDD25 | NOT USED |
| | HDD26 | NOT USED |
| | HDD27 | NOT USED |
| | HDD28 | NOT USED |
| STARTUP | HDD29 | STARTED |
| | HDD30 | STARTED |
| | HDD31 | STARTED |
| | HDD32 | STARTED |

INDTBL

| START TIME | END TIME | HDDNo |
|---|---|---|
| t25 | t25' | HDD1 |
| t26 | t26' | HDD2 |
| t27 | t27' | HDD3 |
| t28 | t28' | HDD4 |
| t29 | CAPTURING | HDD5 |
| t30 | CAPTURING | HDD6 |
| t31 | CAPTURING | HDD7 |
| t32 | CAPTURING | HDD8 |
| t9 | t9' | HDD9 |
| t10 | t10' | HDD10 |
| t11 | t11' | HDD11 |
| t12 | t12' | HDD12 |
| t13 | t13' | HDD13 |
| t14 | t14' | HDD14 |
| t15 | t15' | HDD15 |
| t16 | t16' | HDD16 |
| t17 | t17' | HDD17 |
| t18 | t18' | HDD18 |
| t19 | t19' | HDD19 |
| t20 | t20' | HDD20 |
| t21 | t21' | HDD21 |
| t22 | t22' | HDD22 |
| t23 | t23' | HDD23 |
| t24 | t24' | HDD24 |
| null | null | null |
| null | null | null |
| null | null | null |
| ⋮ | ⋮ | ⋮ |

FIG. 27

CNTBL

| MBNo | HDDPNo |
|---|---|
| P(1,8) | P29 |
| P(2,8) | P30 |
| P(3,8) | P31 |
| P(4,8) | P32 |
| P(1,3) | P5 |
| P(1,4) | P6 |
| P(2,3) | P7 |
| P(2,4) | P8 |
| P(3,1) | P1 |
| P(3,2) | P2 |
| P(4,1) | P3 |
| P(4,2) | P4 |
| null | null |
| ⋮ | ⋮ |

MSTBL

| MBNo | STATE |
|---|---|
| MB1 | CAPTURING |
| MB2 | CAPTURING |
| MB3 | SEARCHING |
| MB4 | SEARCHING |
| ⋮ | ⋮ |

HSTBL

| PURPOSE OF USE | HDDNo | STATE |
|---|---|---|
| DATA CAPTURING | HDD1 | SEARCHING |
| | HDD2 | SEARCHING |
| | HDD3 | SEARCHING |
| | HDD4 | SEARCHING |
| | HDD5 | CAPTURING |
| | HDD6 | CAPTURING |
| | HDD7 | CAPTURING |
| | HDD8 | CAPTURING |
| | HDD9 | STANDBY |
| | HDD10 | STANDBY |
| | HDD11 | STANDBY |
| | HDD12 | STANDBY |
| | HDD13 | STANDBY |
| | HDD14 | STANDBY |
| | HDD15 | STANDBY |
| | HDD16 | STANDBY |
| | HDD17 | STANDBY |
| | HDD18 | STANDBY |
| | HDD19 | STANDBY |
| | HDD20 | STANDBY |
| | HDD21 | STANDBY |
| | HDD22 | STANDBY |
| | HDD23 | STANDBY |
| | HDD24 | STANDBY |
| SPARE | HDD25 | NOT USED |
| | HDD26 | NOT USED |
| | HDD27 | NOT USED |
| | HDD28 | NOT USED |
| STARTUP | HDD29 | STARTED |
| | HDD30 | STARTED |
| | HDD31 | STARTED |
| | HDD32 | STARTED |

INDTBL

| START TIME | END TIME | HDDNo |
|---|---|---|
| t25 | t25' | HDD1 |
| t26 | t26' | HDD2 |
| t27 | t27' | HDD3 |
| t28 | t28' | HDD4 |
| t29 | CAPTURING | HDD5 |
| t30 | CAPTURING | HDD6 |
| t31 | CAPTURING | HDD7 |
| t32 | CAPTURING | HDD8 |
| t9 | t9' | HDD9 |
| t10 | t10' | HDD10 |
| t11 | t11' | HDD11 |
| t12 | t12' | HDD12 |
| t13 | t13' | HDD13 |
| t14 | t14' | HDD14 |
| t15 | t15' | HDD15 |
| t16 | t16' | HDD16 |
| t17 | t17' | HDD17 |
| t18 | t18' | HDD18 |
| t19 | t19' | HDD19 |
| t20 | t20' | HDD20 |
| t21 | t21' | HDD21 |
| t22 | t22' | HDD22 |
| t23 | t23' | HDD23 |
| t24 | t24' | HDD24 |
| null | null | null |
| null | null | null |
| null | null | null |
| ⋮ | ⋮ | ⋮ |

FIG. 39

CNTBL

| MBNo | HDDPNo |
|---|---|
| P(1,8) | P29 |
| P(2,8) | P30 |
| P(3,8) | P31 |
| P(1,3) | P5 |
| P(1,4) | P6 |
| P(2,3) | P7 |
| P(2,4) | P8 |
| null | null |
| null | null |
| null | null |
| null | null |
| null | null |
| null | null |
| ⋮ | ⋮ |

MSTBL

| MBNo | STATE |
|---|---|
| MB1 | CAPTURING |
| MB2 | CAPTURING |
| MB3 | CHECKING |
| MB4 | NOT USED |
| ⋮ | ⋮ |

CHKTBL

| HDDNo | CHECK TIME |
|---|---|
| HDD1 | null |
| HDD2 | null |
| HDD3 | null |
| HDD4 | null |
| null | null |
| null | null |
| ⋮ | ⋮ |

FAILTBL

| TYPE | HDDNo | ADDRESS |
|---|---|---|
| null | null | null |
| null | null | null |
| null | null | null |
| null | null | null |
| ⋮ | ⋮ | ⋮ |

HSTBL

| PURPOSE OF USE | HDDNo | STATE |
|---|---|---|
| MIRROR | HDD1 | STANDBY |
|  | HDD2 | STANDBY |
|  | HDD3 | STANDBY |
|  | HDD4 | STANDBY |
|  | HDD5 | CAPTURING |
|  | HDD6 | CAPTURING |
|  | HDD7 | CAPTURING |
|  | HDD8 | CAPTURING |
| DATA CAPTURING | HDD9 | STANDBY |
|  | HDD10 | STANDBY |
|  | HDD11 | STANDBY |
|  | HDD12 | STANDBY |
|  | HDD13 | STANDBY |
|  | HDD14 | STANDBY |
|  | HDD15 | STANDBY |
|  | HDD16 | STANDBY |
|  | HDD17 | STANDBY |
|  | HDD18 | STANDBY |
|  | HDD19 | STANDBY |
|  | HDD20 | STANDBY |
|  | HDD21 | STANDBY |
|  | HDD22 | STANDBY |
|  | HDD23 | STANDBY |
|  | HDD24 | STANDBY |
| SPARE | HDD25 | NOT USED |
|  | HDD26 | NOT USED |
|  | HDD27 | NOT USED |
|  | HDD28 | NOT USED |
| STARTUP | HDD29 | STARTED |
|  | HDD30 | STARTED |
|  | HDD31 | STARTED |
|  | HDD32 | NOT USED |

INDTBL

| START TIME | END TIME | HDDNo |
|---|---|---|
| t25 | t25' | HDD1 |
| t26 | t26' | HDD2 |
| t27 | t27' | HDD3 |
| t28 | t28' | HDD4 |
| t29 | CAPTURING | HDD5 |
| t30 | CAPTURING | HDD6 |
| t31 | CAPTURING | HDD7 |
| t32 | CAPTURING | HDD8 |
| t9 | t9' | HDD9 |
| t10 | t10' | HDD10 |
| t11 | t11' | HDD11 |
| t12 | t12' | HDD12 |
| t13 | t13' | HDD13 |
| t14 | t14' | HDD14 |
| t15 | t15' | HDD15 |
| t16 | t16' | HDD16 |
| t17 | t17' | HDD17 |
| t18 | t18' | HDD18 |
| t19 | t19' | HDD19 |
| t20 | t20' | HDD20 |
| t21 | t21' | HDD21 |
| t22 | t22' | HDD22 |
| t23 | t23' | HDD23 |
| t24 | t24' | HDD24 |
| null | null | null |
| null | null | null |
| null | null | null |
| ⋮ | ⋮ | ⋮ |

FIG. 49

CNTBL

| MBNo | HDDPNo |
|---|---|
| P(1,8) | P29 |
| P(2,8) | P30 |
| P(3,8) | P31 |
| P(1,3) | P5 |
| P(1,4) | P6 |
| P(2,3) | P7 |
| P(2,4) | P8 |
| null | null |
| null | null |
| null | null |
| null | null |
| null | null |
| ⋮ | ⋮ |

MSTBL

| MBNo | STATE |
|---|---|
| MB1 | CAPTURING |
| MB2 | CAPTURING |
| MB3 | CHECKING |
| MB4 | NOT USED |
| ⋮ | ⋮ |

CHKTBL

| HDDNo | CHECK TIME |
|---|---|
| HDD1 | t37 |
| HDD2 | t34 |
| HDD25 | t37 |
| HDD4 | t36 |
| null | null |
| null | null |
| ⋮ | ⋮ |

FAILTBL

| TYPE | HDDNo | ADDRESS |
|---|---|---|
| HDD FAILURE | HDD3 | null |
| null | null | null |
| null | null | null |
| null | null | null |
| ⋮ | ⋮ | ⋮ |

HSTBL

| PURPOSE OF USE | HDDNo | STATE |
|---|---|---|
| MIRROR | HDD1 | STANDBY |
|  | HDD2 | STANDBY |
|  | HDD25 | STANDBY |
|  | HDD4 | STANDBY |
| DATA CAPTURING | HDD5 | CAPTURING |
|  | HDD6 | CAPTURING |
|  | HDD7 | CAPTURING |
|  | HDD8 | CAPTURING |
|  | HDD9 | STANDBY |
|  | HDD10 | STANDBY |
|  | HDD11 | STANDBY |
|  | HDD12 | STANDBY |
|  | HDD13 | STANDBY |
|  | HDD14 | STANDBY |
|  | HDD15 | STANDBY |
|  | HDD16 | STANDBY |
|  | HDD17 | STANDBY |
|  | HDD18 | STANDBY |
|  | HDD19 | STANDBY |
|  | HDD20 | STANDBY |
|  | HDD21 | STANDBY |
|  | HDD22 | STANDBY |
|  | HDD23 | STANDBY |
|  | HDD24 | STANDBY |
| SPARE | HDD3 | FAILED |
|  | HDD26 | NOT USED |
|  | HDD27 | NOT USED |
|  | HDD28 | NOT USED |
| STARTUP | HDD29 | STARTED |
|  | HDD30 | STARTED |
|  | HDD31 | STARTED |
|  | HDD32 | NOT USED |

INDTBL

| START TIME | END TIME | HDDNo |
|---|---|---|
| t25 | t25' | HDD1 |
| t26 | t26' | HDD2 |
| t25 | t25' | HDD25 |
| t28 | t28' | HDD4 |
| t29 | CAPTURING | HDD5 |
| t30 | CAPTURING | HDD6 |
| t31 | CAPTURING | HDD7 |
| t32 | CAPTURING | HDD8 |
| t9 | t9' | HDD9 |
| t10 | t10' | HDD10 |
| t11 | t11' | HDD11 |
| t12 | t12' | HDD12 |
| t13 | t13' | HDD13 |
| t14 | t14' | HDD14 |
| t15 | t15' | HDD15 |
| t16 | t16' | HDD16 |
| t17 | t17' | HDD17 |
| t18 | t18' | HDD18 |
| t19 | t19' | HDD19 |
| t20 | t20' | HDD20 |
| t21 | t21' | HDD21 |
| t22 | t22' | HDD22 |
| t23 | t23' | HDD23 |
| t24 | t24' | HDD24 |
| null | null | null |
| null | null | null |
| null | null | null |
| ⋮ | ⋮ | ⋮ |

FIG. 51

CNTBL

| MBNo | HDDPNo |
|---|---|
| P(1,8) | P29 |
| P(2,8) | P30 |
| P(3,8) | P31 |
| P(1,3) | P5 |
| P(1,4) | P6 |
| P(2,3) | P7 |
| P(2,4) | P8 |
| null | null |
| null | null |
| null | null |
| null | null |
| null | null |
| ⋮ | ⋮ |

MSTBL

| MBNo | STATE |
|---|---|
| MB1 | CAPTURING |
| MB2 | CAPTURING |
| MB3 | CHECKING |
| MB4 | NOT USED |
| ⋮ | ⋮ |

CHKTBL

| HDDNo | CHECK TIME |
|---|---|
| HDD1 | t33 |
| HDD2 | t34 |
| HDD25 | t35 |
| HDD4 | t36 |
| null | null |
| null | null |
| ⋮ | ⋮ |

FAILTBL

| TYPE | HDDNo | ADDRESS |
|---|---|---|
| null | null | null |
| null | null | null |
| null | null | null |
| null | null | null |
| ⋮ | ⋮ | ⋮ |

HSTBL

| PURPOSE OF USE | HDDNo | STATE |
|---|---|---|
| MIRROR | HDD1 | STANDBY |
|  | HDD2 | STANDBY |
|  | HDD3 | STANDBY |
|  | HDD4 | STANDBY |
|  | HDD5 | CAPTURING |
|  | HDD6 | CAPTURING |
|  | HDD7 | CAPTURING |
|  | HDD8 | CAPTURING |
|  | HDD9 | STANDBY |
|  | HDD10 | STANDBY |
|  | HDD11 | STANDBY |
|  | HDD12 | STANDBY |
| DATA CAPTURING | HDD13 | STANDBY |
|  | HDD14 | STANDBY |
|  | HDD15 | STANDBY |
|  | HDD16 | STANDBY |
|  | HDD17 | STANDBY |
|  | HDD18 | STANDBY |
|  | HDD19 | STANDBY |
|  | HDD20 | STANDBY |
|  | HDD21 | STANDBY |
|  | HDD22 | STANDBY |
|  | HDD23 | STANDBY |
|  | HDD24 | STANDBY |
| SPARE | HDD25 | NOT USED |
|  | HDD26 | NOT USED |
|  | HDD27 | NOT USED |
|  | HDD28 | NOT USED |
| STARTUP | HDD29 | STARTED |
|  | HDD30 | STARTED |
|  | HDD31 | STARTED |
|  | HDD32 | NOT USED |

INDTBL

| START TIME | END TIME | HDDNo |
|---|---|---|
| t25 | t25' | HDD1 |
| t26 | t26' | HDD2 |
| t27 | t27' | HDD3 |
| t28 | t28' | HDD4 |
| t29 | CAPTURING | HDD5 |
| t30 | CAPTURING | HDD6 |
| t31 | CAPTURING | HDD7 |
| t32 | CAPTURING | HDD8 |
| t9 | t9' | HDD9 |
| t10 | t10' | HDD10 |
| t11 | t11' | HDD11 |
| t12 | t12' | HDD12 |
| t13 | t13' | HDD13 |
| t14 | t14' | HDD14 |
| t15 | t15' | HDD15 |
| t16 | t16' | HDD16 |
| t17 | t17' | HDD17 |
| t18 | t18' | HDD18 |
| t19 | t19' | HDD19 |
| t20 | t20' | HDD20 |
| t21 | t21' | HDD21 |
| t22 | t22' | HDD22 |
| t23 | t23' | HDD23 |
| t24 | t24' | HDD24 |
| null | null | null |
| null | null | null |
| null | null | null |
| ⋮ | ⋮ | ⋮ |

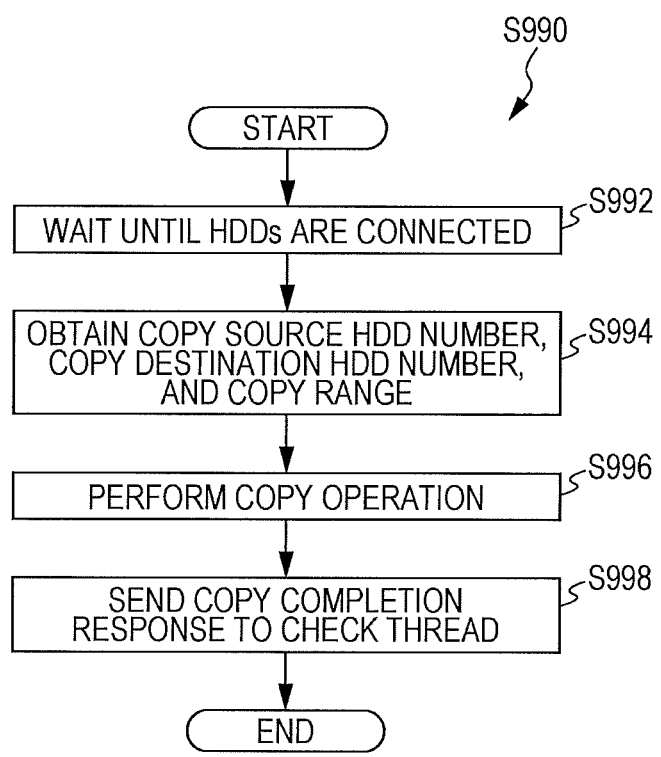

INFORMATION PROCESSING SYSTEM, AND CONTROL METHOD

CROSS-REFERENCE TO RELATED APPLICATION

This application is based upon and claims the benefit of priority of the prior Japanese Patent Application No. 2013-054936, filed on Mar. 18, 2013, the entire contents of which are incorporated herein by reference.

FIELD

The embodiments discussed herein are related to an information processing system, a control device, a storage medium storing a control program for the control device, and a control method for the information processing system.

BACKGROUND

A method for constructing a system suitable for the specifications of a client by connecting each of a plurality of processors to associated memory devices with switches has been proposed, for example, in Japanese Laid-open Patent Publication No. 2004-240697. In this type of system, during a period in which programs are not used frequently, a plurality of programs distributed over a plurality of memory devices are moved to one memory device, thereby reducing power consumption. An example of this technique is disclosed in Japanese Laid-open Patent Publication No. 2010-97533.

The following sound recording apparatus is disclosed in, for example, Japanese National Publication of International Patent Application No. 2003-504673. Musical sound generated in a musical instrument is recorded in a sound recording apparatus per predetermined unit time, thereby making it possible to search for musical sound. When the sound recording apparatus is full of digital information, recorded digital information is overwritten with new digital information.

The following technique has been proposed in, for example, International Publication Pamphlet No. WO2005/3951. Redundant data items are stored in different memory devices, and when an abnormality of a memory device has been detected, a redundant data item stored in a memory device is copied into a newly assigned memory device. The following method has also been proposed in, for example, Japanese Laid-open Patent Publication No. 2006-260376. Data is stored in a master disc and a backup disc, and when a failure of the master disc has been detected, data stored in the backup disc is copied into an alternative area of the master disc.

In the above-described system, a plurality of memory devices are connected to a processor with switches, and the processor writes data into one of the memory devices connected to the processor via the switches. That is, a memory device into which data will not be written and a memory device into which data has already been written are also connected to the processor via the switches. Accordingly, when the processor writes data into one memory device, the performance in writing data may be decreased due to the interference of other memory devices connected to the processor via the switches.

SUMMARY

According to an aspect of the embodiment, a control method for a control device which connects, via a connecting device, each of a plurality of processors that each executes processing to at least one of a plurality of memory devices that each stores data, the control method comprises controlling the connecting device so that a second memory device, which is one of the plurality of memory devices, is connected to the first processor in response to a connect request issued by a first processor, which is one of the plurality of processors, since a predetermined amount of data has been written into a first memory device, which is one of the plurality of memory devices, the control device; and controlling the connecting device so that the first memory device is disconnected from the first processor in response to a disconnect request issued by the first processor after starting to write data into the second memory device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates another embodiment of an information processing system, a control device, a control program for the control device, and a control method for the information processing system;

FIG. 10 illustrates examples of the states of the tables after startup HDDs are connected to motherboards by a capture start thread indicated by (a) of FIG. 9;

FIG. 11 illustrates examples of the states of the tables after a capture process indicated by (b) of FIG. 9 has started to write data into HDD1 through HDD4;

FIG. 12 illustrates examples of the states of the tables after the capture process has started to write data into HDD5 through HDD8 at the same time as writing data into HDD1 through HDD4 in response to a connect request thread indicated by (e) of FIG. 9;

FIG. 13 illustrates examples of the states of the tables after HDD1 and HDD2 are disconnected from a motherboard MB1 and HDD3 and HDD4 are disconnected from a motherboard MB2 by a disconnect request thread indicated by (g) of FIG. 9;

FIG. 14 illustrates examples of the states of the tables when items of data have been stored in all HDDs used for data capturing;

FIG. 15 illustrates examples of the states of the tables when old data stored in HDDs is overwritten;

FIG. 26 illustrates examples of the states of the tables after search HDDs are connected to a motherboard by a search thread illustrated in FIG. 25;

FIG. 27 illustrates examples of the states of the tables after a search process illustrated in FIG. 25 has been started;

FIG. 39 illustrates examples of the states of the tables when a check process illustrated in FIG. 38 is started;

FIG. 49 illustrates an example of the states of the tables after the copy process illustrated in FIG. 46 has been executed;

FIG. 51 illustrates another example of the states of the tables after the copy process illustrated in FIG. 46 has been executed;

FIG. 55 illustrates an example of a copy process started in step S990 illustrated in FIGS. 53 and 54.

DESCRIPTION OF EMBODIMENTS

An embodiment will be discussed below with reference to the accompanying drawings.

Figure 1:
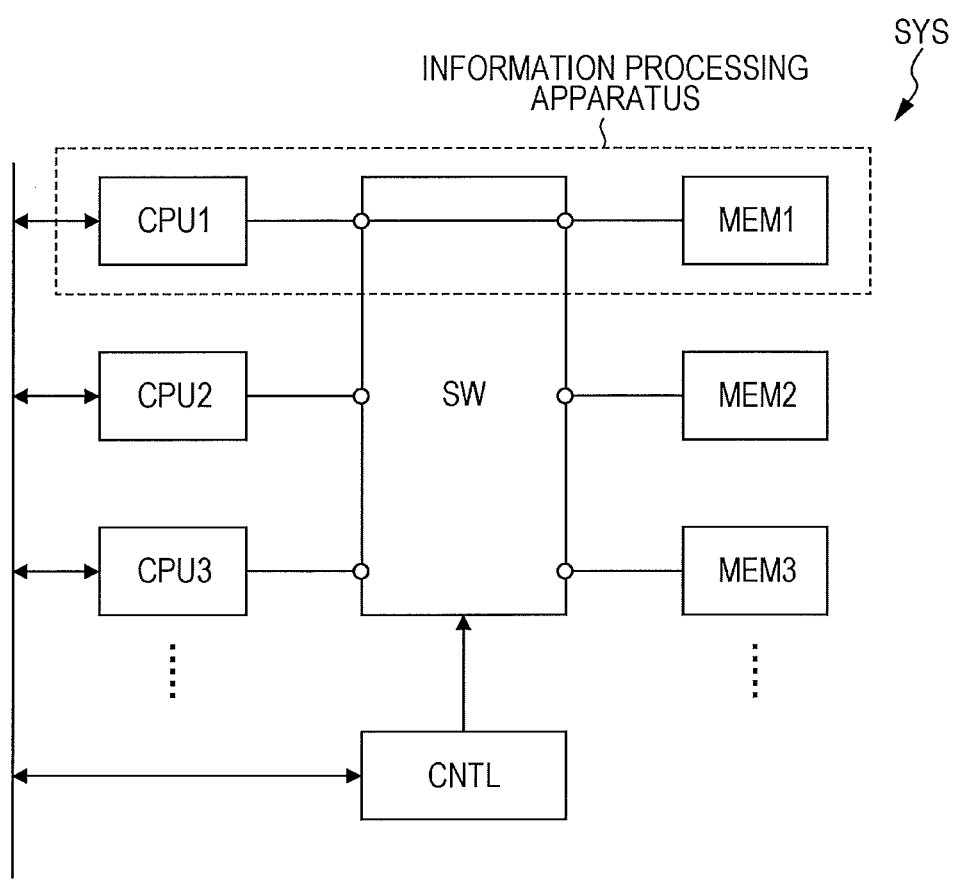
FIG. 1 illustrates an embodiment of an information processing system, a control device, a control program for the control device, and a control method for the information processing system.

FIG. 1 illustrates an embodiment of an information processing system, a control device, a control program for the control device, and a control method for the information processing system. An information processing system SYS of this embodiment includes a plurality of central processing units (CPUs) (CPU1, CPU2, and CPU3), a plurality of memory devices MEMs (MEM1, MEM2, and MEM3) for storing data therein, a switching device SW, and a control device CNTL. Each CPU is an example of a processor which executes processing. The memory devices MEMs are, for example, hard disk drives. The number of CPUs and the number of memory devices MEMs loaded in the information processing system SYS are not restricted to three.

Each CPU may be constituted by a multi-core processor including a plurality of processor cores. Instead of CPUs, the information processing system SYS may include a computer, such as a motherboard on which CPUs and a memory device, such as a dual inline memory module (DIMM) having dynamic random access memory (DRAM) chips, are mounted.

Instead of CPUs, the information processing system SYS may include processors operated by executing a program, such as digital signal processors (DSPs) or graphics processing units (GPUs), or a computer including such processors. The memory devices MEMs may be flash storages, such as solid state drives (SSDs), or a DIMM.

The memory devices MEMs are not server devices including CPUs, but storage devices. Accordingly, compared with the use of server devices as storage servers instead of memory devices MEMs, the use of the memory devices MEMs makes it possible to reduce the cost and the power consumption of the information processing system SYS.

The switching device SW connects each of the CPU1 through CPU3 to at least one of the memory devices MEM1 through MEM3, whereby an information processing apparatus is constructed. For example, FIG. 1 illustrates a state in which an information processing apparatus is constructed by the CPU1 and the memory device MEM1. The information processing apparatus constituted by the CPU1 and the memory device MEM1 operate as a capture server that captures data transferred from an external source outside the information processing system SYS.

The switching device SW may be capable of connecting a memory device MEM to a CPU without decreasing the bandwidth (data transfer rate) of the memory device MEM. In other words, the performance of a memory device MEM connected to a CPU with the switching device SW therebetween is comparable to that of a memory device MEM connected to a CPU without the switching device SW therebetween.

The control device CNTL controls the CPU1 through CPU3 and the switching device SW. The control device CNTL is, for example, a computer, such as a server, including a processor, such as a CPU, and a memory device storing therein a control program executed by the processor. The control device CNTL controls the CPU1 through CPU3 and the switching device SW by executing the control program.

The information processing system SYS is connected to, for example, a data center in which voice data is collected from conversation being carried out on cellular phones, and captures voice data in real time. Then, upon the occurrence of a failure in a communication line of cellular phones, a computer disposed in the data center reads voice data obtained at a date and time upon the occurrence of a failure from the information processing system SYS and analyzes noise, for example, contained in the read voice data, thereby determining the cause of the failure. The information processing system SYS may write the same data into a plurality of memory devices MEMs, and upon the occurrence of an error stored in a memory device MEM, the information processing system SYS may correct for the error.

FIGS. 2A through 2F illustrate an example of an operation performed by the information processing system SYS illustrated in FIG. 1. FIGS. 2A through 2F also illustrate a control method for the information processing system SYS. The operation illustrated in FIGS. 2A through 2F is implemented by executing a capture program CP, which is one of control programs, by the control device CNTL.

In FIGS. 2A through 2F, an information processing apparatus (capture server) is constructed by the CPU1 and at least one of the memory devices MEM1 through MEM3 connected to the CPU1. In FIGS. 2B through 2F, a memory device MEM indicated in the thick-bordered box means that the memory device MEM has become almost full of a predetermined amount of data.

Figure 2A:
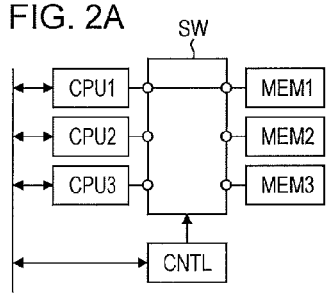
FIGS. 2A through 2F illustrate an example of an operation performed by the information processing system illustrated in FIG. 1.

In FIG. 2A, the CPU1 writes captured data into the memory device MEM1. After writing a predetermined amount of data into the memory device MEM1, the CPU1 issues a connect request to the control device CNTL.

Figure 2B:
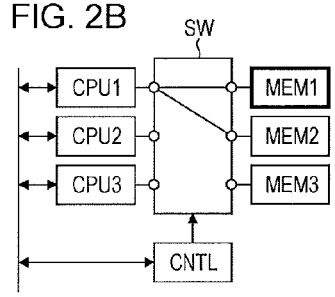

Then, in FIG. 2B, in response to the connect request, the control device CNTL controls the switching device SW so that the memory device MEM2 may be connected to the CPU1. The CPU1 may write data into the memory devices MEM1 and MEM2 at the same time. After starting to write data into the memory device MEM2, the CPU1 issues a disconnect request to the control device CNTL.

Figure 2C:
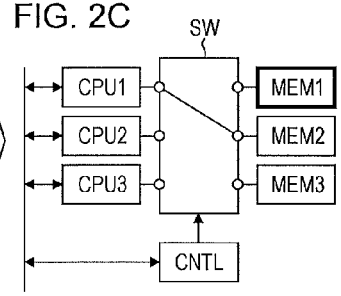

In FIG. 2C, in response to the disconnect request, the control device CNTL controls the switching device SW so that the memory device MEM1 may be disconnected from the CPU1. Thereafter, the CPU1 writes captured data into the memory device MEM2. After writing a predetermined amount of data into the memory device MEM2, the CPU1 issues a connect request to the control device CNTL.

In this manner, the control device CNTL controls the switching device SW so that the memory device MEM2 into which data will be written may be connected to the CPU1 and so that the memory device MEM1 into which data has been written may be disconnected from the CPU1. Accordingly, the CPU1 may access the memory device MEM2 without being influenced by interference of the memory device MEM1. That is, when the CPU1 writes data into the memory device MEM2, the interference of the other memory devices MEM1 and MEM3 into which data will not be written may be avoided. This enables the CPUs to maintain the performance in writing data into the memory devices MEMs.

Figure 2F:
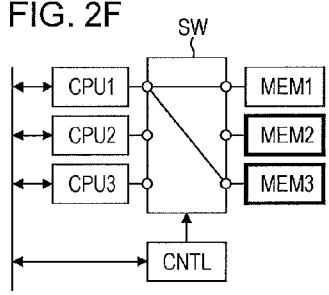
Figure 2E:
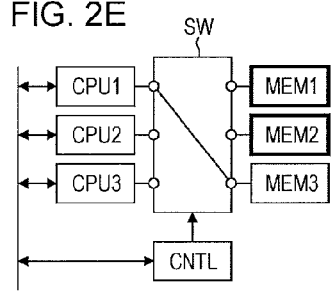
Figure 2D:
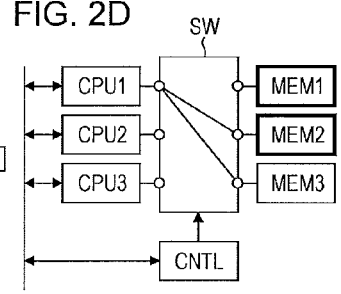

Then, in FIG. 2D, in response to the connect request issued by the CPU1, the control device CNTL controls the switching device SW so that the memory device MEM3 may be connected to the CPU1, as in the memory device MEM2 connected to the CPU1 in FIG. 2B. The CPU1 may write captured data into the memory devices MEM2 and MEM3, and after starting to write data into the memory device MEM3, the CPU1 issues a disconnect request to the control device CNTL.

Then, in FIG. 2E, in response to the disconnect request, the control device CNTL controls the switching device SW so that the memory device MEM2 may be disconnected from the CPU1. Thereafter, the CPU1 writes captured data into the memory device MEM3. After writing a predetermined amount of data into the memory device MEM3, the CPU1 issues a connect request to the control device CNTL.

Then, in FIG. 2F, since there is no unused memory device MEM into which data has not been written, the control device CNTL controls the switching device SW in response to the connect request so that a memory device MEM storing older data than data stored in the other memory devices MEMs may be connected to the CPU1. In this example, the control device CNTL controls the switching device SW so that the memory device MEM1 storing the oldest data may be connected to the CPU1. The CPU1 writes captured data into the memory device MEM3 and also overwrites data stored in the memory device MEM1 with captured data.

Thereafter, the CPU1 sequentially overwrites older data stored in the memory devices MEMs with captured data under the control of the control device CNTL. In this manner, when there is no unused memory device MEM into which data has not been written, the CPU1 overwrites old data stored in a memory device MEM with new data, thereby making it possible to store captured data by using a limited number of memory devices MEMs.

The number of memory devices MEMs used for data capturing (hereinafter may also be referred to as "data-capturing MEMs") disposed in the information processing system SYS is determined by a retention period for which data will be retained in the memory devices MEMs. In this example, the data retention period has expired in the memory device MEM1 illustrated in FIG. 2F, and thus, data stored in the memory device MEM1 is not an object to be searched for.

FIGS. 3A through 3E illustrate another example of an operation performed by the information processing system SYS illustrated in FIG. 1. FIGS. 3A through 3E also illustrate a control method for the information processing system SYS. The operation illustrated in FIGS. 3A through 3E is implemented by executing a search program, which is one of control programs, by the control device CNTL.

Figure 3A:
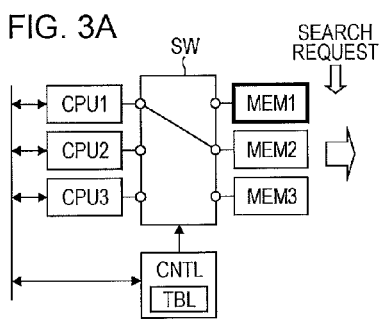
FIGS. 3A through 3E illustrate another example of an operation performed by the information processing system illustrated in FIG. 1.

In FIG. 3A, which illustrates a state similar to that in FIG. 2C, the control device CNTL receives a search request from an external source (for example, a data center), outside the information processing system SYS.

Figure 3B:
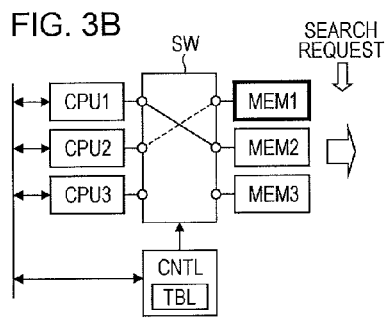

In FIG. 3B, in response to the search request, the control device CNTL controls the switching device SW so that one of the memory devices MEM1 and MEM2 storing data may be connected to the CPU2.

The control device CNTL has, for example, a storage unit TBL in which time information indicating a date and a time at which data was generated (that is, a date and a time at which data was captured) is stored for each memory device into which data has been written. For example, the control device CNTL writes a time at which data written into each memory device MEM for the first time was captured into the storage unit TBL. The storage unit TBL may be disposed outside the control device CNTL.

The control device CNTL specifies, on the basis of the time information stored in the storage unit TBL, a memory device MEM (in this example, the MEM1) in which data corresponding to time information indicated in a search key included in a search request is stored, and then controls the switching device SW so that the specified memory device MEM may be connected to the CPU2. In FIGS. 3B and 3D, the broken lines within the switching device SW indicate that the CPU2 which performs a search operation and a memory device MEM to be searched are connected to each other.

The CPU2 searches for data stored in the memory device MEM1 in response to a search request (search key) received through the control device CNTL, and informs the control device CNTL of a search result. In this manner, the CPU2 and the memory device MEM1 operate as a search server for searching for data in response to a search request.

Figure 3C:
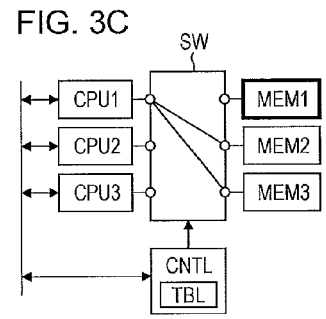

In FIG. 3C, if the memory device MEM which has been instructed to be searched by a search request is the memory device MEM2 which is currently capturing data, the control device CNTL controls the switching device SW so that the memory device MEM3 may be connected to the CPU1, as in a manner similar to FIG. 2D.

Then, as illustrated in FIG. 3D, the control device CNTL controls the switching device SW so that the memory device MEM2 may be disconnected from the CPU1. In this case, even if the amount of data written into the memory device MEM2 is less than a predetermined amount, it is assumed that the predetermined amount of data has been written into the memory device MEM2 (MEM2 indicated in the thick-bordered box in FIG. 3D). Then, the control device CNTL controls the switching device SW so that the memory device MEM2 disconnected from the CPU1 may be connected to the CPU2 and so that the CPU2 may perform a search operation. With this arrangement, a memory device MEM into which data is written by the CPU1 does not coincide with a memory device MEM subjected to a search operation performed by the CPU2, thereby enabling the CPU1 to stably write data into the memory device MEM without decreasing the bandwidth of the memory device MEM.

Figure 3E:
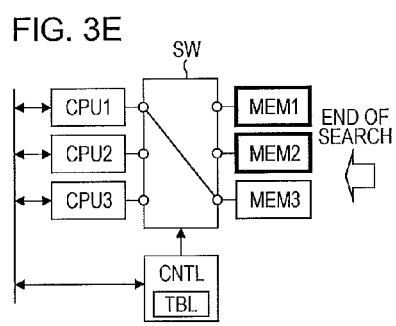
Figure 3D:
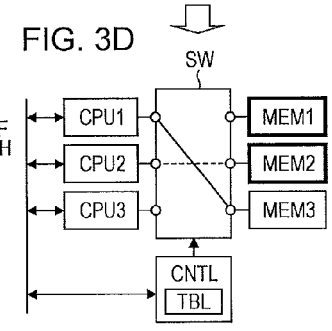

Then, as illustrated in FIG. 3E, when, for example, a search operation responding to a search request has finished, the control device CNTL controls the switching device SW so that the memory device MEM2 may be disconnected from the CPU2, and the CPU2 and the memory device MEM2 may complete the operation as a search server.

In this embodiment, a search operation performed in response to a search request is executed by the CPU2, which is different from the CPU1 which performs a data capturing operation. Since the CPU1 operating as a capture server does not perform a search operation, it is able to concentrate on a capturing operation. As a result, the CPU1 is able to stably write data which demands a high throughput, such as voice data, into the MEM1 through MEM3 regardless of whether or not there is a search request.

Figure 4A:
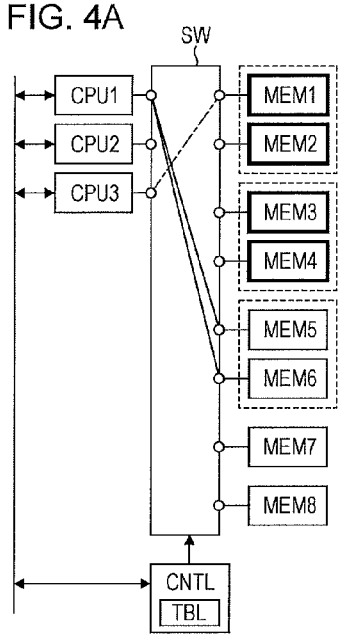
FIGS. 4A through 4C illustrate still another example of an operation performed by the information processing system illustrated in FIG. 1.
Figure 4B:
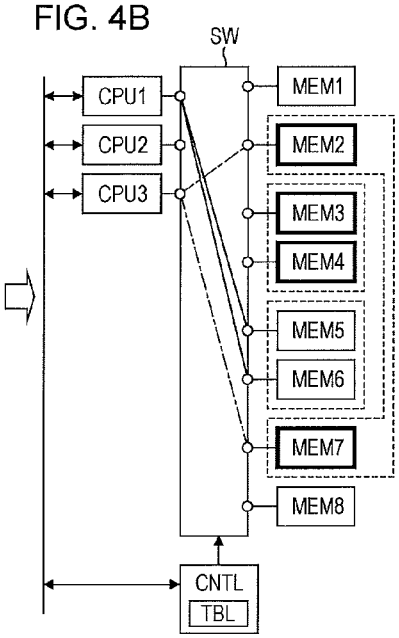
Figure 4C:
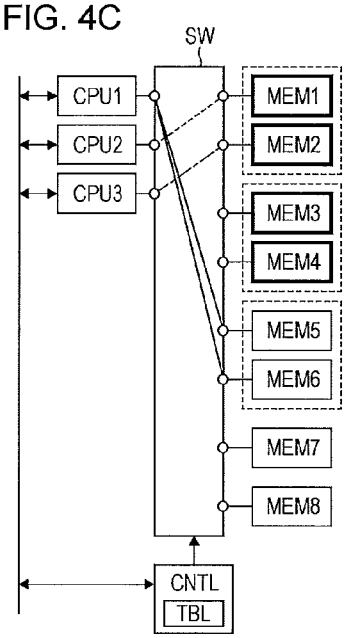

FIGS. 4A through 4C illustrate another example of an operation performed by the information processing system SYS illustrated in FIG. 1. FIGS. 4A through 4C also illustrate a control method for the information processing system SYS. The operation illustrated in FIGS. 4A through 4C is implemented by executing a check program, which is one of control programs, by the control device CNTL.

In this example, the CPU1 redundantly writes captured data into a plurality of memory devices MEMs. That is, the information processing system SYS functions as redundant arrays of independent disks (RAID) RAID1 which performs data mirroring. Accordingly, three pairs of memory devices (MEM1 and MEM2) (MEM3 and MEM4) and (MEM5 and MEM6) that redundantly store data therein are illustrated in FIGS. 4A through 4C. Memory devices MEM7 and MEM8 are spare memory devices which may each replace one of the memory devices MEM1 through MEM6 in case of a failure.

FIG. 4A illustrates a state in which the CPU3 checks the memory device MEM1 of the memory device pair (MEM1 and MEM2) that redundantly stores data therein in the state illustrated in FIG. 2E. In FIGS. 4A through 4C, the long dashed dotted lines within the switching device SW indicate the CPU3 which performs a checking operation and a memory device MEM to be checked are connected to each other. The CPU1 redundantly writes data into the memory device pair (MEM5 and MEM6) independently of the CPU3 while the CPU3 is checking the memory device MEM1.

The control device CNTL selects a memory device MEM to be checked from among memory devices MEMs (in this example, MEM1 through MEM4) which are not subjected to a capturing operation by the CPU1. After finishing checking the memory device MEM1, the CPU3 informs the control device CNTL of a check result. In this manner, the CPU3 serves as a check server which checks data stored in memory devices MEMs. After receiving a check result concerning the memory device MEM1 from the CPU3, the controller CNTL controls the switching device SW so that the memory device MEM1 may be disconnected from the CPU3.

In FIG. 4B, if a check result indicates an occurrence of a failure of the memory device MEM1, the control device CNTL controls the switching device SW so that the memory device MEM2 and the unused memory device MEM7 may be connected to the CPU3. The control device CNTL then instructs the CPU3 to copy redundant data stored in the memory device MEM2 into the memory device MEM7. The CPU3 then copies the redundant data stored in the memory device MEM2 into the memory device MEM7.

Then, the control device CNTL changes the allocation of a memory device MEM to the CPU1 from the failed memory device MEM1 to the memory device MEM7. After this change, when writing data into the memory device MEM2, the CPU1, which serves as a capture server, also writes redundant data into the memory device MEM7 instead of the memory device MEM1.

After copying redundant data stored in the memory device MEM2 into the memory device MEM7, the control device CNTL controls the switching device SW so that the memory devices MEM2 and MEM7 may be disconnected from the CPU3.

In this manner, regardless of a data writing operation performed by the CPU1, the control device CNTL is able to detect a failure in the memory device MEM1 and to copy redundant data from the failed memory device MEM1 and the memory device MEM2, which forms a pair with the memory device MEM1, into the memory device MEM7. That is, independently of an operation for writing data into a memory device MEM performed by the CPU1, the control device CNTL is able to detect and correct an error occurring in another memory device MEM which stores data therein.

If a check result indicates an error which may be corrected, the control device CNTL controls the switching device SW so that the memory devices MEM1 and MEM2 may be connected to the CPU3. The control device CNTL then instructs the CPU3 to copy data stored in the memory device MEM2 into the memory device MEM1 in which an error has occurred. The CPU3 then copies the data stored in the memory device MEM2 into the memory device MEM1, thereby correcting for an error occurred in the memory device MEM1. After correcting for an error in the memory device MEM1, the control device CNTL controls the switching device SW so that the memory devices MEM1 and MEM2 may be disconnected from the CPU3.

In this manner, regardless of a data writing operation performed by the CPU1, the control device CNTL is able to detect an error occurring in the memory device MEM1 and to copy data stored in the memory device MEM2, which forms a pair with the memory device MEM1, into the memory device MEM1, thereby correcting for an error in the memory device MEM1. In other words, since the CPU1, which serves as a capture server, operates independently of the CPU3, which checks data, it is able to stably write data into memory devices MEMs.

FIG. 4C illustrates a state after a correctable error occurred in the memory device MEM1 has been corrected. After checking the memory device MEM1, the control device CNTL controls the switching device SW so that the memory device MEM2 to be subsequently checked may be connected to the CPU3. Then, the control device CNTL instructs the CPU3 to check the memory device MEM2. In this manner, the control device CNTL sequentially switches the memory devices MEMs to be connected to the CPU3 and causes the CPU3 to check the memory devices MEMs.

FIG. 4C illustrates an example in which the control device CNTL receives a search request and causes the CPU2 to perform a search operation while the CPU1 is performing a capturing operation and the CPU3 is performing a checking operation. In this example, the control device CNTL refers to the storage unit TBL and detects that data to be searched for is contained in the memory device pair (MEM1 and MEM2). Then, the control device CNTL causes the CPU2 to perform a search operation by using the memory device MEM1 of the memory device pair (MEM1 and MEM2), which is not subjected to a checking operation.

In this manner, even while the memory devices MEMs are being sequentially checked, the CPU1 operating as a capture server is able to concentrate on a capturing operation since it does not perform a checking operation. As a result, even when a checking operation is performed, the CPU1 is able to stably write data which demands a high throughput, such as voice data, into the MEM1 through MEM3, as in the case illustrated in FIGS. 3A through 3E. Additionally, as illustrated in FIG. 4C, even while a checking operation, a search operation, and a capturing operation are being performed at the same time, the CPU1 is able to stably write data into the memory devices MEM5 and MEM6.

In the embodiment illustrated in FIGS. 1 through 4C, by writing captured data into the memory devices MEMs which are sequentially connected to the CPU1, the interference of other memory devices MEMs may be avoided, thereby maintaining the performance in writing data. Even when a capturing operation and at least one of a search operation and a checking operation is performed at the same time, the CPU1 is able to stably write captured data into the memory devices MEMs without being influenced by a search operation or a checking operation.

FIG. 5 illustrates another embodiment of an information processing system, a control device, a control program for the control device, and a control method for the information processing system.

The information processing system SYS of this embodiment includes a motherboard pool 100, a storage drive pool 200, a connecting device 300, and a control device 400. The motherboard pool 100 includes a plurality of motherboards MBs (MB1, MB2, MB3, MB4, MB5, MB6, MB7, and MB8). Each motherboard MB includes a CPU and a memory device MD (main memory device), such as a memory module. In FIG. 5, CPUs and memory devices MDs are not illustrated, except for the motherboard MB1, and the configurations of the motherboards MB2 through MB8 are the same as or similar to the configuration of the motherboard MB1. Instead of CPUs, the information processing system SYS may include processors operated by executing a program, such as DSPs or GPUs.

Multiple CPUs may be mounted on each motherboard MB, and multiple processor cores may be mounted on each CPU. The memory device MD is, for example, a DIMM including DRAM chips. The motherboards MBs are connected to a network NW. Each of the motherboards MBs is an example of an information processing apparatus. In this example, the motherboard pool 100 includes eight motherboards MB1 through MB8, but the number of motherboards MBs is not restricted to eight.

Figure 9:
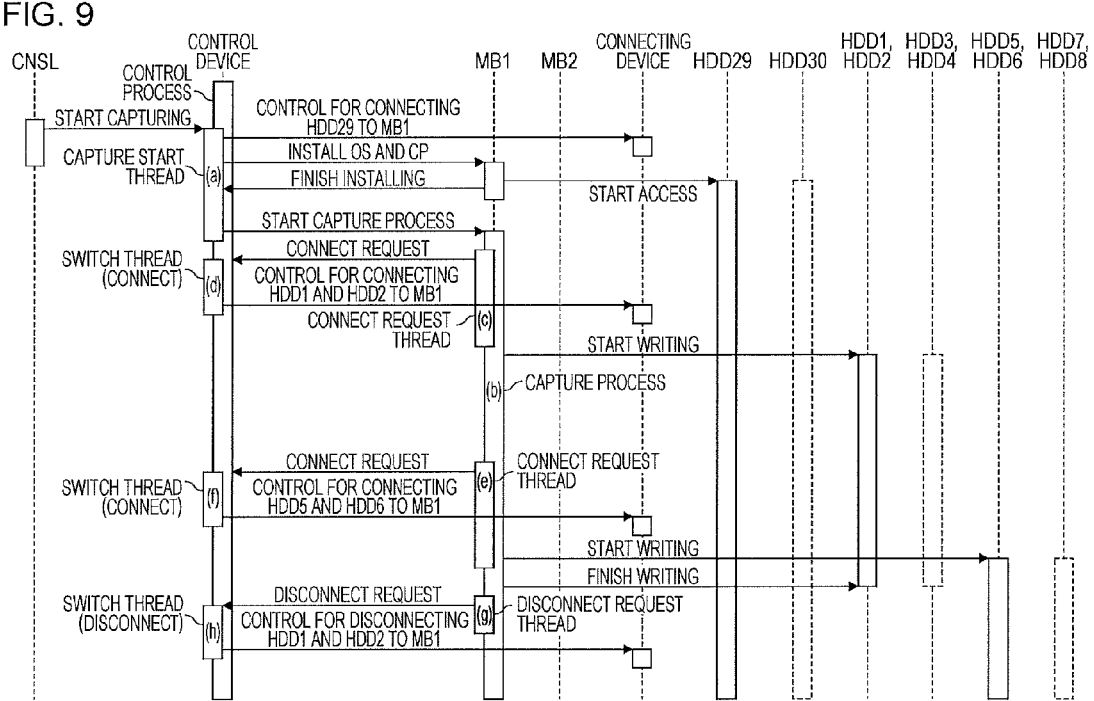
FIG. 9 illustrates an example of a sequence of a capturing operation performed by the information processing system illustrated in FIG. 5.

FIG. 5 illustrates the configuration of a system which implements a data capturing operation illustrated in FIG. 9. Input ports of the motherboards MB1 and MB2 are each connected to a mirror port MP of a switching device 500. The input ports of the motherboards MB1 and MB2 may be each connected to a mirror port MP of the switching device 500 via a switch, which is one type of relay device.

The switching device 500 is disposed in, for example, a data center, and functions as, for example, a switch which monitors data transmitted through a communication line and from which data is captured. Data to be captured is, for example, voice data obtained from conversation being carried out on cellular phones. The information processing system SYS of this embodiment is operated as a capturing device that captures voice data supplied from the switching device 500 in real time.

The information processing system SYS is also operated as a search device that searches, upon the occurrence of a communication failure in a communication line, for voice data obtained at a date and a time at which the communication failure occurred. Then, a computer disposed in the data center analyzes noise, for example, contained in the searched voice data, thereby determining the cause of the communication failure. The information processing system SYS is also operated as an error correcting device that corrects an error occurring in data stored in the storage drive pool 200.

The storage drive pool 200 includes a plurality of hard disk drives (HDD1 through HDD32). Each hard disk drive HDD is an example of a memory device. In this example, the storage drive pool 200 includes 32 hard disk drives HDD1 through HDD32, but the number of hard disk drives HDDs is not restricted to 32. In the following description, the hard disk drives HDDs are also called HDDs. Instead of HDDs, the storage drive pool 200 may include flash storages, such as SDDs, each including a plurality of flash memory chips, and a DIMM, as memory devices.

Figure 6:
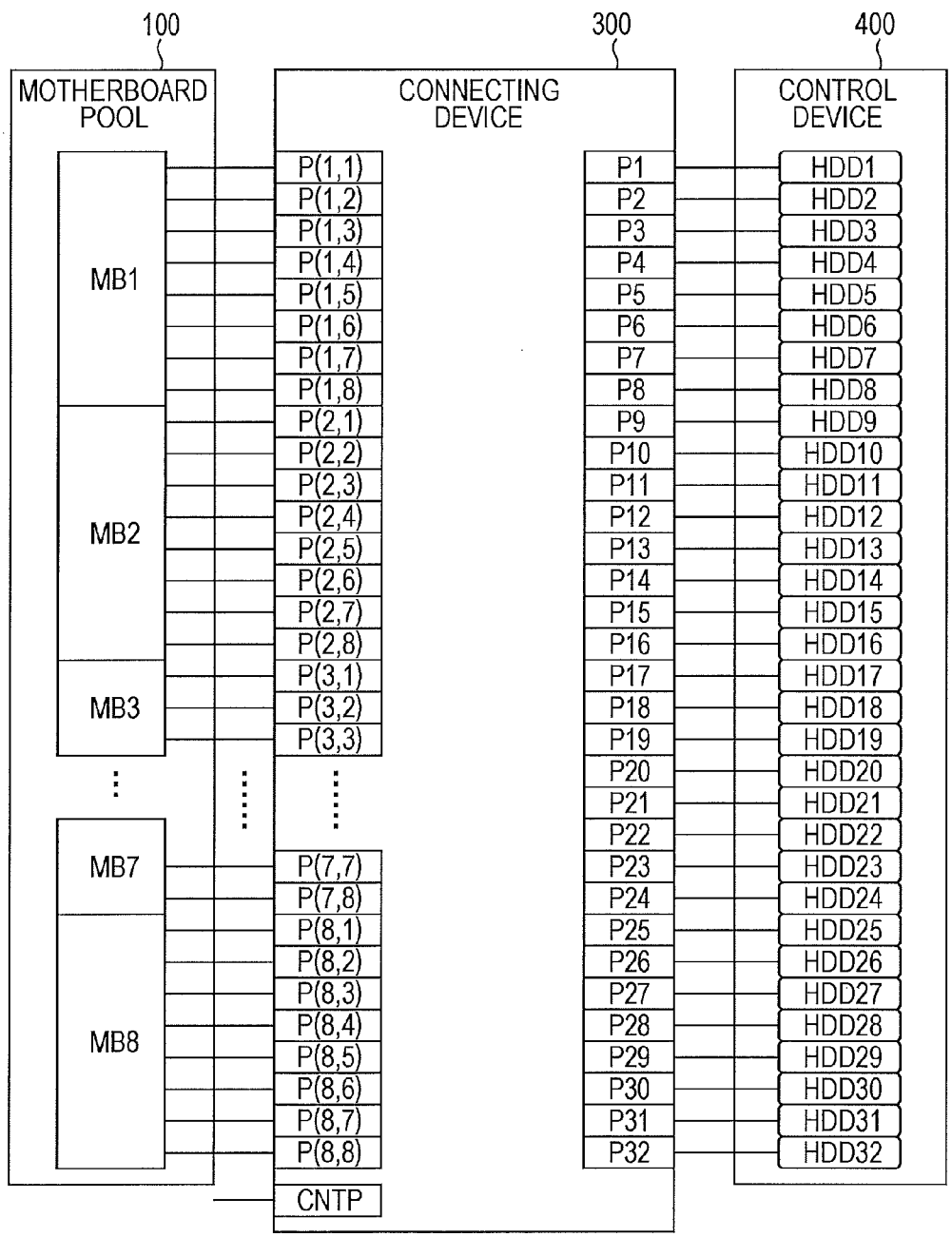
FIG. 6 illustrates an example of a connecting device illustrated in FIG. 5.

The connecting device 300 is an interconnect device that connects a motherboard MB to at least one of the HDDs. An example of the connecting device 300 is illustrated in FIG. 6. The data transfer rate between a motherboard MB and HDDs connected to each other via the connecting device 300 is, for example, 6 gigabits per second (Gbps) per HDD. That is, an HDD connected to a motherboard MB has access performance comparable to a server local disk, and the motherboard MB and the HDD connected to each other via the connecting device 300 are operable as an information processing apparatus, such as a server.

A motherboard MB which is not connected to any HDD is an unused motherboard MB which does not contribute to the operation of the information processing system SYS. An HDD which is not connected to any motherboard MB is an unused HDD which does not contribute to the operation of the information processing system SYS. The supply of power to unused motherboards MBs and unused HDDs may be interrupted under the control of the control device 400.

FIG. 5 schematically illustrates a state in which the motherboard MB1 and the HDD1, HDD2, and HDD29 are connected to each other, and the motherboard MB2 and the HDD3, HDD4, and HDD30 are connected to each other. An operating system (OS) and a capture program CP for writing data into HDDs are installed in the HDD29 and HDD30.

The motherboard MB1 writes captured data into the HDD1 and HDD2 by executing the capture program CP, and the motherboard MB2 writes captured data into the HDD3 and HDD4 by executing the capture program CP.

The number M of HDDs used for data capturing is determined by equation (1):

$$M = MSP/HSP \quad (1)$$

where MSP denotes the maximum speed at which data is captured and HSP denotes the data transfer rate per HDD.

The number M of HDDs is determined by rounding up the result of equation (1). The maximum speed MSP is a constant which depends on a communication protocol used for data capturing. The data transfer rate per HDD is an actually measured value or is determined by specifications of the HDDs. For example, the speed at which the data center captures data is 10 Gbps, and the data transfer rate per HDD is 100 megabytes per second (MB/s) when data is sequentially written. In this case, the number of HDDs is 13. If the motherboard MB1 redundantly writes data into two HDDs, twice as many HDDs as the number M of HDDs determined by equation (1) are connected to the motherboard MB1.

The control device 400 is connected to the network NW and a control port CNTP of the connecting device 300. The control device 400 controls the connecting device 300 via the control port CNTP so that an HDD may be connected to a motherboard MB or so that an HDD may be disconnected from a motherboard MB. The control device 400 also has a function of interrupting the supply of power to a motherboard MB which is not connected to any HDD and a function of interrupting the supply of power to an HDD which is not connected to any motherboard MB. That is, the supply of power to motherboards MBs and HDDs which do not function as an information processing apparatus, such as a server, is interrupted, and thus, power is not consumed in such MBs and HDDs.

The network NW is, for example, a local area network (LAN). In this embodiment, in addition to the motherboards MB1 through MB8 and the control device 400, a console CNSL and a storage device BT are connected to the network NW. The console CNSL is operated by an operator and controls the information processing system SYS. For example, in response to an instruction input by using the console CNSL, the information processing system SYS performs an operation for writing data into an HDD or an operation for searching for data stored in an HDD.

The storage device BT is, for example, a hard disk drive HDD, and stores therein an OS and software (application programs) executed by the CPU of a motherboard MB. The OS and software are installed in a predetermined HDD in response to an instruction input by using the console CNSL and are executable by the CPU of a motherboard MB.

FIG. 6 illustrates an example of the connecting device 300 illustrated in FIG. 5. The connecting device 300 includes ports $P(i, j)$ connected to the motherboard pool 100 and ports $Pn$ connected to the storage drive pool 200. In a port $P(i, j)$, $i$ is one of integers 1 to 8 and denotes a motherboard MB number, and $j$ is one of integers 1 to 8 and denotes a port number of each motherboard MB. That is, each port $P(i, j)$ is connected to associated one of eight ports of the motherboard MBi. In a port Pn, n is one of integers 1 to 32 and denotes an HDD number. In the following description, a port $P(i, j)$ is also used for indicating a motherboard MB, and a port Pn is also used for indicating an HDD.

Figure 7:
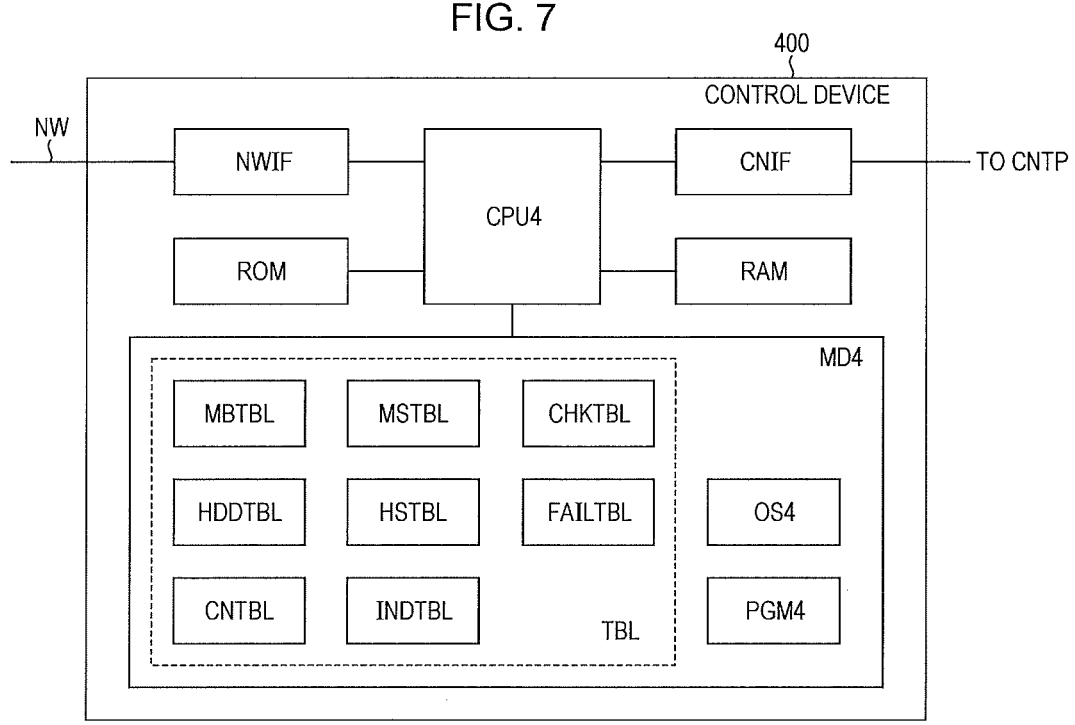
FIG. 7 illustrates an example of the control device illustrated in FIG. 5.

FIG. 7 illustrates an example of the control device 400 illustrated in FIG. 5. The control device 400 includes a network interface NWIF, a CPU4, a connection interface CNIF, a read only memory (ROM), a random access memory (RAM), and a memory device MD4 (main memory device). The CPU4 is connected to the network NW via the network interface NWIF and is connected to the control port CNTP of the connecting device 300 via the connection interface CNIF. Multiple CPU4 may be loaded in the control device 400, and multiple processor cores may be loaded in the CPU4.

The ROM stores therein, for example, a boot program executed by the CPU4 when starting the control device 400. The RAM stores therein, for example, a program executed by the CPU4 after the control device 400 is started.

The memory device MD4 is, for example, a DIMM including DRAM chips. The configuration of the control device 400 is similar to that of the motherboard MB. Accordingly, one of the motherboards MBs disposed within the motherboard pool 100 may be used as the control device 400.

The CPU4 of the control device 400 controls eight tables TBLs (MBTBL, HDDTBL, CNTBL, MSTBL, HSTBL, INDTBL, CHKTBL, and FAILTBL) allocated to memory areas of the memory device MD4. On the basis of information stored in the eight tables TBLs, the CPU4 controls the connection between the motherboards MBs and the HDDs to be implemented by the switching device 300, performs a search operation, and manages errors occurring in the HDDs. Examples of the tables MBTBL, HDDTBL, CNTBL, MSTBL, HSTBL, INDTBL, CHKTBL, and FAILTBL are illustrated in FIG. 8.

If the information processing system SYS does not manage errors occurring in the HDDs, the memory device MD4 does not have storage areas to which the tables CHKTBL and FAILTBL are allocated.

In addition to the eight tables TBLs, the memory device MD4 has an area in which an OS4 and a control program PGM4 executed by the CPU4 are stored. By executing the boot program, the CPU4 transfers the OS4 and the control program PGM4 from the memory device MD4 to the RAM. Then, the CPU4 executes the OS4 and the control program PGM4 in the RAM, thereby implementing the functions of the control device 400.

Figure 8:
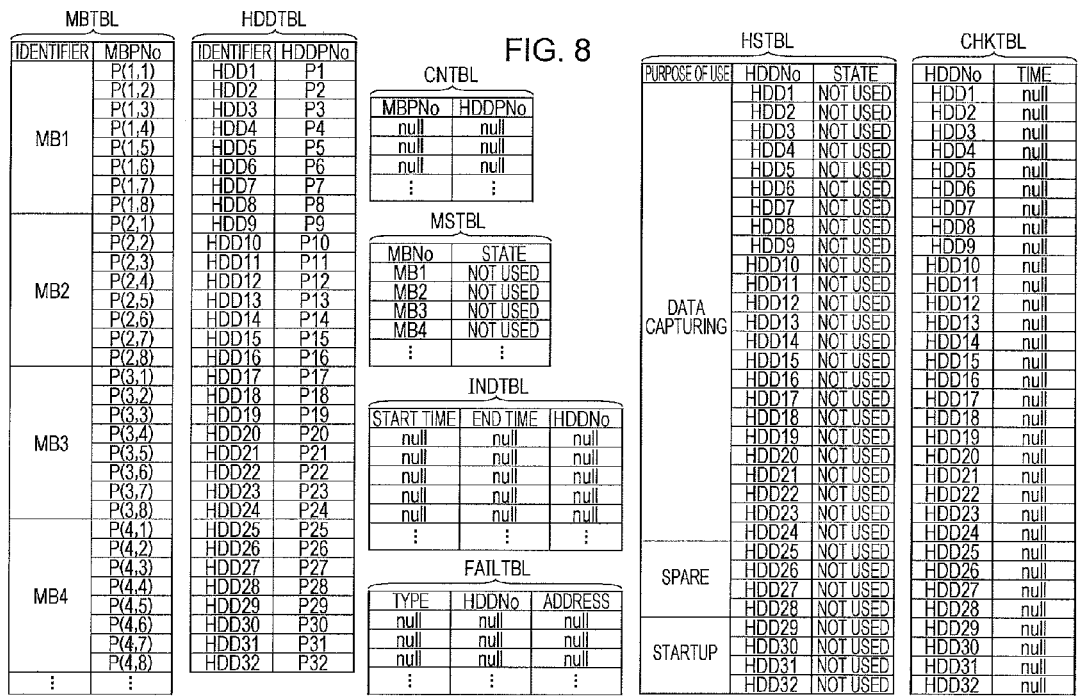
FIG. 8 illustrates examples of tables allocated within a memory device illustrated in FIG. 7.

FIG. 8 illustrates examples of MBTBL, HDDTBL, CNTBL, MSTBL, HSTBL, INDTBL, CHKTBL, and FAILTBL allocated to the memory areas of the memory device MD4 illustrated in FIG. 7. In a field "MBPNo" of the tables MBTBL and CNTBL, the port numbers of the connecting device 300 connected to the motherboards MB are stored. In a field "HDDPNo" of the tables HDDTBL and CNTBL, the port numbers of the connecting device 300 connected to the HDDs are stored. In a field "MBNo" of the table MSTBL, the motherboard MB numbers are stored. In a field "HDDNo" of the tables INDTBL, HSTBL, CHKTBL, and FAILTBL, the HDD numbers are stored. In the tables, "null" means blank and indicates that there is no information in an associated field.

FIG. 8 illustrates a state in which the tables MBTBL and HDDTBL are set after the control device 400 is started. Accordingly, the tables CNTBL, MSTBL, and HSTBL are initial states.

The table MBTBL stores therein connection relations between the ports of the motherboards MBs and the connecting device 300 illustrated in FIG. 6. The table HDDTBL stores therein connection relations between the ports of the HDDs and the connecting device 300 illustrated in FIG. 6. Information concerning the tables MBTBL and HDDTBL is determined by the hardware configuration of the information processing system SYS, and is read from a setup file and stored in the memory device MD4 when starting the information processing system SYS. The setup file may be stored in the ROM or may be transferred from an external source outside the control device 400.

The table CNTBL stores therein information concerning the specifications of connection relations between the motherboards MBs and the HDDs implemented by the connecting device 300 illustrated in FIG. 6. That is, the connection relations between the motherboards MBs and the HDDs connected via the connecting device 300 are indicated by the table CNTBL. The table MSTBL indicates the usage state of the motherboards MBs. The table INDTBL stores therein, for each HDD, index information concerning time stamps (start time and end time) indicating times at which data was captured. The table INDTBL is an example of a storage unit which stores therein, for each HDD, time information indicating a time at which data written into the HDD was generated. The time at which data was generated is a time at which data was captured, and includes date and time information.

The table HSTBL indicates the usage state of the HDDs. In this embodiment, as indicated in the table HSTBL, 24 HDDs, that is, the HDD1 through HDD24, are used for data capturing (hereinafter such HDDs may also be referred to as "data-capturing HDDs"), four HDDs, that is, the HDD25 through HDD28, are used as spare HDDs, and four HDDs, that is, the HDD29 through HDD32 are used for starting the OS and the capture program CP (such HDDs may also be referred to as "startup HDDs").

The table CHKTBL stores therein information concerning times at which the HDDs were checked. The table FAILTBL stores therein information concerning a failed HDD or information concerning a memory area of an HDD in which an error has occurred. In a field "type" of the table FAILTBL, information indicating the type of failure, that is, whether an HDD has failed or a correctable error has occurred in an HDD, is stored. In a field "address" of the table FAILTBL, information indicating the address of an area in which a correctable error has occurred is stored.

FIG. 9 illustrates an example of a sequence of a capturing operation performed by the information processing system SYS illustrated in FIG. 5. That is, FIG. 9 illustrates an example of a sequence concerning the information processing system SYS which operates as a capturing device. In the following description, the operation performed by the control device 400 includes an operation performed by the CPU4 of the control device 400, and the operation performed by the motherboards MBs includes an operation performed by the CPUs of the motherboards MBs.

In this embodiment, as illustrated in FIG. 5, each of the motherboards MB1 and MB2 is operated as a capturing device, and stores voice data supplied through the associated mirror port MP of the switching device 400 in an HDD. However, for the sake of simple representation, in FIG. 9, the sequence concerning the motherboard MB2 is omitted, and operations performed by the HDD30, HDD3, HDD4, HDD7, and HDD8 connected to the motherboard MB2 are indicated by broken-line-bordered rectangular boxes. The motherboard MB1 writes captured data into the HDD1 and HDD2 in a distributed manner, and the motherboard MB2 writes captured data into the HDD3 and HDD4 in a distributed manner.

The sequence of a capturing operation performed by the motherboard MB2 is similar to that of the motherboard MB1. Concerning the sequence of the capturing operation performed by the motherboard MB2, MB1, HDD29, HDD1, HDD2, HDD5, and HDD6 illustrated in FIG. 9 may be read as MB2, HDD30, HDD3, HDD4, HDD7, and HDD8, respectively.

A control process executed by the control device 400 is started prior to the start of the sequence illustrated in FIG. 9. The control process is executed by the control program PGM4 illustrated in FIG. 7. At the start of the sequence illustrated in FIG. 9, the connections between all the motherboards MBs and all the HDDs are canceled. That is, as illustrated in FIG. 8, all the fields of the table CNTBL indicate "null", and the usage states of the tables MSTBL and HSTBL indicate "not used". A control program which executes a capture start thread and a switch thread started by the control process is stored in advance in the memory device MD4 and the RAM illustrated in FIG. 7.

The control device 400 executes the capture start thread in response to a capture start instruction input through the console CNSL ((a) of FIG. 9). For example, the capture start thread outputs control information for connecting the motherboard MB1 and the HDD29 to the connecting device 300. The connecting device 300 connects the motherboard MB1 and the HDD29 on the basis of the control information. After the motherboard MB1 and the HDD29 have been connected to each other, the capture start thread installs the OS and the capture program CP into the HDD29 through the use of the motherboard MB1. In this case, installation may be performed by transferring data from the storage device BT illustrated in FIG. 5 to the HDD29 by using a remote installation method, such as a kickstart installation method.

After installing the OS and the capture program CP in the HDD29, the motherboard MB1 is restarted. The CPU of the motherboard MB1 starts the OS and starts to access the HDD29. The motherboard MB1 sends an installation completion response indicating that installation has been completed to the control device 400.

Upon receiving the installation completion response, the capture start thread outputs an instruction to start a capture process to the motherboard MB1. In response to an instruction to start the capture process, the motherboard MB1 starts the capture process executed by the capture program CP ((b) of FIG. 9). The capture process starts a connect request thread and outputs a connect request to connect HDDs which will store captured data to the control device 400 ((c) of FIG. 9).

In response to the connect request, the control process starts the switch thread, and outputs control information for connecting the HDD1 and HDD2 to the motherboard MB1 to the connecting device 300 ((d) of FIG. 9). In response to the control information, the connecting device 300 connects the HDD1 and HDD2 to the motherboard MB1. After connecting the HDD1 and HDD2 to the motherboard MB1, the capture process starts a capturing operation and writes voice data into the HDD1 and HDD2 in a distributed manner.

After a predetermined amount of data has been stored in each of the HDD1 and HDD2, the capture process starts the connect request thread and outputs a connect request to connect HDDs which will store captured data to the control device 400 ((e) of FIG. 9).

In response to the connect request, the control process starts the switch thread and outputs control information for connecting the motherboard MB1 and the HDD5 and HDD6 to the connecting device 300 ((f) of FIG. 9). In response to the control information, the connecting device 300 connects the HDD5 and HDD6 to the motherboard MB1. After connecting the HDD5 and HDD6 to the motherboard MB1, the capture process starts a capturing operation and writes voice data into the HDD5 and HDD6 in a distributed manner. That is, the motherboard MB1 writes voice data written into the HDD1 and HDD2 also into the HDD5 and HDD6.

After starting to write data into the HDD5 and HDD6, the capture process finishes writing data into the HDD1 and HDD2. After finishing writing data into the HDD1 and HDD2, the capture process starts a disconnect request thread and outputs a disconnect request to disconnect the HDD1 and HDD2 from the motherboard MB1 to the control device 400 ((g) of FIG. 9).

In response to the disconnect request, the control process starts the switch thread and outputs control information for disconnecting the HDD1 and HDD2 from the motherboard MB1 to the connecting device 300 ((h) of FIG. 9). In response to the control information, the connecting device 300 disconnects the HDD1 and HDD2 from the motherboard MB1. Thereafter, the capture process writes data into the HDD5 and HDD6, and after a predetermined amount of data has been stored in each of the HDD5 and HDD6, the capture process starts the connect request thread and outputs a connect request to connect unused HDDs which will store captured data to the control device 400. In response to the connect request, the control process connects two unused HDDs to the motherboard MB1, and disconnects the HDD5 and HDD6 from the motherboard MB1 in response to a disconnect request. Thereafter, an operation is similarly performed, and data is sequentially written into a plurality of pairs of HDDs.

If there is no unused HDD to be connected to the motherboard MB1 in response to a connect request, the switch thread controls the connecting device 300 so that an HDD storing older data than data stored in the other HDDs may be connected to the motherboard MB1.

FIG. 10 illustrates examples of the states of the tables TBLs after the startup HDDs are connected to motherboards MBs by the capture start thread indicated by (a) of FIG. 9. In other words, FIG. 10 illustrates the states of the tables TBLs before the capture start thread starts the capture process. In FIG. 10, shaded areas are portions of the tables TBLs in which the states have changed from the states illustrated in FIG. 8. The tables MBTBL, HDDTBL, CHKTBL, and FAILTBL illustrated in FIG. 8 have not changed, and thus, an illustration of these tables is omitted in FIG. 10.

The table CNTBL indicates that the HDD29 corresponding to the port P29 is connected to the motherboard MB1 corresponding to the port P(1, 8) and that the HDD30 corresponding to the port P30 is connected to the motherboard MB2 corresponding to the port P(2, 8). The table MSTBL indicates that the motherboards MB1 and MB2 are performing a data capturing operation. The table HSTBL indicates that the HDD29 and HDD30 are used for installing and starting the OS and the capture program CP.

Power is not supplied to the motherboards MB3 and MB4, which are in the state of "not used" in the table MSTBL, and thus, power is not consumed in the motherboards MB3 and MB4. Power is not supplied to the HDDs which are in the state of "not used" in the table HSTBL, and thus, power is not consumed in such HDDs. By interrupting the supply of power to motherboards MBs and HDDs which are not operated, it is possible to reduce the power consumed in the information processing system SYS, unlike a case in which power is supplied to such MBs and HDDs.

FIG. 11 illustrates examples of the states of the tables TBLs after the capture process indicated by (b) of FIG. 9 has started to write data into the HDD1 through HDD4. In FIG. 11, shaded areas are portions of the tables TBLs in which the states have changed from the states illustrated in FIG. 10.

In the state illustrated in FIG. 11, the motherboard MB1 is writing data into the HDD1 and HDD2 in a distributed manner, and the motherboard MB2 is writing data into the HDD3 and HDD4 in a distributed manner. Accordingly, in the table CNTBL, in addition to the information illustrated in FIG. 10, information indicating that the HDD1 and HDD2 are connected to the motherboard MB1 and information indicating that the HDD3 and HDD4 are connected to the motherboard MB2 are stored.

In the table HSTBL, the states of the HDD1, HDD2, HDD3, and HDD4 are set to be "capturing". In the table INDTBL, in the fields of the start time corresponding to the HDD1 through HDD4, time t1, t2, t3, and t4, respectively, are stored. In the fields of the end time corresponding to the HDD1 through HDD4, "capturing" is stored. The time t1 through t4 each indicate a date and a time at which writing of captured data into the associated one of the HDD1 through HDD4 was started, and each indicate a date and a time at which data written into the associated one of the HDD1 through HDD4 was captured.

FIG. 12 illustrates examples of the states of the tables TBLs after the capture process has started to write data into the HDD5 through HDD8 at the same time as writing data into the HDD1 through HDD4 in response to a connect request thread indicated by (e) of FIG. 9. In FIG. 12, shaded areas are portions of the tables TBLs in which the states have changed from the states illustrated in FIG. 11.

In the table CNTBL, in addition to the information illustrated in FIG. 11, information indicating that the HDD5 and HDD6 are connected to the motherboard MB1 and information indicating that the HDD7 and HDD8 are connected to the motherboard MB2 are stored. The state of the table MSTBL is the same as that illustrated in FIG. 11. In the table HSTBL, in addition to the states of the HDD1 through HDD4, the states of the HDD5 through HDD8 are set to be "capturing". In the table INDTBL, in the fields of the start time corresponding to the HDD5 through HDD8, time t5, t6, t7, and t8, respectively, are stored. In the fields of the end time corresponding to the HDD5 through HDD8, "capturing" is stored. As in the time t1 through t4, the time t5 through t8 each indicate a date and a time at which writing of captured data into the associated one of the HDD5 through HDD8 was started, and each indicate a date and a time at which data written into the associated one of the HDD5 through HDD8 was captured.

FIG. 13 illustrates examples of the states of the tables TBLs after the HDD1 and HDD2 are disconnected from the motherboard MB1 and the HDD3 and HDD4 are disconnected from the motherboard MB2 by the disconnect request thread indicated by (g) of FIG. 9. In FIG. 13, shaded areas are portions of the tables TBLs in which the states have changed from the states illustrated in FIG. 12.

From the table CNTBL illustrated in FIG. 12, information indicating the connection between the motherboard MB1 and the HDD1 and HDD2 and information indicating the connection between the motherboard MB2 and the HDD3 and HDD4 have been deleted. The MSTBL is the same as that illustrated in FIG. 11.

In the table HSTBL, the states of the HDD5, HDD6, HDD7, and HDD8 are maintained at "capturing", and the states of the HDD1, HDD2, HDD3, and HDD4 are set to be "standby". The state "standby" indicates that the HDD1, HDD2, HDD3, and HDD4 are retaining valid capture data therein.

Power is not supplied to the HDDs which are in the state of "not used" or "standby" in the table HSTBL, and thus, power is not consumed in such HDDs. By interrupting the supply of power to HDDs which have finished data capturing and which are retaining captured data therein, it is possible to reduce the power consumed in the information processing system SYS, unlike a case in which power is supplied to such HDDs.

In the table INDTBL, in the fields of the end time corresponding to the HDD1 through HDD4, the time t1', t2', t3', and t4', respectively, are stored. The time t1' through t4 each indicate a date and a time at which captured data was written into the associated one of the HDD1 through HDD4 for the last time, and each indicate a date and a time at which data written into the associated one of the HDD1 through HDD4 for the last time was captured.

FIG. 14 illustrates examples of the states of the tables TBLs when items of data have been stored in all the HDD1 through HDD24 used for data capturing. In FIG. 14, shaded areas are portions of the tables TBLs in which the states have changed from the states illustrated in FIG. 13.

Unlike the table CNTBL illustrated in FIG. 13, information indicating the connection between the motherboard MB1 and the HDD5 and HDD6 has been deleted from the table CNTBL illustrated in FIG. 14, and information indicating the connection between the motherboard MB1 and the HDD21 and HDD22 is stored in the table CNTBL illustrated in FIG. 14. Additionally, unlike the table CNTBL illustrated in FIG. 13, information indicating the connection between the motherboard MB2 and the HDD7 and HDD8 has been deleted from the table CNTBL illustrated in FIG. 14, and information indicating the connection between the motherboard MB2 and the HDD23 and HDD24 is stored in the table CNTBL illustrated in FIG. 14.

The table MSTBL is the same as that illustrated in FIG. 11. In the table HSTBL, the states of the HDD1 through HDD20 retaining valid capture data therein are set to be "standby", and the states of the HDD21 through HDD24 which are capturing data are set to be "capturing".

In the table INDTBL, in the fields of the start time corresponding to the HDD1 through HDD20, the time t1 through t20, respectively, are stored. In the fields of the end time corresponding to the HDD1 through HDD20, the time t1' through t20', respectively, are stored. For the sake of convenience, the numbers appended to the start time and the end time are the same as the HDD numbers. In the table INDTBL, in the fields of the start time corresponding to the HDD21 through HDD24, the time t21, t22, t23, and t24, respectively, are stored. In the fields of the end time corresponding to the HDD21 through HDD24, "capturing" is stored.

As in the time t1 through t4, the time t9 through t24 each indicate a date and a time at which writing of captured data into the associated one of the HDD9 through HDD24 was started. As in the time t1' through t4', the time t5' through t20' each indicate a date and a time at which captured data was written into the associated one of the HDD5 through HDD20 for the last time.

FIG. 15 illustrates examples of the states of the tables TBLs when old data stored in HDDs is overwritten. In FIG. 15, shaded areas are portions of the tables TBLs in which the states have changed from the states illustrated in FIG. 14.

When starting to write data into the HDD21 through HDD24, there is no data-capturing HDD in the state of "not used". Accordingly, if a predetermined amount of data has been written into each of the HDD21 through HDD24, overwriting of data is performed in the HDD1 through HDD4, which store the oldest data among the HDDs in the state of "standby".

The tables CNTBL and MSTBL are the same as those illustrated in FIG. 11. In the table HSTBL, the states of the HDD5 through HDD24 which are retaining valid data are set to be "standby", and the states of the HDD1 through HDD4 are set to be "capturing".

In the table INDTBL, in the fields of the start time corresponding to the HDD1 through HDD4, time t25, t26, t27, and t28, respectively, are stored. In the field of the end time corresponding to the HDD1 through HDD4, "capturing" is stored. Additionally, in the table INDTBL, in the fields of the end time corresponding to the HDD21 through HDD24, time t21', t22', t23', and t24', respectively, are stored. As in the time t1 through t4, the time t25 through t2 each indicate a date and a time at which writing of captured data into the associated one of the HDD1 through HDD4 was started. As in the time t1' through t4', the time t21' through t24' each indicate a date and a time at which captured data was written into the associated one of the HDD21 through HDD24 for the last time.

Figure 16:
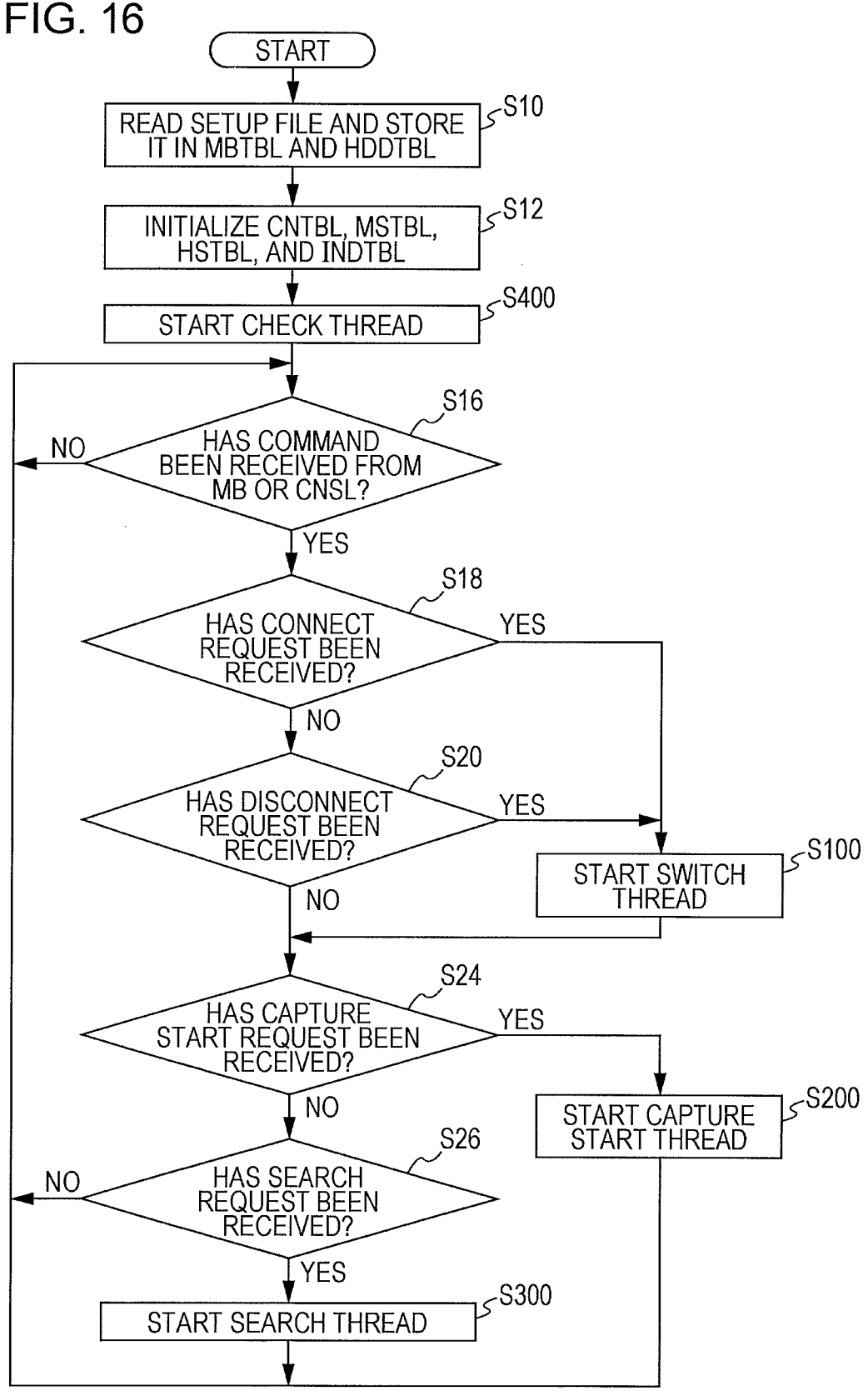
FIG. 16 illustrates an example of a control process illustrated in FIG. 9.

FIG. 16 illustrates an example of the control process illustrated in FIG. 9. The control process is implemented as a result of the CPU4 of the control device 400 illustrated in FIG. 7 executing the control program PGM4, and is automatically started after starting the control device 400.

In step S10, the control device 400 reads the setup file stored in the ROM illustrated in FIG. 7 or a storage device outside the control device 400, and stores information concerning the read setup file in the tables MBTBL and HDDTBL within the memory device MD4.

Then, in step S12, the control program PGM4 initializes the tables CNTBL, MSTBL, HSTBL, and INDTBL on the basis of the information stored in the tables MBTBL and HDDTBL. As a result, all the fields in the tables CNTBL and INDTBL are set to be "null". In the table MSTBL, the states of the motherboards MBs are set to be "not used", and in the table HSTBL, the states of the HDDs are set to be "not used". The states of the tables TBLs after step S12 is illustrated in FIG. 8.

Figure 41:
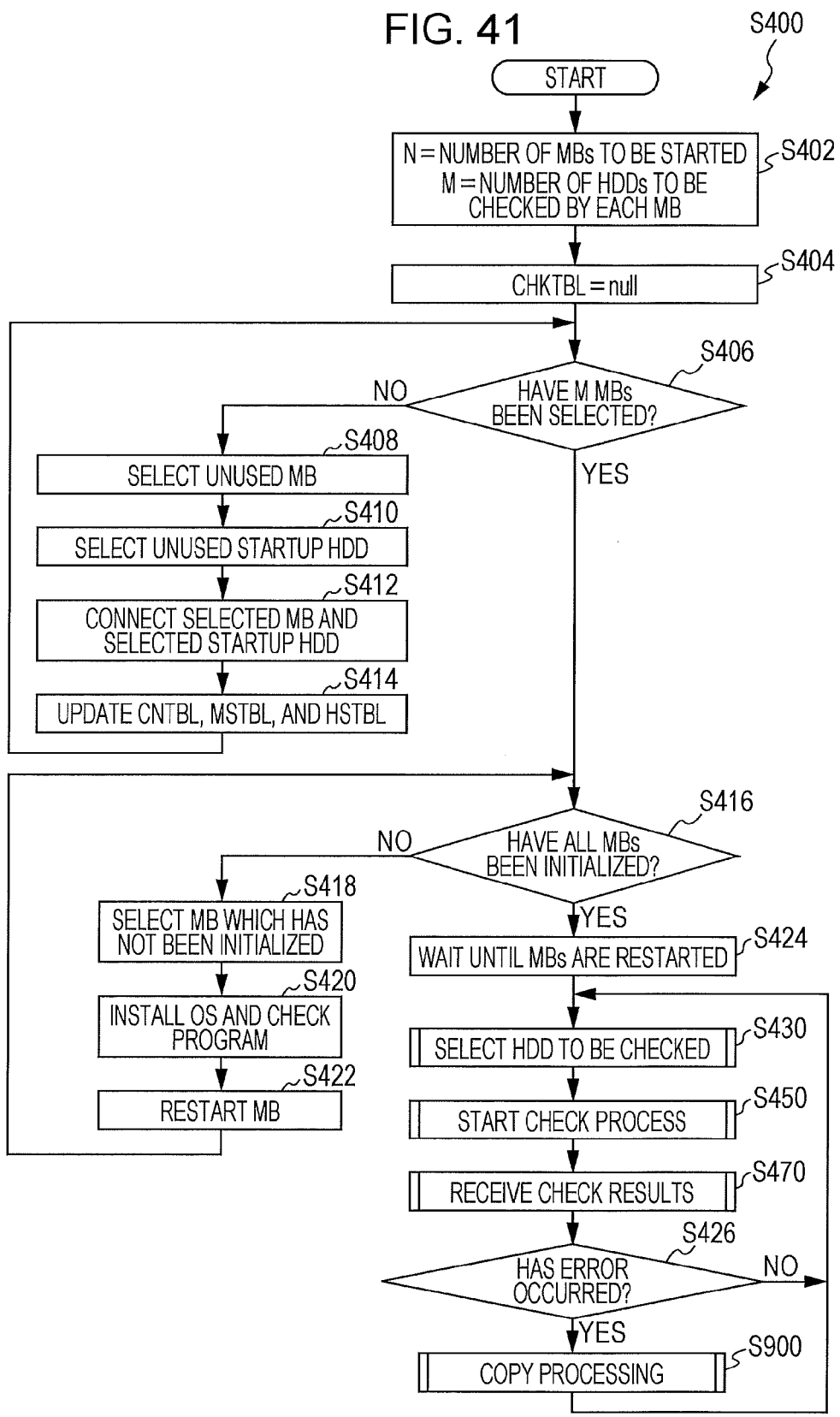
FIG. 41 illustrates an example of a check thread started in step S400 illustrated in FIG. 16.

Then, in step S400, the control program PGM4 starts a check thread. An example of the check thread is illustrated in FIG. 41. By executing the check thread, a failure in an HDD is detected, or an error of data stored in an HDD is detected and corrected. If the information processing system SYS does not have a function of detecting a failure in an HDD or a function of detecting and correcting an error, step S400 is not executed.

Then, in step S16, the control program PGM4 determines whether a command has been received from a motherboard MB or the console CNSL. If a command has been received, the control program PGM4 shifts the process to step S18. If a command has not been received, the control program PGM4 repeats step S16.

In step S18, the control program PGM4 determines whether a connect request to connect an HDD has been received from one of the motherboards MBs. If a connect request has been received, the control program PGM4 shifts the process to step S100. If a connect request has not been received, the control program PGM4 shifts the process to step S20.

In step S20, the control program PGM4 determines whether a disconnect request to disconnect an HDD has been received from one of the motherboards MBs. If a disconnect request has been received, the control program PGM4 shifts the process to step S100. If a disconnect request has not been received, the control program PGM4 shifts the process to step S24.

Figure 18:
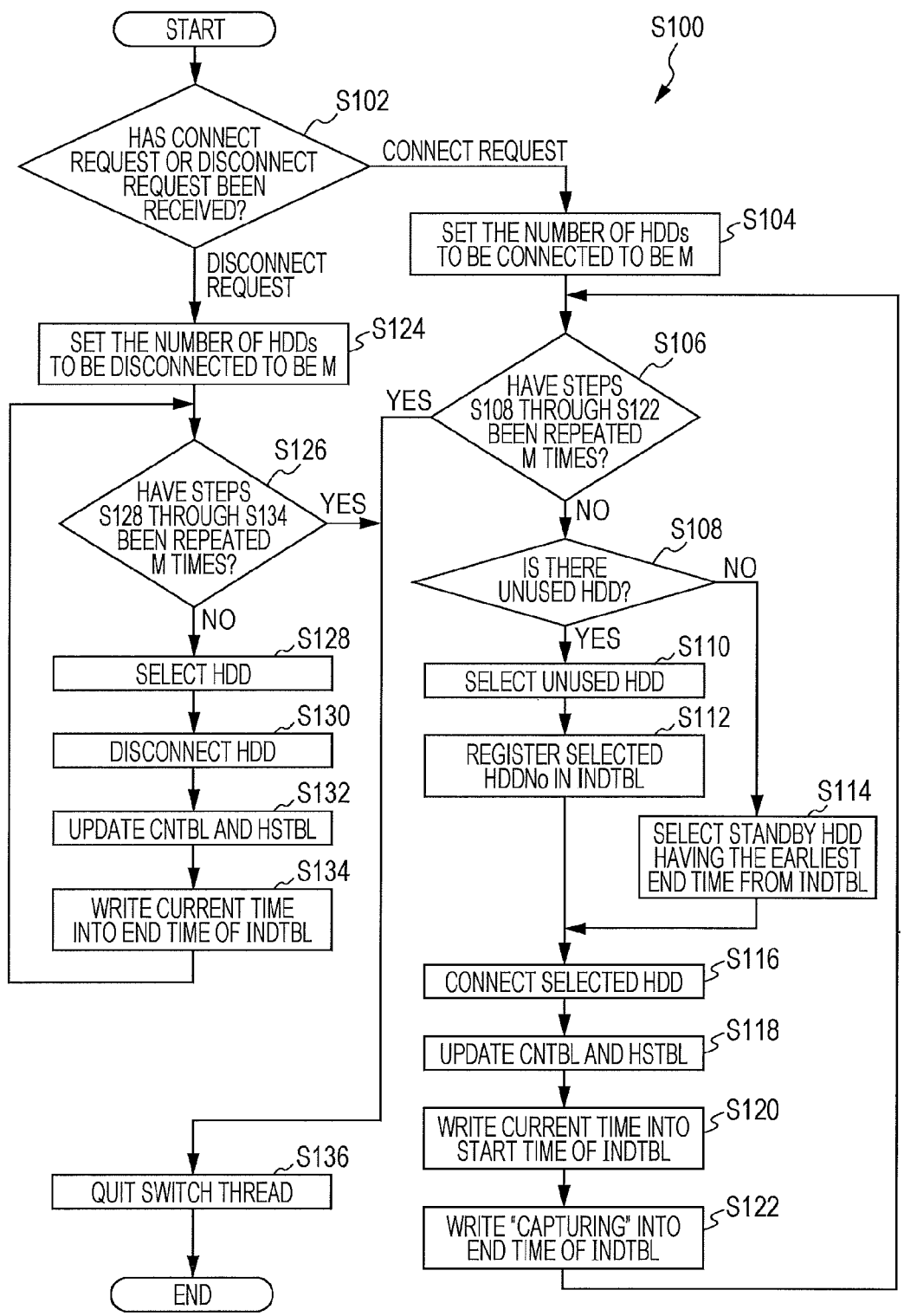
FIG. 18 illustrates an example of a switch thread started in step S100 illustrated in FIG. 16.

In step S100, the control program PGM4 starts a switch thread for connecting an HDD to a motherboard MB or for disconnecting an HDD from a motherboard MB. After starting the switch thread, the control program PGM4 shifts the process to step S24. An example of the switch thread is illustrated in FIG. 18.

In step S24, the control program PGM4 determines whether a capture start request has been received from the console CNSL. If a capture start request has been received, the control program PGM4 shifts the process to step S200. If a capture start request has not been received, the control program PGM4 shifts the process to step S26.

In step S200, the control program PGM4 starts the capture start thread for causing a motherboard MB to start capturing data. After starting the capture start thread, the control program PGM4 returns the process to step S16. An example of the capture start thread is illustrated in FIG. 17.

In step S26, the control program PGM4 determines whether a search request has been received from the console CNSL. If a search request has been received, the control program PGM4 shifts the process to step S300. If a search request has not been received, the control program PGM4 returns the process to step S16.

Figure 28:
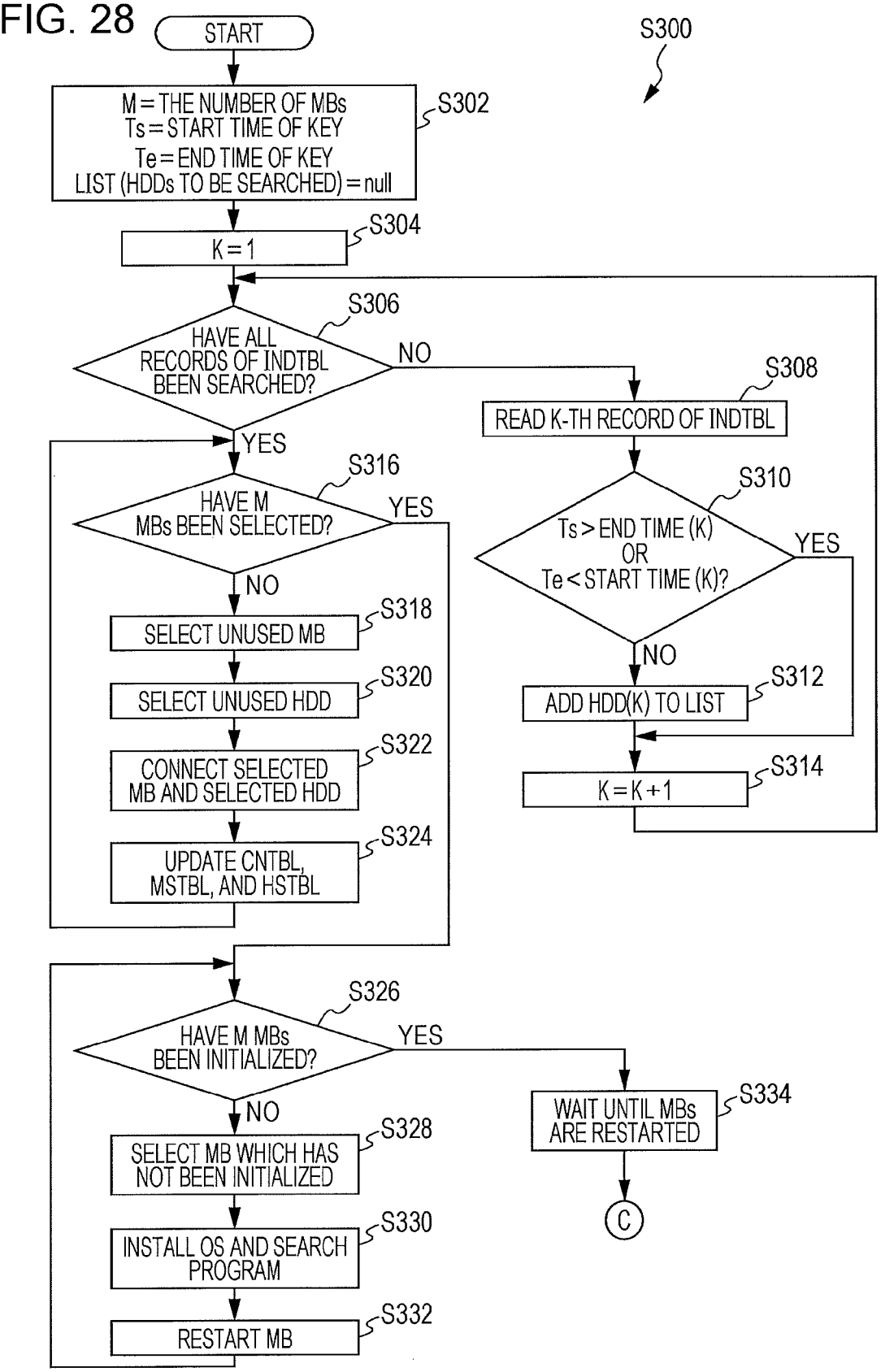
FIGS. 28 and 29 illustrate an example of a search thread started in step S300 in FIG. 16.
Figure 29:
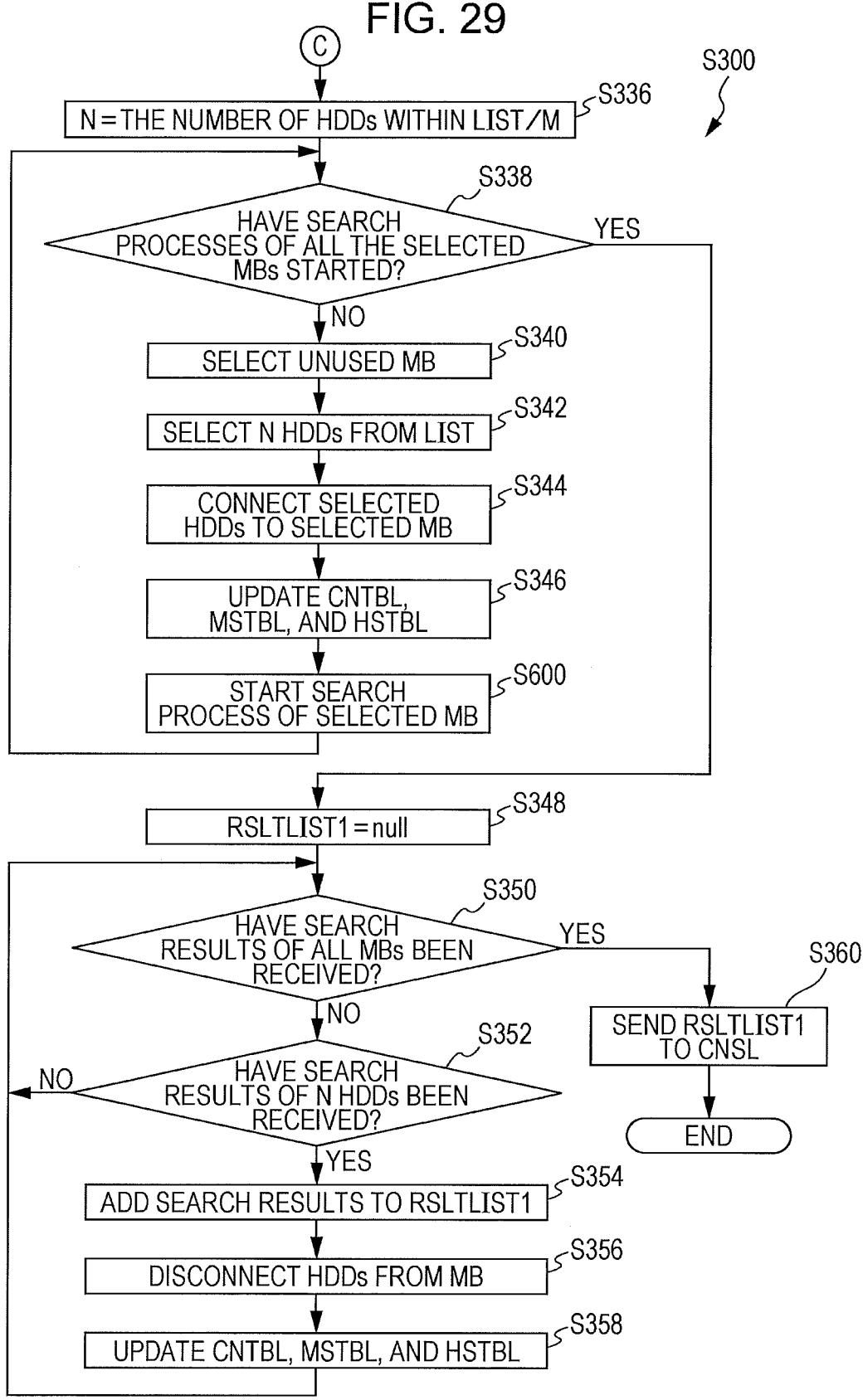

In step S300, the control program PGM4 starts the search thread for searching for data stored in the HDDs. After starting the search thread, the control program PGM4 returns the process to step S16. An example of the search thread is illustrated in FIGS. 28 and 29.

Figure 17:
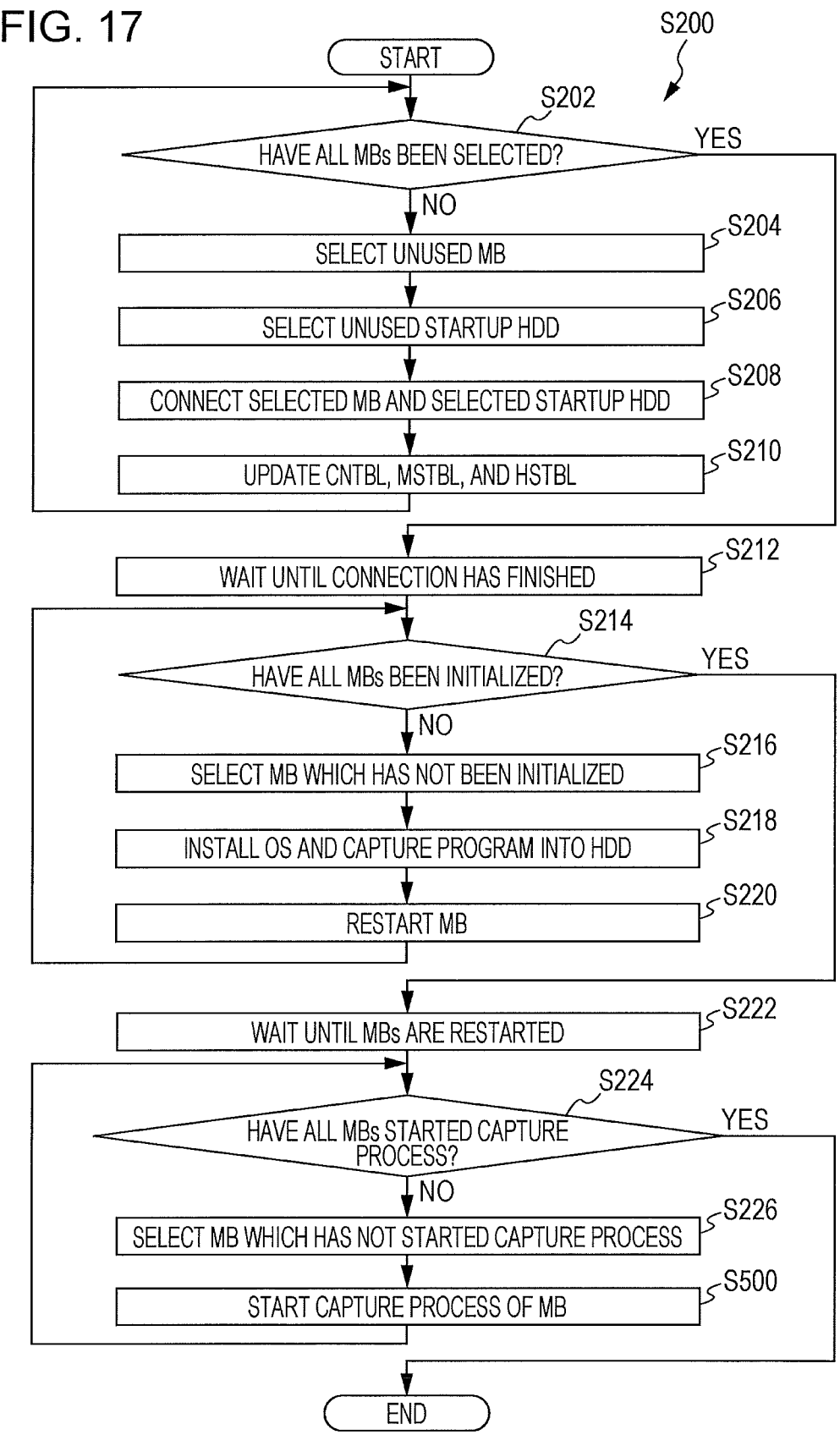
FIG. 17 illustrates an example of a capture start thread started in step S200 in FIG. 16.

FIG. 17 illustrates an example of the capture start thread started in step S200 in FIG. 16. The capture start thread is implemented as a result of the CPU4 of the control device 400 executing the control program PGM4 in response to an instruction from the console CNSL.

In step S202, the control program PGM4 determines whether motherboards MBs specified by the console CNSL have been selected. If it is found in step S202 that the motherboards MBs specified by the console CNSL have been selected, the process proceeds to step S212. If not all the motherboards MBs have been selected, the process proceeds to step S204.

In step S204, the control program PGM4 refers to the table MSTBL and selects one of the unused motherboards MBs. Then, in step S206, the control program PGM4 refers to the table HSTBL and selects one unused startup HDD.

Then, in step S208, the control program PGM4 controls the switching device 300 so that the selected motherboard MB and the selected startup HDD may be connected to each other. Then, step S210, the control program PGM4 updates the tables CNTBL, MSTBL, and HSTBL.

The control program PGM4 repeats steps S204, S206, S208, and S210 until all the motherboards MBs that will execute a data capturing operation have been selected. For example, as illustrated in FIG. 10, the updated table CNTBL indicates that the motherboard MB1 and the HDD29 are connected to each other and that the motherboard MB2 and the HDD30 are connected to each other. The updated table MSTBL indicates that the motherboards MB1 and MB2 are set to be "capturing", and the updated table HSTBL indicates that the HDD29 and HDD30 are set to be "started".

If the control program PGM4 determines in step S202 that all the motherboards MBs which will execute a data capturing operation have been selected, the process proceeds to step S212. In step S212, the control program PGM4 waits until the connecting device 300 finishes connecting the selected motherboards MBs and the corresponding HDDs. For example, the control device 400 determines whether or not the connecting device 300 has finished the connection by monitoring information concerning the inside of the connecting device 300 via the control port CNTP of the connecting device 300 illustrated in FIG. 5.

After the completion of the connection between the motherboards MBs and the HDDs, in step S214, the control program PGM4 determines whether all the motherboards MBs specified by the console CNSL have been initialized. If all the motherboards MBs have been initialized, the process proceeds to step S222. If not all the motherboards MBs have been initialized, the process proceeds to step S216.

In step S216, the control program PGM4 selects one of the motherboards MB which have not been initialized. Then, in step S218, the control program PGM4 installs the OS and the capture program CP into the startup HDD connected to the selected motherboard MB through the use of the selected motherboard MB. Installation may be performed by using a remote installation method, such as a kickstart installation method. Then, in step S220, the control program PGM4 restarts the selected motherboard MB. The restarted motherboard MB executes the OS and is ready to execute the capture process.

If the control program PGM4 determines in step S214 that all the motherboards MBs specified by the console CNSL have been initialized, the process proceeds to step S222. In step S222, the control program PGM4 waits until the motherboards MBs are restarted. Then, in step S224, the control program PGM4 determines whether all the motherboards MBs specified by the console CNSL have started the capture process. If all the motherboards MBs have started the capture process, the control program PGM4 quits the capture start thread. If there is any motherboard MB which has not started the capture process, the process proceeds to step S226.

In step S226, the control program PGM4 selects a motherboard MB which has not started the capture process from among the selected motherboards MBs. Then, in step S500, the control program PGM4 starts the capture process of the motherboard MB selected in step S226. The capture process is started by executing, for example, a remote shell program.

FIG. 18 illustrates an example of the switch thread started in step S100 illustrated in FIG. 16. The switch thread is implemented as a result of the CPU4 of the control device 400 executing the control program PGM4 in response to a connect request or a disconnect request provided from a motherboard MB which is executing the capture process.

In step S102, the control program PGM4 determines whether a connect request to connect an HDD or a disconnect request to disconnect an HDD has been received from the motherboard MB. If a connect request has been received, the process proceeds to step S104. If a disconnect request has been received, the process proceeds to step S124.

In step S104, the control program PGM4 sets the number of new HDDs specified by the motherboard MB to be a variable M. Then, in step S106, the control program PGM4 determines whether steps S108 through S122 have been repeated M times. If steps S108 through S122 have been repeated M times, it means that the specified number M of HDDs have been connected, and thus, the process proceeds to step S136.

If it is found in step S106 that the specified number M of HDDs have not been connected, the process proceeds to step S108. In step S108, the control program PGM4 refers to the table HSTBL and determines whether there is an unused data-capturing HDD. If there is an unused data-capturing HDD, the process proceeds to step S110. If there is no unused data-capturing HDD, the process proceeds to step S114.

In step S110, the control program PGM4 selects one unused data-capturing HDD. Then, in step S112, the control program PGM4 registers the selected HDD number (HDDNo) in the table INDTBL. The process then proceeds to step S116.

If it is found in step S108 that there is no unused data-capturing HDD, the process proceeds to step S114. In step S114, the control program PGM4 refers to the table INDTBL and selects the HDD having the earliest end time from among standby HDDs. Then, the process proceeds to step S116. In this case, the standby HDDs are retaining captured data therein.

In step S116, the control program PGM4 controls the connecting device 300 so that the selected HDD may be connected to the motherboard MB which has issued the connect request. Then, in step S118, the control program PGM4 updates the tables CNTBL and HSTBL. For example, examples of the tables CNTBL and HSTBL in which M HDDs are connected when the capture process is started are illustrated in FIG. 11. Examples of the tables CNTBL and HSTBL in which, in addition to M HDDs which have already been connected, M HDDs are newly connected during the capture process are illustrated in FIG. 12. FIGS. 11 through 15 illustrate examples of the tables when the variable M is four.

Then, in step S120, the control program PGM4 writes the current time into the field of the start time in the table INDTBL corresponding to the HDD connected in step S116. Then, in step S122, the control program PGM4 writes "capturing" into the field of the end time in the table INDTBL corresponding to the HDD connected in step S116. The process then returns to step S106.

If it is found in step S102 that a disconnect request has been received, the process proceeds to step S124. In step S124, the control program PGM4 sets the number of HDDs specified by the motherboard MB to be a variable M. Then, in step S126, the control program PGM4 determines whether steps S128 through S134 have been repeated M times. If steps S128 through S134 have been repeated M times, it means that the specified number M of HDDs have been disconnected, and thus, the process proceeds to step S136.

If it is found in step S126 that the specified number M of HDDs have not been disconnected, the process proceeds to step S128. In step S128, the control program PGM4 refers to the table INDTBL and selects an HDD in which the start time is the earliest time and the end time is "capturing". Then, in step S130, the control program PGM4 disconnects the HDD selected in step S128 from the motherboard MB which has issued the disconnect request.

Then, in step S132, the control program PGM4 updates the tables CNTBL and HSTBL. For example, in the table CNTBL, information indicating a connection relation between the motherboard MB and the selected HDD is deleted, and in the table HSTBL, the state of the HDD disconnected from the motherboard MB is set to be "standby". Then, in step S134, the control program PGM4 writes the current time into the field of the end time in the table INDTBL corresponding to the HDD disconnected in step S130. Then, the process returns to step S126.

After M HDDs have been connected to or disconnected from the motherboard MB, in step S136, the control program PGM4 quits the switch thread.

Figure 19:
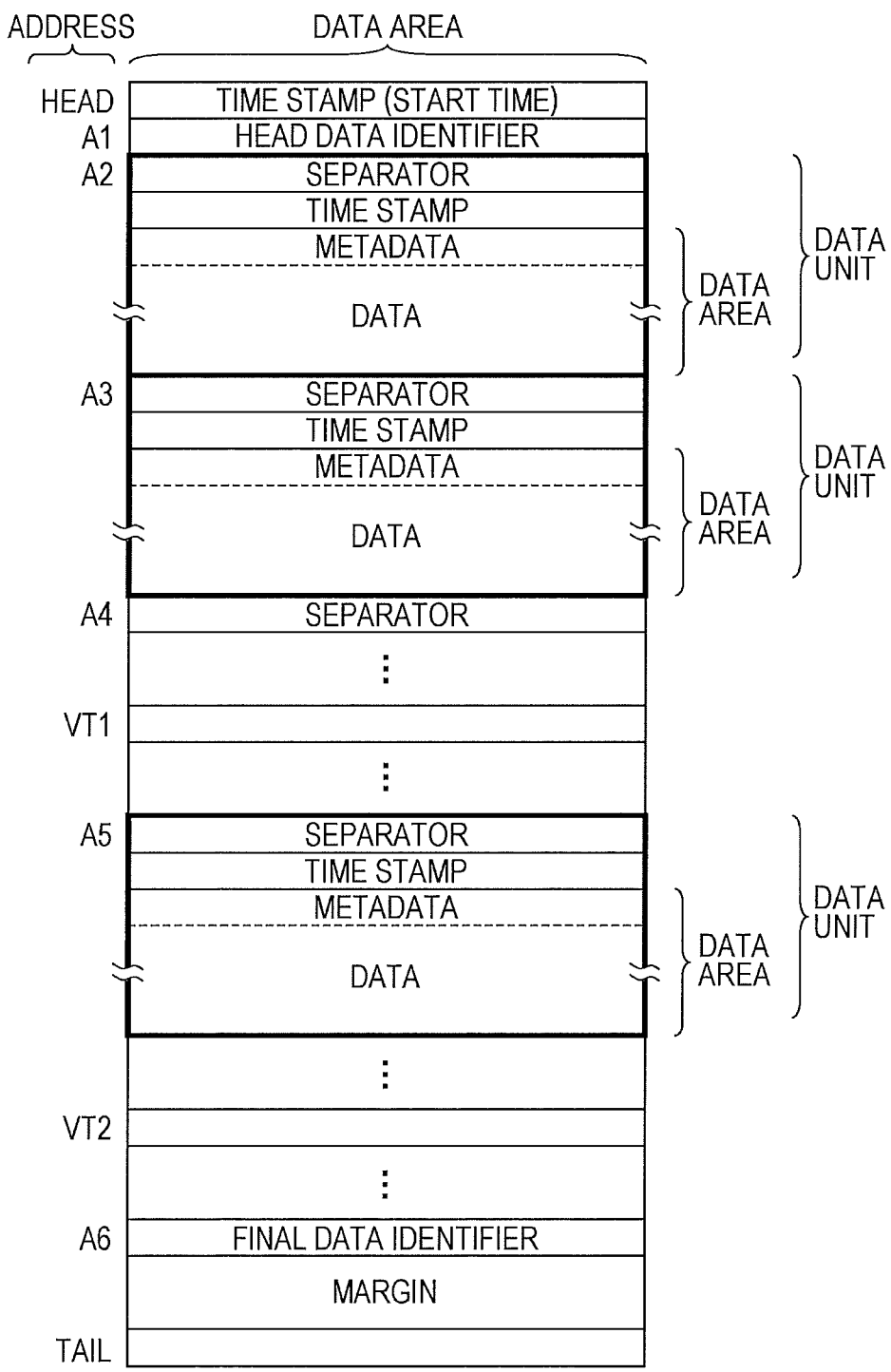
FIG. 19 illustrates an example of the allocation of storage areas of each of HDD1 through HDD24 used for data capturing illustrated in FIG. 8.

FIG. 19 illustrates an example of the allocation of storage areas of each of the data-capturing HDD1 through HDD24 illustrated in FIG. 8. In the storage areas of the data-capturing HDD, a plurality of data units, each including a separator, a time stamp, and a data area, are repeatedly allocated. In the field of the head address, a time stamp indicating the start time of data capturing into the HDD is stored. In the field of the address A1, a head data identifier is stored, and in the field of the address A6, a final data identifier is stored. A predetermined margin is provided between the final data identifier and the tail address.

The data area includes a region of metadata indicating the attribute of data and a region in which captured data is stored. Since the length of the region in which data is stored is undefined, metadata includes information concerning the data size. Accordingly, the intervals between the addresses A2, A3, A4, and A5 indicating the positions of the separators are not equal. The separator includes, for example, a data sequence which does not appear as captured data. The time stamp indicates a time at which corresponding data was captured.

The address VT1 is a threshold indicating that there is not much space in the storage area of the HDD. If the write address has exceeded the threshold VT1, the motherboard MB which is writing data into the HDD determines that the space of the HDD has become small, and requests the control device 400 to connect another HDD into which captured data will be written. The connection of another HDD is executed by the control device 400 on the basis of the connect request thread (FIG. 22) started in step S530 in FIG. 21.

The address VT2 is a threshold indicating that there is no space in the storage area of the HDD. If the write address has exceeded the threshold VT2, the motherboard MB which is writing data into the HDD writes the final data identifier after the final data and stops writing data into the HDD. The motherboard MB also requests the control device 400 to disconnect the HDD in which the write address has exceeded the threshold VT2. The disconnection of the HDD is executed by the control device 400 on the basis of the disconnect request thread (FIG. 23) started in step S534 in FIG. 21.

During a period from when the write address of the HDD has exceeded the threshold VT1 until it reaches the threshold VT2, at the same time as writing data into the HDD, the motherboard MB also writes data into an HDD which has been newly connected on the basis of the connect request thread. The difference between the address of the threshold VT1 and that of the threshold VT2 is set such that it is possible to write captured data into the HDD during a period from when the connect request thread has been issued due to the fact that the HDD has exceeded the threshold VT1 until when a new HDD is connected. For example, the address value of the threshold VT1 may be expressed by equation (2):

$$VT1 = VT2 - (MSP/M)*TMAX \qquad (2)$$

where MSP is the maximum speed at which data is captured, and M is the number of HDDs connected to the motherboard MB, TMAX is the maximum wait time until a new HDD is connected, and * denotes multiplication.

The maximum wait time TMAX is a length of time from when the motherboard MB has issued a connect request to connect an HDD until when the connection state of the connecting device 300 is switched and the OS of the motherboard MB recognizes the new HDD. The maximum wait time TMAX is a constant which depends on the specifications of the information processing system SYS. By setting the threshold VT1 by using equation (2), it is possible to write captured data into HDDs without causing the loss of data even while the HDDs are being switched.

Since MSP/M in equation (2) is equal to HSP in the above-described equation (1), the threshold VT1 may be expressed by equation (3) by substituting equation (2) into equation (1).

$$VT1 = VT2 - HSP * TMAX \quad (3)$$

The address value of the threshold VT2 may be expressed by equation (4) by using the tail address of the HDD:

$$VT2 = \text{tail address} - (SS + TS + DMAX + MS + ES) \quad (4)$$

where SS is the size of the separators, TS is the size of the time stamps, DMAX is the maximum data size, MS is the size of metadata, and ES is the size of the final data identifier. The maximum data size DMAX is a constant which depends on a communication protocol used for data capturing.

By setting the threshold VT2 by using equation (4), even when the HDD has exceeded the threshold VT2, it is possible to write data into the HDD. In this manner, the address values of the thresholds VT1 and VT2 may be determined from the storage capacity of an HDD, the data transfer rate, and a wait time for the connection of an HDD.

Figure 20:
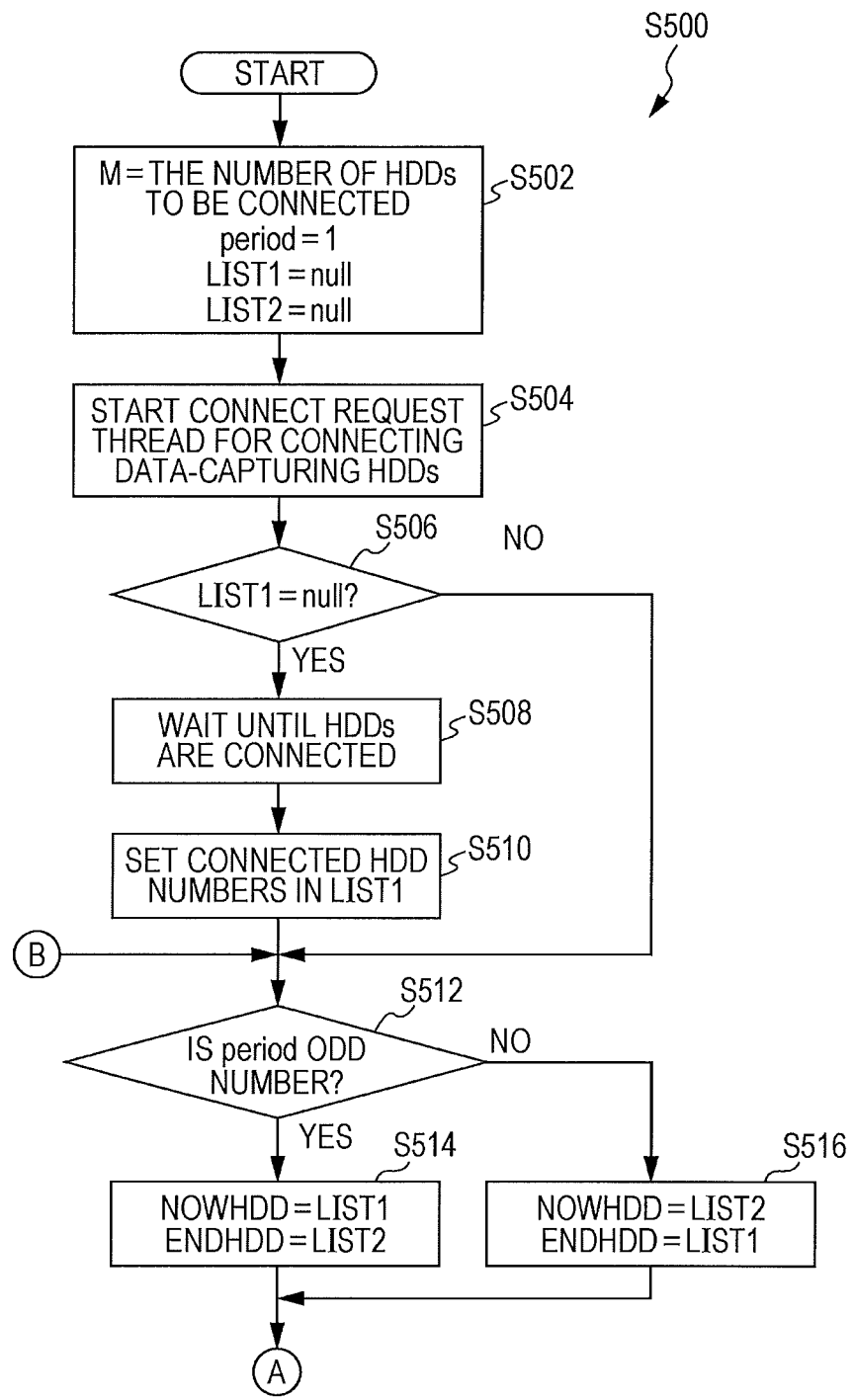
FIGS. 20 and 21 illustrate an example of a capture process started in step S500 illustrated in FIG. 17.
Figure 21:
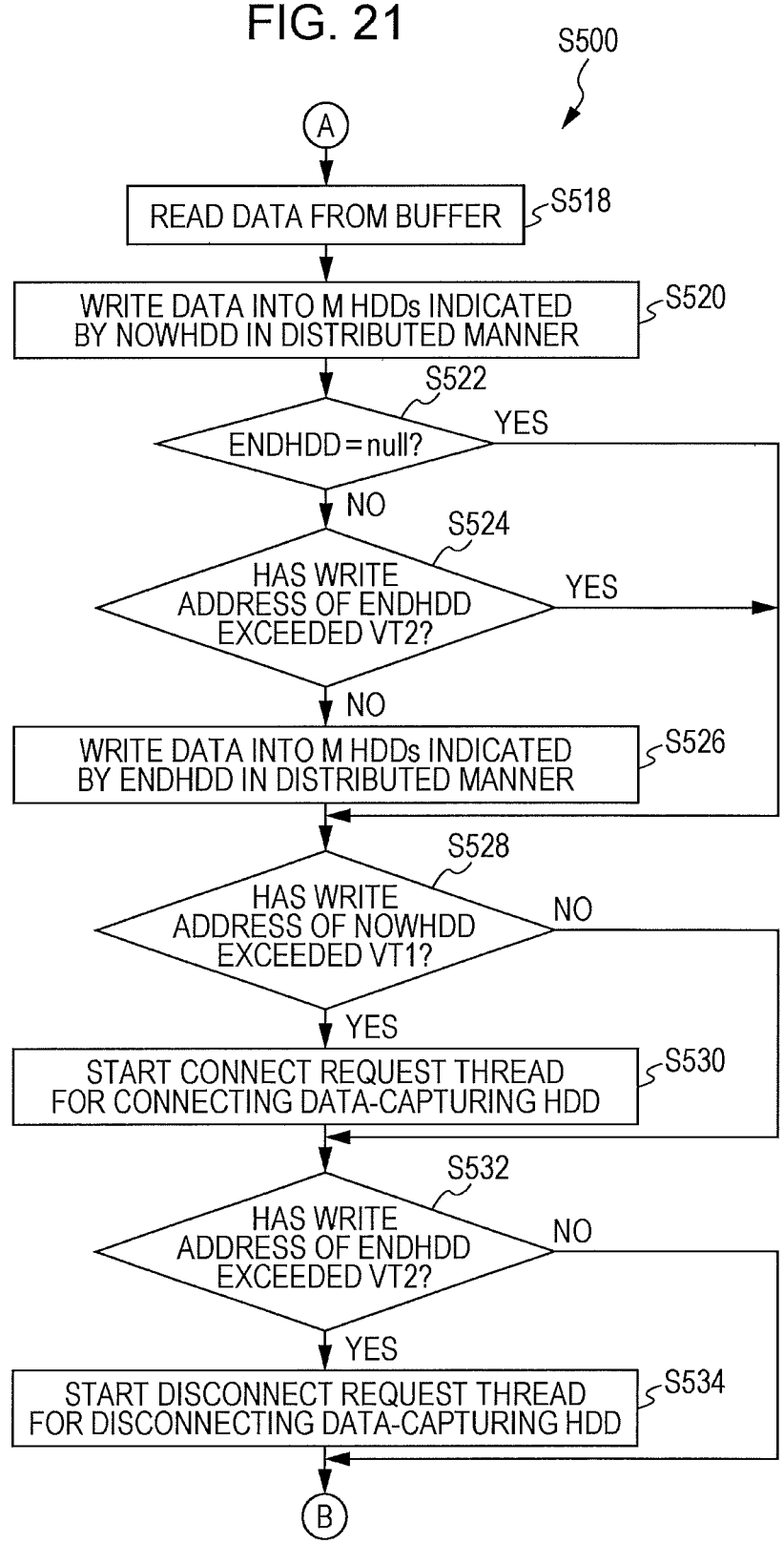

FIGS. 20 and 21 illustrate an example of the capture process started in step S500 illustrated in FIG. 17. The capture process is executed by the CPU of a motherboard MB which has received an instruction to start the capture process from the control device 400.

In step S502, the capture process sets the number of HDDs into which captured data is written in a distributed manner to be a variable M. If data is not written in a distributed manner, the variable M is set to be 1. The capture process also initializes a variable "period" and lists LIST1 and LIST2 used for a capturing operation. The lists LIST1 and LIST2 are storage areas or registers to which a predetermined size is allocated.

The variable "period" is the number of times (total number) that a set of HDDs connected to a motherboard MB is connected. The initial value of the variable "period" is 1. The variable "period" is incremented by one every time a new HDD is connected after the amount of data written into an HDD has exceeded a predetermined amount (the threshold VT1 illustrated in FIG. 19).

In the lists LIST1 and LIST2, the HDD numbers (HDDNo) are stored. The lists LIST1 and LIST2 in the initial state are set to be "null". In the list LIST1, the HDD numbers of HDDs which have been connected at an odd-numbered time are stored, and when such HDDs are disconnected, the list LIST1 is set to be "null". In the list LIST2, the HDD numbers of HDDs which have been connected at an even-numbered time are stored, and when such HDDs are disconnected, the list LIST2 is set to be "null".

Figure 22:
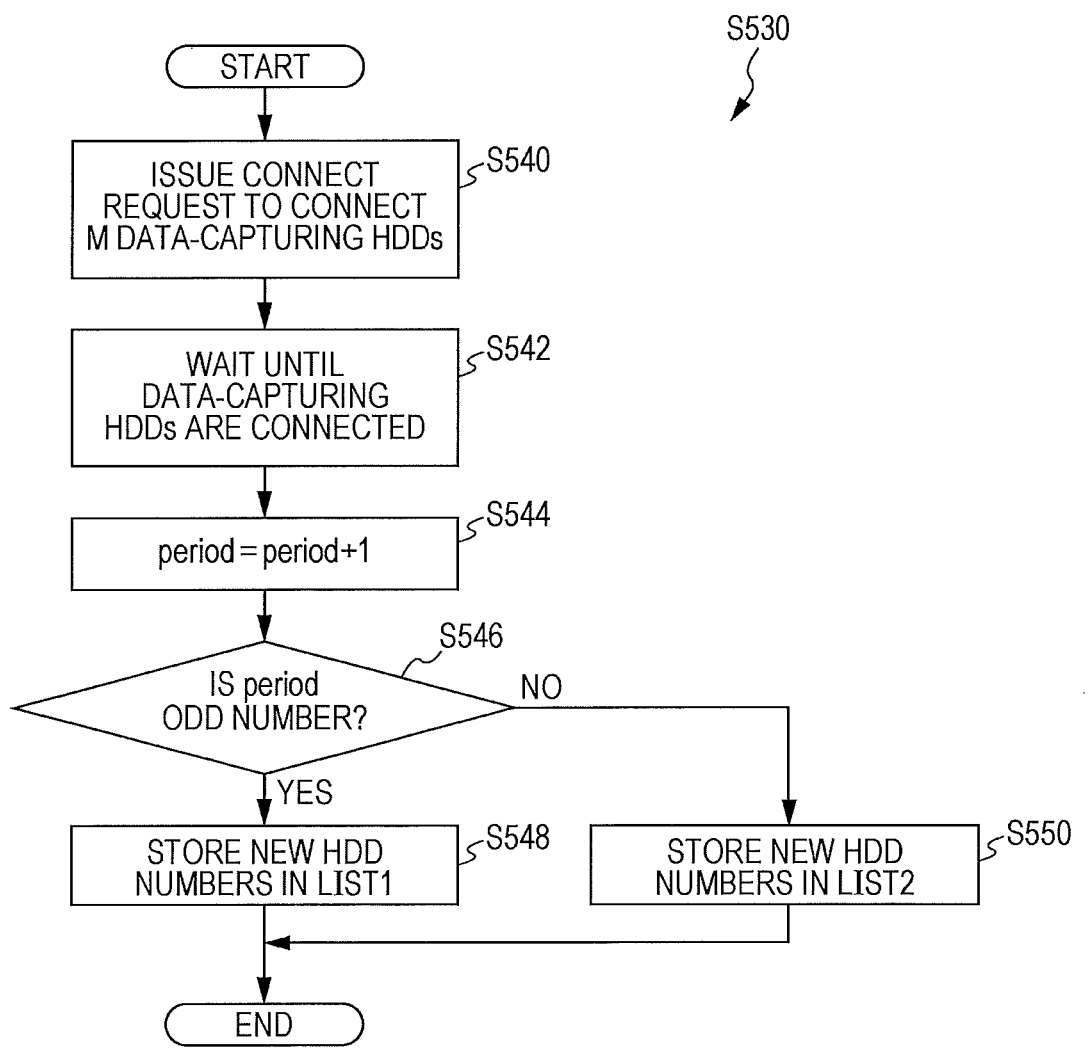
FIG. 22 illustrates an example of a connect request thread started in step S530 in FIG. 21.

In step S504, the capture process starts the connect request thread for connecting data-capturing HDDs. An example of the connect request thread is illustrated in FIG. 22. Then, in step S506, the capture process determines whether "null" is input in the list LIST1. If "null" is input in the list LIST1, it means that the connection of data-capturing HDDs to the motherboard MB has not finished, and thus, the process proceeds to step S508. If "null" is not input in the list LIST1, it means that there are data-capturing HDDs which have been connected to the motherboard MB, and thus, the process proceeds to step S512.

In step S508, the capture process waits until data-capturing HDDs are connected to the motherboard MB. It is possible to determine whether HDDs are connected to the motherboard MB by querying the control device 400 the motherboard MB. Then, in step S510, the capture process stores the connected HDD numbers (for example, HDD1 and HDD2) in the list LIST1.

Then, in step S512, the capture process determines whether the variable "period" is an odd number. If the variable "period" is an odd number, the process proceeds to step S514. If the variable "period" is an even number, the process proceeds to step S516.

In step S514, the capture process stores the HDD numbers stored in the list LIST1 in a variable NOWHDD, and stores the HDD numbers stored in the list LIST2 in a variable ENDHDD. In step S516, the capture process stores the HDD numbers stored in the list LIST2 in a variable NOWHDD, and stores the HDD numbers stored in the list LIST1 in a variable ENDHDD. In the HDDs indicated by the variable NOWHDD, data written into such HDDs has not reached the position indicated by the threshold VT1. In the HDDs indicated by the variable ENDHDD, data written into such HDDs has reached the position indicated by the threshold VT1.

Then, in step S518 in FIG. 21, the capture process reads data from a buffer which stores data therein supplied from the switching device 500 illustrated in FIG. 5. The buffer is disposed, for example, within the motherboard MB. Then, in step S520, the capture process writes the data read from the buffer into M HDDs indicated by the variable NOWHDD in a distributed manner.

Then, in step S522, the capture process determines whether the variable ENDHDD indicates "null". If the variable ENDHDD indicates "null", it means that the capture process is writing data only into the HDDs indicated by the variable NOWHDD since HDD numbers are not set in the variable ENDHDD until the write address has exceeded the threshold VT1. In this case, the process proceeds to step S528. If the variable ENDHDD does not indicate "null", the process proceeds to step S524.

In step S524, the capture process determines whether the write address of each HDD indicated by the variable ENDHDD has exceeded the threshold VT2. The write address indicates, for example, a storage area of an HDD into which data is written, and data is written into the HDD in ascending order of the address. If it is found in step S524 that the write address of each HDD has exceeded the threshold VT2, the process proceeds to step S528 so that the capture process may stop writing data into the HDD. If the write address has not exceeded the threshold VT2, it means that it is still possible to write data into the HDD, and thus, the process proceeds to step S526.

In step S526, the capture process writes data read from the buffer into the HDDs indicated by the variable ENDHDD in a distributed manner. In order to connect M data-capturing HDDs expressed by equation (1) to the motherboard MB, it is determined that the amount of data per unit time which is read into the buffer is smaller than the amount of data per unit time which is written into M HDDs. This makes it possible to write data into the HDDs without causing the overflow of data in the buffer.

In step S528, the capture process determines whether the write address of an HDD indicated by the variable NOWHDD has exceeded the threshold VT1. If captured data is written into a plurality of HDDs in a distributed manner (M=a multiple number), the capture process determines whether the write address of at least one HDD has exceeded the threshold VT1. If the write address has exceeded the threshold VT1, it means that there is not much space in the HDD indicated by the variable NOWHDD, and thus, the process proceeds to step S530. If the write address has not exceeded the threshold VT1, it means that there is enough space in the HDD indicated by the variable NOWHDD, and thus, the process proceeds to step S532.

In step S530, the capture process starts the connect request thread for connecting a new data-capturing HDD to the motherboard MB. By starting the connecting processing for a new HDD at a time point at which the write address has exceeded the threshold VT1, it is possible to continuously writing data into HDDs even while capturing-data HDDs are being switched. The process then proceeds to step S532.

In step S532, the capture process determines whether the write address of an HDD indicated by the variable ENDHDD has exceeded the threshold VT2. If captured data is written into a plurality of HDDs in a distributed manner (M=a multiple number), the capture process determines whether the write address of at least one HDD has exceeded the threshold VT2. If the write address has exceeded the threshold VT2, the process proceeds to step S534 so that the capture process may stop writing data into the HDD. If the write address has exceeded the threshold VT2, it means that a new HDD has already been connected to the motherboard MB. If the write address has not exceeded the threshold VT2, it means that a new HDD has not connected to the motherboard MB, and thus, the process returns to step S512 in FIG. 20.

In step S534, the capture process starts the disconnect request thread for disconnecting the data-capturing HDD indicated by the variable ENDHDD from the mother board MB. The process then returns to step S512.

FIG. 22 illustrates an example of the connect request thread started in step S530 in FIG. 21. The connect request thread is started by the capture process which is being executed by the motherboard MB.

In step S540, the connect request thread issues a connect request to connect new M HDDs which will capture data to the control device 400. Then, in step S542, the connect request thread waits until M HDDs which will capture data have been connected.

Then, in step S544, the connect request thread increments the variable "period" by one. Then, in step S546, the connect request thread determines whether the variable "period" is an odd number. If the variable "period" is an odd number, the process proceeds to step S548. If the variable "period" is an even number, the process proceeds to step S550.

In step S548, the connect request thread stores the newly connected HDD numbers in the list LIST1, and then, the connect request thread is terminated. In step S550, the connect request thread stores the newly connected HDD numbers in the list LIST2, and then, the connect request thread is terminated.

Figure 23:
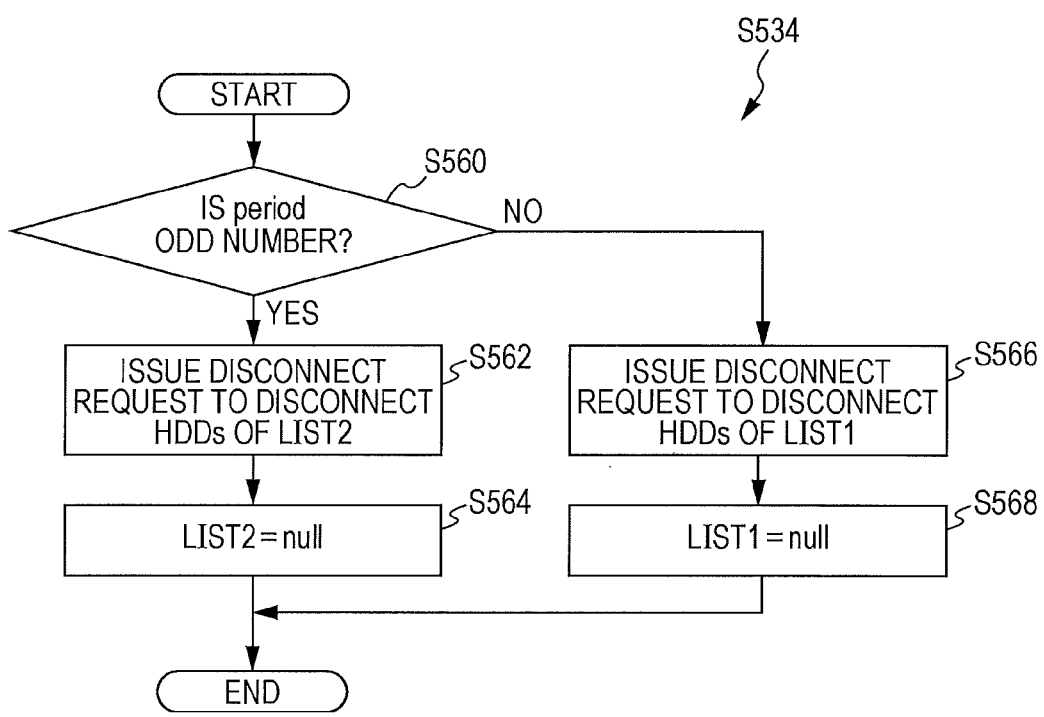
FIG. 23 illustrates an example of a disconnect request thread started in step S534 in FIG. 21.

FIG. 23 illustrates an example of the disconnect request thread started in step S534 in FIG. 21. The disconnect request thread is started by the capture process which is being executed by the motherboard MB.

In step S560, the disconnect request thread determines whether the variable "period" is an odd number. If the variable "period" is an odd number, the process proceeds to step S562. If the variable "period" is an even number, the process proceeds to step S566.

In step S562, the disconnect request thread issues a disconnect request to disconnect the HDDs indicated by the HDD numbers stored in the list LIST2 from the motherboard MB to the control device 400. Then, in step S564, the disconnect request thread sets the list LIST2 to be "null", and then, the disconnect request thread is terminated.

In step S566, the disconnect request thread issues a disconnect request to disconnect the HDDs indicated by the HDD numbers stored in the list LIST1 from the motherboard MB to the control device 400. Then, in step S568, the disconnect request thread sets the list LIST1 to be "null", and then, the disconnect request thread is terminated.

Figure 24:
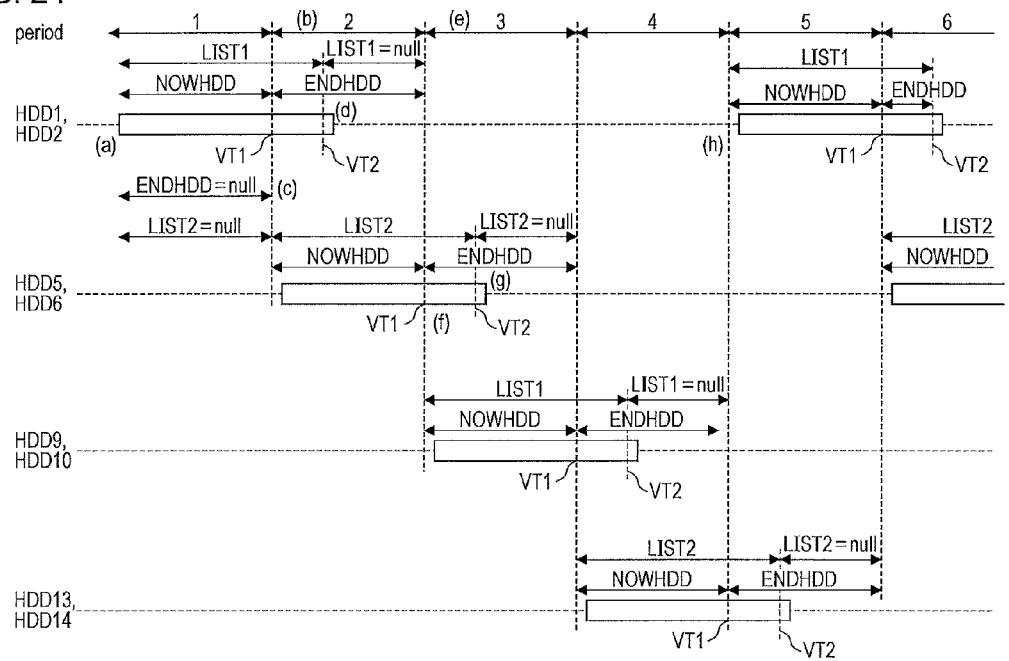
FIG. 24 illustrates an example of a data capturing operation executed by the capture process illustrated in FIGS. 20 through 23.

FIG. 24 illustrates an example of a data capturing operation executed by the capture process illustrated in FIGS. 20 through 23. For the sake of simple representation, in this example, as data-capturing HDDs, four pairs of HDDs (HDD1 and HDD2), (HDD5 and HDD6), (HDD9 and HDD10), and (HDD13 and HDD14) are used. In FIG. 24, the narrow rectangles indicate that corresponding HDDs are being connected to the motherboard MB1 illustrated in FIG. 5, that is, captured data may be written into such HDDs.

First, the HDD1 and HDD2 are connected to the motherboard MB1 illustrated in FIG. 5, and captured data is sequentially written into the HDD1 and HDD2 ((a) of FIG. 24). Since the variable "period" is 1 in the initial state, the variable NOWHDD is set to be HDD1 and HDD2 indicated by the list LIST1. The list LIST2 and the variable ENDHDD indicate "null".

When the write address of one of the HDD1 and HDD2 indicated by the variable NOWHDD has exceeded the threshold VT1, the unused HDD5 and HDD6 are connected to the motherboard MB1 and the variable "period" is changed to 2 ((b) of FIG. 24). The variable NOWHDD is set to be HDD5 and HDD6 indicated by the list LIST2, and the variable ENDHDD is set to be HDD1 and HDD2 indicated by the list LIST1 ((c) of FIG. 24).

Then, when the write address of one of the HDD1 and HDD2 indicated by the variable ENDHDD has exceeded the threshold VT2, the HDD1 and HDD2 indicated by the list LIST1 are disconnected from the motherboard MB1 ((d) of FIG. 24). By connecting the HDD5 and HDD6 to the motherboard MB1 during a period from when the write address of one of the HDD1 and HDD2 has exceeded the threshold VT1 until the write address reaches the threshold VT2, it is possible to continuously write data into at least one of the pair of HDD1 and HDD2 and the pair of HDD5 and HDD6. For example, even when the supply of power to HDDs in the state of "not used" or "standby" is interrupted, the threshold VT1 and VT2 may be set appropriately by considering the time at which the supply of power to the HDDs is restarted, thereby making it possible to store data in the HDDs without causing the loss of data while implementing a reduction in power consumption.

When the write address of one of the HDD5 and HDD6 indicated by the variable NOWHDD has exceeded the threshold VT1, the unused HDD9 and HDD10 are connected to the motherboard MB1 and the variable "period" is changed to 3 ((e) of FIG. 24). The variable NOWHDD is set to be HDD9 and HDD10 indicated by the list LIST1, and the variable ENDHDD is set to be HDD5 and HDD6 indicated by the list LIST2 ((f) of FIG. 24).

Then, when the write address of one of the HDD5 and HDD6 indicated by the variable ENDHDD has exceeded the threshold VT2, the HDD5 and HDD6 indicated by the list LIST2 are disconnected from the motherboard MB1 ((g) of FIG. 24). Thereafter, by sequentially switching the pairs of HDDs, captured data is written into the HDDs without causing the loss of data.

When the write address of one of the HDD13 and HDD14 indicated by the variable NOWHDD has exceeded the threshold VH1, the HDD1 and HDD2 storing the oldest data among HDDs set in the state of "standby" are connected to the motherboard MB1 ((h) of FIG. 24). Then, captured data is written into the HDD1 and HDD2, together with the HDD13 and HDD14.

Figure 25:
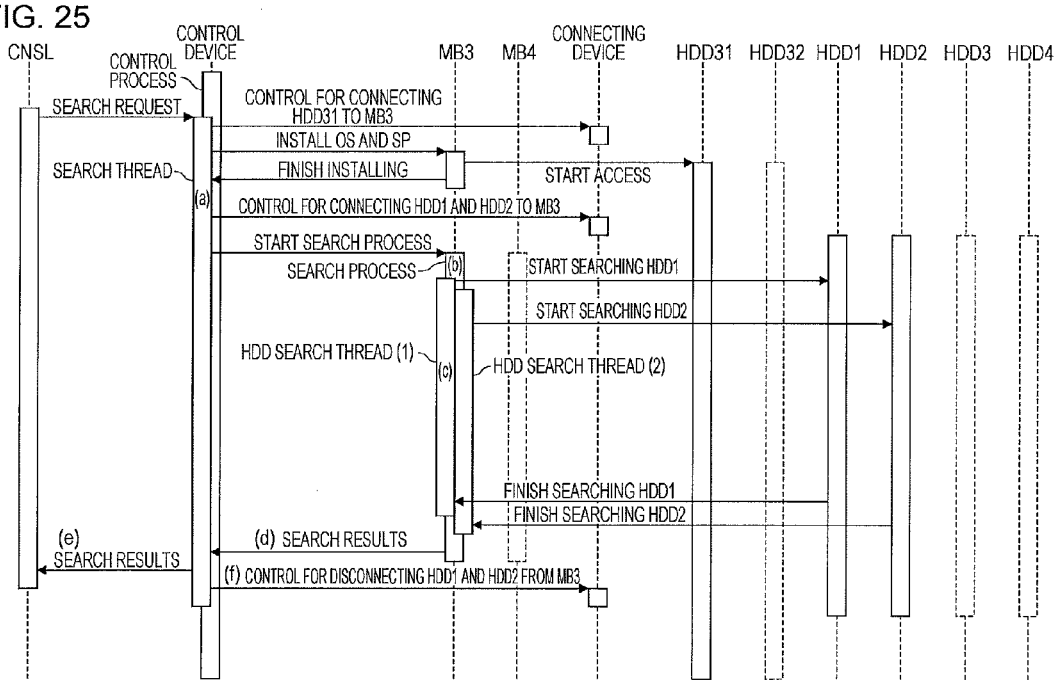
FIG. 25 illustrates an example of a sequence of a search operation performed by the information processing system illustrated in FIG. 5.

FIG. 25 illustrates an example of a sequence of a search operation performed by the information processing system SYS illustrated in FIG. 5. That is, FIG. 25 illustrates an example of a sequence concerning the information processing system SYS which operates as a search device for searching for captured data. In the following description, the operation performed by the control device 400 illustrated in FIG. 7 includes an operation performed by the CPU4 of the control device 400, and the operation performed by the motherboards MBs includes an operation performed by the CPUs of the motherboards MBs.

In this example, after the state illustrated in FIG. 15, the HDD1 through HDD4 which have been capturing data have become full of data, and the HDD5 through HDD8 have started to capture data, and then, a search request is issued for the first time. HDDs in which items of data to be searched for are stored are selected by the search thread started by the control device 400 on the basis of a period of a search operation (start time Ts and end time Te in step S302 of FIG. 28) received together with a search request from the console CNSL. In this example, the HDD1 through HDD4 are selected as HDDs including items of data to be searched for.

For the sake of simple representation, in FIG. 25, operations performed by the HDD3, HDD4, the motherboard MB4 which searches for data stored in the HDD3 and HDD4, and the HDD32 are indicated by broken-line-bordered rectangular boxes, and an explanation thereof will be omitted. The operations performed by the motherboard MB4, HDD32, HDD3, and HDD4 may be understood by reading the motherboard MB3, HDD31, HDD1, and HDD2 as the motherboard MB4, HDD32, HDD3, and HDD4, respectively, in FIG. 25.

The control device 400 executes the search thread in response to a search request input through the console CNSL ((a) of FIG. 25). For example, the search thread outputs control information for connecting the motherboard MB3 and the HDD31 to the connecting device 300. The connecting device 300 connects the motherboard MB3 and the HDD31 on the basis of the control information. After the motherboard MB3 and the HDD31 have been connected to each other, the search thread installs the OS and the search program SP into the HDD31 through the use of the motherboard MB3. The installation method is similar to that for the capture program CP illustrated in FIG. 9.

After installing the OS and the search program SP in the HDD31, the motherboard MB3 is restarted. The CPU of the motherboard MB3 starts the OS and starts to access the HDD31. Thereafter, the motherboard MB3 and the HDD31 are operable as a search server. The motherboard MB3 sends an installation completion response indicating that installation has been completed to the control device 400. The search thread may connect multiple pairs of motherboards MB and HDDs and cause them to serve as multiple servers. In this case, if there are multiple HDDs to be searched, data may be searched for by starting the multiple search servers, thereby reducing the search time compared with a case in which a single search server is used for searching for data.

In this embodiment, the search thread is able to start a desired number of search servers by using unused motherboards MB and unused HDDs in response to an instruction from the console CNSL. With this arrangement, it is possible to start an optimal number of search servers in accordance with a range to be searched, thereby making it possible to optimize the search time in accordance with a request input through the console CNSL.

Upon receiving the installation completion response, the search thread outputs an instruction to start a search process to the motherboard MB3. In response to an instruction to start the search process, the motherboard MB3 starts the search process ((b) of FIG. 25).

The search process starts at least one HDD search thread. The HDD search thread is started, for example, for every HDD to be searched ((c) of FIG. 25). In this example, an HDD search thread (1) searches for captured data stored in the HDD1, and an HDD search thread (2) searches for captured data stored in the HDD2.

Upon completing a search conducted by the HDD search thread (1) and the HDD search thread (2), the search process sends search results to the search thread which is being executed by the control device 400 ((d) of FIG. 25). The search thread sends the search results to the console CNSL ((e) of FIG. 25), and outputs control information for disconnecting the HDD1 and HDD2 from the motherboard MB3 to the connecting device 300 ((f) of FIG. 25). The connecting device 300 disconnects the HDD1 and HDD2 from the motherboard MB3 on the basis of the control information. The control process then quits the search thread.

After completing the search thread, the control process may still maintain the connection between the motherboard MB3 and the HDD31. In this case, the search thread to be started in response to a subsequent search request installs neither of the OS nor the search program SP in the HDD31.

After completing the search thread, the control process may interrupt the supply of power to the motherboard MB3 and the HDD31 while the connection between the motherboard MB3 and the HDD31 is being maintained. In this case, since the HDD31 retains the OS and the search program SP therein, the search thread to be started in response to a subsequent search request merely restarts the motherboard MB3.

After completing the search thread, the control process may disconnect the HDD31 from the motherboard MB3 and may interrupt the supply of power to the motherboard MB3 and the HDD31. In this case, since the HDD31 retains the OS and the search program SP therein, the search thread to be started in response to a subsequent search request merely connects the HDD31 to the motherboard MB3 and restarts the motherboard MB3.

A determination as to whether or not the supply of power is interrupted after completing the search thread may be made by the control process depending on the frequency of occurrence of a search request. Alternatively, the console CNSL may provide, together with a search key KEY, an instruction concerning the above-described determination to the control process.

FIG. 26 illustrates examples of the states of the tables TBLs after search HDDs are connected to a motherboard MB by the search thread illustrated in FIG. 25. In other words, FIG. 26 illustrates the states of the tables TBLs before the search thread of the control device 400 starts the search process of the motherboard MB3. The tables MBTBL and HDDTBL illustrated in FIG. 8 have not changed, and thus, an illustration of these tables is omitted in FIG. 26.

As in FIG. 25, in FIG. 26, after the state illustrated in FIG. 15, the HDD1 through HDD4 which have been capturing data have become full of data, and the HDD5 through HDD8 have started to capture data, and then, a search request is issued for the first time. In FIG. 26, shaded areas are portions of the tables TBLs in which the states have changed as a result of starting the search thread.

In FIG. 26, the control device 400 receives a search request from the console CNSL while data is being captured into the HDD5 through HDD8. Data indicating a time and date at which data capturing was performed included in the search request is being retained in the HDD1 through HDD4. The search thread illustrated in FIG. 25 adds information indicating the connection between the motherboard MB3 and the HDD31 and information indicating the connection between the motherboard MB4 and the HDD32 to the table CNTBL. The search thread also sets the states of the motherboards MB3 and MB4 in the table MSTBL to be "searching", and sets the states of the HDD31 and HDD32 in the table HSTBL to be "started".

FIG. 27 illustrates examples of the states of the tables TBLs after the search process illustrated in FIG. 25 has been started. In FIG. 27, shaded areas are portions of the tables TBLs in which the states have changed from the states illustrated in FIG. 26. The tables MBTBL and HDDTBL illustrated in FIG. 8 have not changed, and thus, an illustration of these tables is omitted in FIG. 27.

The search thread illustrated in FIG. 25 updates the tables CNTBL and HSTBL every time each motherboard (in this example, each of MB3 and MB4) starts the search process. The search thread adds information that the HDD1 and HDD2 are connected to the motherboard MB3 and information that the HDD3 and HDD4 are connected to the motherboard MB4 to the table CNTBL. Since the HDD1 through HDD4 are being searched, the states of the HDD1 through HDD4 are set to be "searching" in the table HSTBL. The other states of the table HSTBL are the same as those illustrated in FIG. 26.

In this embodiment, for example, the data capturing operation is performed by the motherboards MB1 and MB2, and the data search operation is performed by the motherboards MB3 and MB4, which are different from the motherboards MB1 and MB2. Accordingly, as in the embodiment illustrated in FIGS. 1 through 4C, the motherboards MB1 and MB2, which are preforming a data capturing operation, are able to stably write data which demands a high throughput, such as voice data, into HDDs, regardless of whether or not a search request has been sent. Meanwhile, the motherboards MB3 and MB4 are able to concentrate on a search operation without being influenced by interrupt of a data capturing operation performed in real time.

FIGS. 28 and 29 illustrate an example of the search thread started in step S300 in FIG. 16. As illustrated in FIG. 25, the search thread is implemented as a result of the control device 400 executing the control program PGM4 in response to a search request input from the console CNSL.

Data to be stored in HDDs is, for example, voice data collected from conversation being carried out on cellular phones and received via a data center. A computer disposed in the data center includes the console CNSL illustrated in FIG. 5. Upon the occurrence of a failure in a communication line of cellular phones, a search key KEY (the start time Ts and the end time Te) including a time and a date on the occurrence of a failure is sent, together with information indicating the number M of motherboards MBs used for performing a search operation, from the console CNSL to the information processing system SYS.

The control device 400 of the information processing system SYS starts the search thread. The search thread specifies HDDs which store voice data defined by the start time Ts and the end time Te, reads the voice data from the HDDs, and sends the read voice data to the console CNSL. The computer in the data center including the console CNSL then analyzes noise, for example, contained in the read voice data received from the information processing system SYS, thereby determining the cause of the failure.

In step S302, the search thread first sets the number of motherboards MBs (search servers) that perform a search operation and the start time and the end time included in the search key KEY received from the console CNSL to be variables M, Ts, and Te, respectively. The search thread also initializes a list LIST indicating HDDs to be searched to be "null". In the list LIST, information indicating HDDs to be searched is registered.

Then, in step S304, the search thread sets a variable K to be 1. The variable K indicates a record number of the table INDTBL in which index information concerning the time stamps (start time and end time) indicating times at which items of data were captured is stored. The record number is a line number of the table INDTBL illustrated in, for example, FIG. 27. In the following description, the line number of the table INDTBL will also be called a "record number K".

Then, in step S306, the search thread determines whether all the records of the INDTBL have been scanned. If all the records have been scanned, the process proceeds to step S316. If not all the records have been scanned, the process proceeds to step S308.

In step S308, the search thread reads the start time and the end time of the K-th record of the table INDTBL (the start time and the end time of data stored in a subject HDD). Then, in step S310, the search thread determines, on the basis of the start time and the end time read from the K-th record, whether the subject HDD stores data which was captured during a period from the start time Ts to the end time Te included in the search key KEY.

For example, if the end time stored in the K-th record is earlier than the start time Ts or if the start time stored in the K-th record is later than the end time Te, the subject HDD does not store data to be searched for. In other words, if one of the start time and the end time stored in the K-th record is included in the period from the start time Ts to the end time Te, the subject HDD stores data to be searched for. If the subject HDD stores data to be searched for, the search thread shifts the process to step S312. If the subject HDD does not store data to be searched for, the search thread shifts the process to step S314.

In step S312, the search thread adds information concerning HDD(K) corresponding to the K-th record in the list LIST. Then, in step S314, the search thread increments the record number K by one, and then returns the process to step S306.

If it is found in step S306 that all the records of the table INDTBL have been scanned, the process proceeds to step S316. In steps S316 through S324, the search thread connects M motherboards MBs that will perform a search operation to associated HDDs. As discussed with reference to FIG. 25, if, after completing the search thread, the control process maintains the connection between the motherboard MB3 and the HDD31, steps S316 through S324 are omitted.

In step S316, the search thread determines whether M motherboards MBs have been selected. If M motherboards MBs have been selected, the search thread shifts the process to step S326. If not all M motherboards MBs have been selected, the search thread shifts the process to step S318.

In step S318, the search thread refers to the table MSTBL and selects one unused motherboard MB from the motherboard pool 100 illustrated in FIG. 5. Then, in step S320, the search thread refers to the table HSTBL and selects one unused startup HDD from the storage drive pool 200 illustrated in FIG. 5.

In step S322, the search thread controls the connecting device 300 so that the selected motherboard MB and the selected HDD may be connected to each other. Then, in step S324, the search thread updates the tables CNTBL, MSTBL, and HSTBL to, for example, the states illustrated in FIG. 26. Then, the process returns to step S316.

If it is found in step S316 that M motherboards MBs have been all selected, the process proceeds to step S326. In steps S326 through S332, the search thread installs the OS and the search program SP into each of the selected M motherboards MBs.

If, after completing the search thread, the control process maintains the connection between the motherboard MB3 and the HDD31 and the supply of power to the motherboard MB3 and the HDD31, steps S326 through S332 are omitted. If, after completing the search thread, the control process interrupts the supply of power to the motherboard MB3 and the HDD31 while maintaining the connection between the motherboard MB3 and the HDD31, steps S326 through S330 are omitted, and the search thread executes step S332 to restart the motherboard MB.

In step S326, the search thread determines whether the selected M motherboards MBs have been initialized. If the selected M motherboards MBs have been all initialized, the process proceeds to step S334. If not all the selected M motherboards MBs have been initialized, the process proceeds to step S328. Steps S328, S330, S332, and S334 are similar to steps S216, S218, S220, and S222, respectively, illustrated in FIG. 17, except that the program to be installed is different, and thus, an explanation thereof will be omitted.

Then, in step S336 of FIG. 29, the search thread sets the value obtained by dividing the number of HDDs registered in the list LIST by the number M of initialized motherboards MBs to be a variable N. The variable N indicates the number of HDD search threads which will be started simultaneously by each motherboard MB operating as a search server. The variable N may be calculated by rounding up the numbers of the decimal places. If the number of HDDs is not divisible by the number of MBs, the variable N may be set for each motherboard MB such that the values of the variable N are almost uniform.

In step S338, the search thread determines whether the search processes of all the motherboards MBs operated as search servers have started. If the search processes of all the motherboards MBs have started, the process proceeds to step S348. If the search processes of all the motherboards MBs have not started, the process proceeds to step S340.

In step S340, the search thread refers to the table MSTBL and selects one of the unused motherboards MBs. Then, in step S342, the search thread selects N HDDs from among HDDs registered in the list LIST. Then, in step S344, the search thread controls the connecting device 300 so that the selected N HDDs may be connected to the selected motherboard MB. Then, in step S346, the search thread updates the tables CNTBL, MSTBL, and HSTBL to, for example, the states illustrated in FIG. 27.

Figure 30:
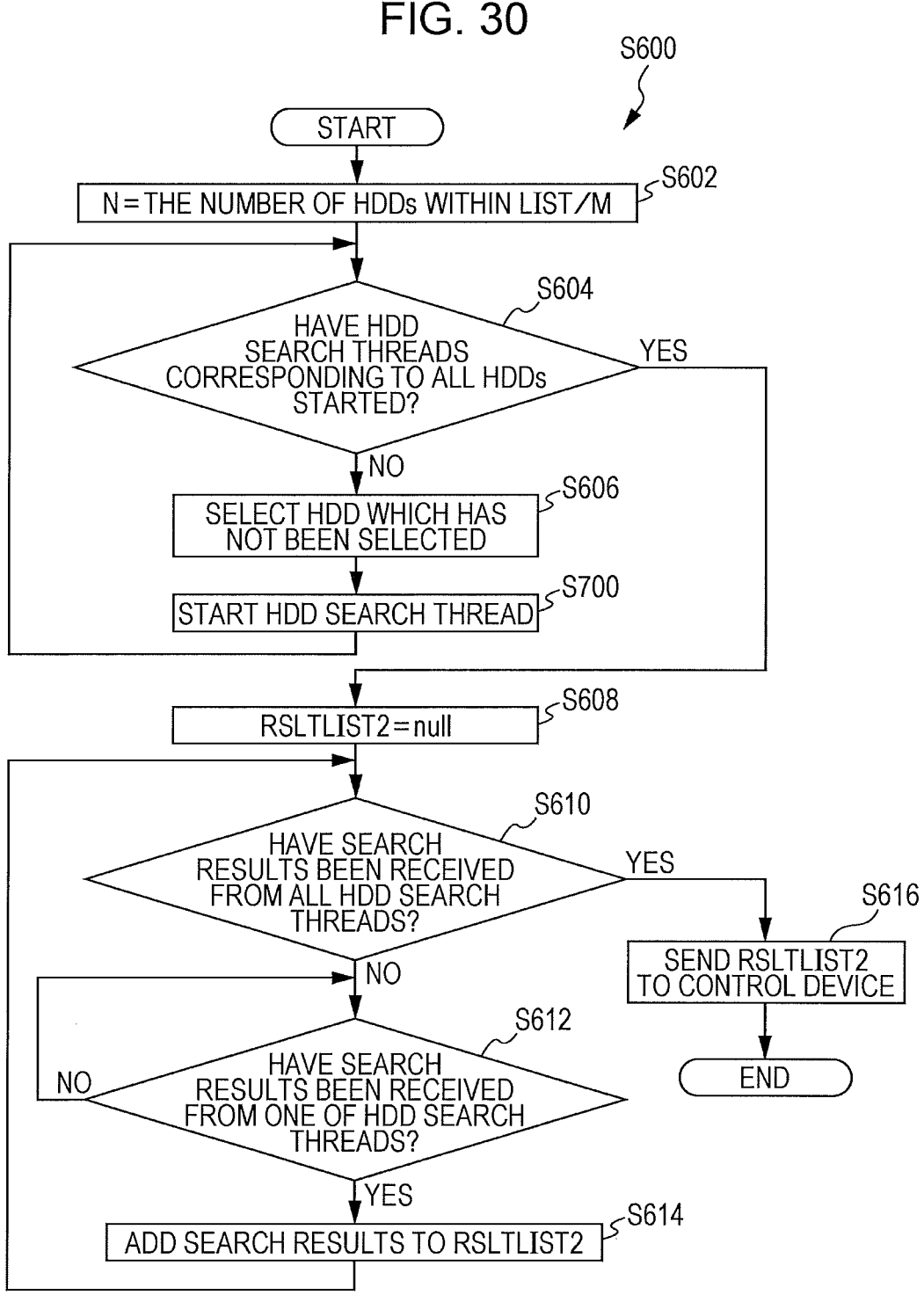
FIG. 30 illustrates an example of a search process started in step S600 in FIG. 29.

In step S600, the search thread starts the search process of the selected motherboard MB. An example of the search process is illustrated in FIG. 30. The process then returns to step S338.

If it is found in step S338 that the search processes of all the motherboards MBs have started, the process proceeds to step S348. In step S348, the search thread initializes a list RSLTLIST1 to be "null". In the RSLTLIST1, for example, search results may be stored, or the addresses of storage areas storing search results may be stored.

Then, in step S350, the search thread determines whether search results of all the motherboards MBs operating as search servers have been received. If search results of all the motherboards MBs have been received, the process proceeds to step S360. If search results of all the motherboards MBs have not been received, the process proceeds to step S352.

In step S352, the search thread determines whether search results of N HDDs have been received from one of the motherboards MBs operating as search servers. If search results of N HDDs have been received, the process proceeds to step S354. If search results of N HDDs have not been received, the process returns to step S350. That is, in step S352, the search thread waits until search results are received from a motherboard MB.

In step S354, the search thread adds the received search results to the list RSLTLIST1. Then, in step S356, the search thread controls the connecting device 300 so that the N HDDs may be disconnected from the motherboard MB that has output the search results.

Then, in step S358, the search thread updates the tables CNTBL, MSTBL, and HSTBL so as to reflect the disconnected HDDs in the tables, and then returns to step S350.

If it is found in step S350 that search results of all the motherboards MBs have been received, the process proceeds to step S360. In step S360, the search thread sends the search results stored in the list RSLTLIST1 to the console CNSL, and terminates the processing. For example, the search thread sends all items of data captured from the start time Ts to the end time Te to the console CNSL.

In step S360, the search thread may send the start address and the end address of a storage area of each HDD in which data captured during a period from the start time Ts to the end time Te is stored to the console CNSL. In this case, the control process receives a command for reading data from the HDD from the console CNSL, reads the data from the HDD, and then sends the read data to the console CNSL.

FIG. 30 illustrates an example of the search process started in step S600 in FIG. 29. The search process is executed for each motherboard MB that has received an instruction to start the search process from the control device 400 by the CPU of the motherboard MB, as illustrated in FIG. 25.

In step S602, the search process sets the value obtained by dividing the number of HDDs registered in the list LIST by the number M of initialized motherboards MBs to be a variable N. The variable N may be calculated in a manner similar to step S336 of FIG. 29.

Then, in step S604, the search process determines whether all HDD search threads corresponding to the HDDs to be searched have started. If all the HDD search threads have started, the process proceeds to step S608. If not all the HDD search threads have started, the process proceeds to step S606.

In step S606, the search process selects an HDD which has not been selected. Then, in step S700, the search process starts the HDD search thread for searching for data stored in the HDD selected in step S606, and then returns to step S604. An example of the HDD search thread is illustrated in FIGS. 31 through 36.

If it is found in step S604 that all HDD search threads have started, the process proceeds to step S608. In step S608, the search process initializes a list RSLTLIST2 to be "null". In the RSLTLIST2, for example, search results may be stored, or the addresses of storage areas storing search results may be stored.

Then, in step S610, the search process determines whether search results have been received from all the started HDD search threads. If search results have been received from all the started HDD search threads, the process proceeds to step S616. If search results have not been received from all the started HDD search threads, the process proceeds to step S612.

In step S612, the search process determines whether search results have been received from one of the HDD search threads. If search results have been received, the process proceeds to step S614. If search results have not been received, step S612 is repeated. That is, in step S612, the search process waits until search results have been received from one of the HDD search threads. In step S614, the search process adds the received search results to the list RSLTLIST2.

If it is found in step S610 that search results have been received from all the started HDD search threads, the process proceeds to step S616. In step S616, the search process sends the search results stored in the list RSLTLIST2 to the control device 400, and terminates the processing.

Figure 31:
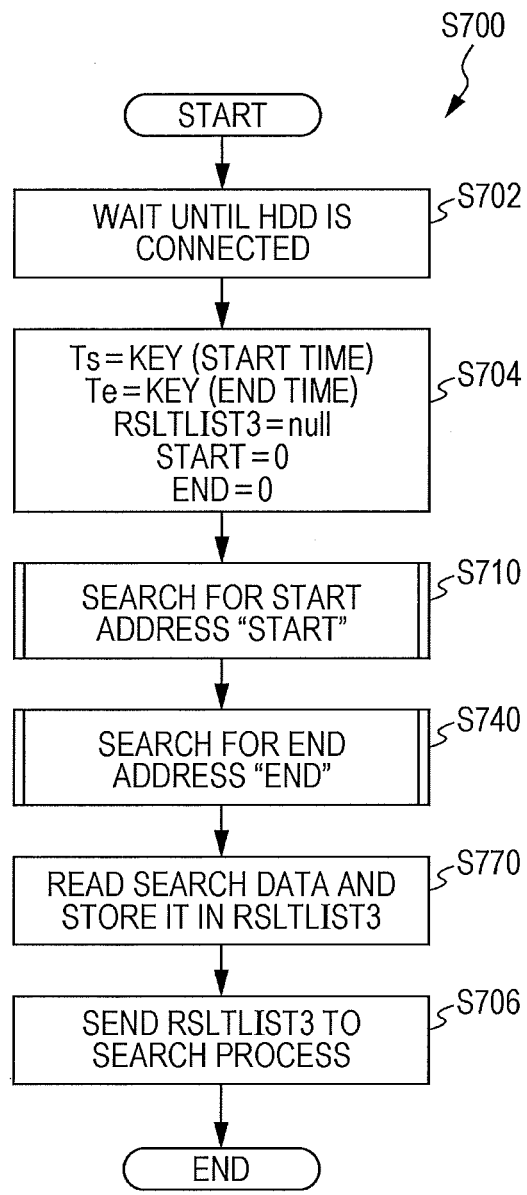
FIG. 31 illustrates an example of an HDD search thread started in step S700 in FIG. 30.

FIG. 31 illustrates an example of the HDD search thread started in step S700 in FIG. 30. As illustrated in FIG. 25, the HDD search thread is executed for each HDD by the CPU of an associated motherboard MB.

In step S702, the HDD search thread waits until a subject HDD is connected to the motherboard MB. The connection between the subject HDD and the motherboard MB is executed by step S344 of FIG. 29. Then, in step S704, the HDD search thread sets the start time and the end time included in the search key KEY to be variables Ts and Te, respectively, and also initializes a list RSLTLIST3 to be "null" and initializes variables START and END to be 0.

In the list RSLTLIST3, for example, data obtained by conducting a search, is stored. In the variable START, the start address of a storage area of each HDD in which data to be searched for is stored, which is determined in step S710, is stored. In the variable END, the end address of a storage area of each HDD in which data to be searched for is stored, which is determined in step S740, is stored.

The start time and the end time included in the search key KEY may also be referred to as the "start time Ts" and "end time Te", respectively. The start address and the end address of a storage area of each HDD in which data to be searched for is stored may also be referred to as the "start address START" and "end address END", respectively.

Figure 33:
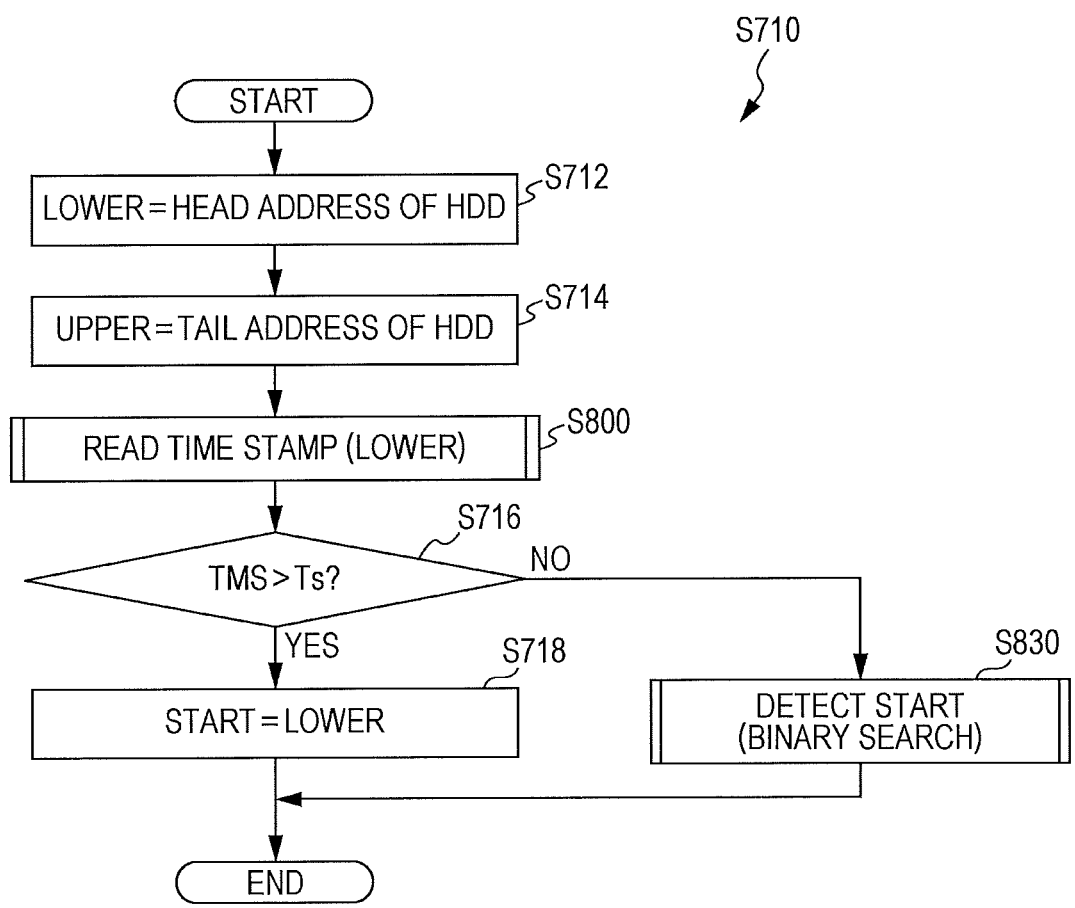
FIG. 33 illustrates an example of a start address search routine started in step S710 of FIG. 31.

Then, in step S710, the HDD search thread starts a start address search routine illustrated in FIG. 33. In the start address search routine, the start address START of a storage area in an HDD in which data to be searched for is stored is determined. Then, in step S740, the HDD search thread starts an end address search routine illustrated in FIG. 34. In the end address search routine, the end address END of a storage area in an HDD in which data to be searched for is stored is determined.

Then, in step S770, the HDD search thread reads, as search data, data stored in an area from the start address START to the end address END of an HDD, and stores the read search data in the list RSLTLIST3. Then, in step S706, the HDD search thread sends the search data stored in the list RSLTLIST3 to the search process illustrated in FIG. 30.

Figure 32:
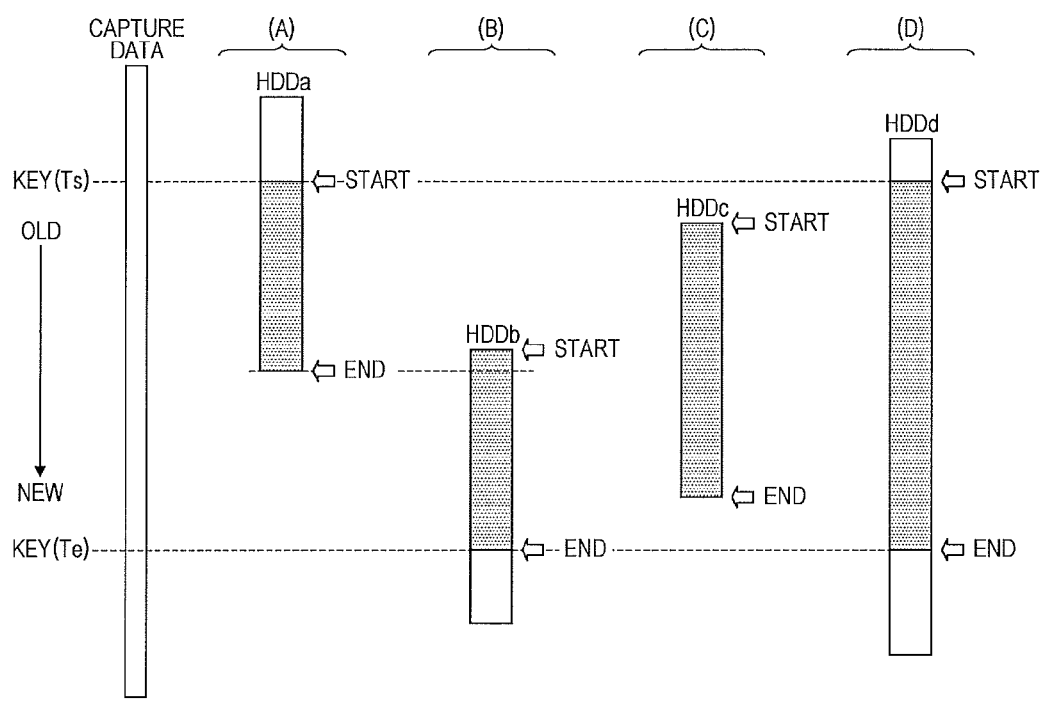
FIG. 32 illustrates examples of a start address START and an end address END determined by the HDD search thread illustrated in FIG. 31.

FIG. 32 illustrates examples of the start address START and the end address END determined by the HDD search thread illustrated in FIG. 31. In FIG. 32, shaded areas are items of search data read from the HDDs in step S770 of FIG. 31.

(A) of FIG. 32 illustrates an example in which data stored in an HDDa searched by the HDD search thread includes the start time Ts and does not include the end time Te. In this case, the address at which an item of data corresponding to the start time Ts is stored is determined to be the start address START, and the address at which the final item of data is stored is determined to be the end address END.

(B) of FIG. 32 illustrates an example in which data stored in an HDDb searched by the HDD search thread does not include the start time Ts and includes the end time Te. In this case, the address at which the first item of data is stored is determined to be the start address START, and the address at which an item of data corresponding to the end time Te is stored is determined to be the end address END.

As discussed with reference to FIG. 24, if items of data are sequentially written into a plurality of HDDs, while HDDs are being switched, data is written into the two HDDs at the same time. For example, in FIG. 32, during a time for which data is written into the HDDa and HDDb at the same time, the HDDa is being switched to the HDDb.

(C) of FIG. 32 illustrates an example in which data stored in an HDDc searched by the HDD search thread includes neither of the start time Ts nor the end time Te and is disposed between the start time Ts and the end time Te. In this case, the address at which the first item of data is stored is determined to be the start address START, and the address at which the final item of data is stored is determined to be the end address END.

(D) of FIG. 32 illustrates an example in which data stored in an HDDd searched by the HDD search thread includes both of the start time Ts and the end time Te. In this case, the address at which an item of data corresponding to the start time Ts is stored is determined to be the start address START, and the address at which an item of data corresponding to the end time Te is stored is determined to be the end address END.

FIG. 33 illustrates an example of the start address search routine started in step S710 of FIG. 31. The start address search routine is started from the HDD search thread and is executed for each HDD by the CPU of an associated motherboard MB. The start address search routine calculates, for example, the start address START illustrated in FIG. 32.

In step S712, the start address search routine stores the head address of an HDD in a variable LOWER. Then, in step S714, the start address search routine stores the tail address of the HDD in a variable UPPER.

Then, in step S800, the start address search routine starts a time stamp read routine and reads a time stamp, which is a time at which the first item of data stored in the HDD was captured, by using the variable LOWER as a parameter. In the following description, a code TMS indicates a time stamp or a value of the time stamp (that is, the time at which data was captured).

Then, in step S716, the start address search routine determines whether the time indicated by the time stamp TMS is later than the start time Ts included in the search key KEY. If the time indicated by the time stamp TMS is later than the start time Ts (TMS>Ts), the process proceeds to step S718. For example, in the case of (B) and (C) of FIG. 32, step S718 is executed. If the time indicated by the time stamp TMS is equal to or earlier than the start time Ts, the process proceeds to step S830. For example, in the case of (A) and (D) of FIG. 32, step S830 is executed.

In step S718, the start address search routine sets the head address of the HDD to be the start address START, as indicated in (B) and (C) of FIG. 32. If, as indicated in (A) and (D) of FIG. 32, data corresponding to the start time Ts is stored in the midpoint of the storage area of the HDD, the start address search routine starts a start address detect routine in step S830 so as to determine the start address START by using a binary search algorithm.

Figure 34:
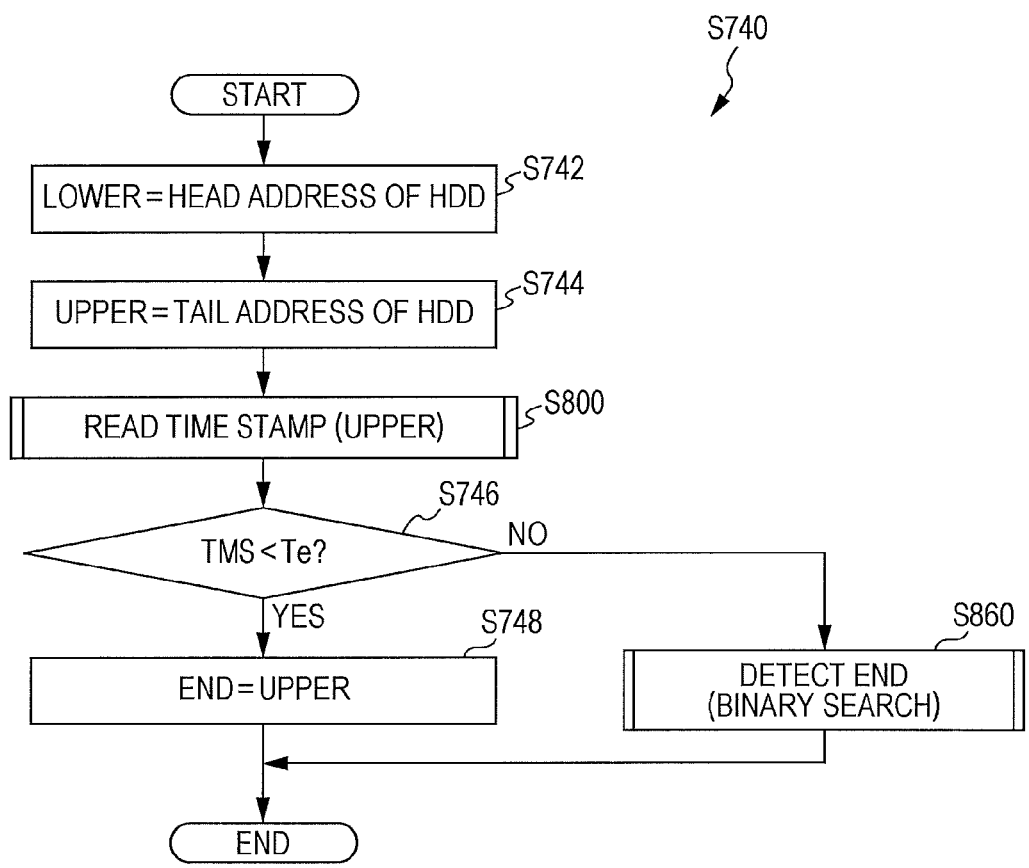
FIG. 34 illustrates an example of an end address search routine started in step S740 of FIG. 31.

FIG. 34 illustrates an example of the end address search routine started in step S740 of FIG. 31. The end address search routine is started from the HDD search thread and is executed for each HDD to be searched by the CPU of an associated motherboard MB. The end address search routine calculates, for example, the end address END illustrated in FIG. 32.

In step S742, the end address search routine stores the head address of an HDD in a variable LOWER. Then, in step S744, the end address search routine stores the tail address of the HDD in a variable UPPER.

Then, in step S800, the end address search routine starts the time stamp read routine and reads a time stamp TMS, which is a time at which the final item of data stored in the HDD was captured, by using the variable UPPER as a parameter.

Then, in step S746, the end address search routine determines whether the time indicated by the time stamp TMS is earlier than the end time Te included in the search key KEY. If the time indicated by the time stamp TMS is earlier than the end time Te (TMS<Te), the process proceeds to step S748. For example, in the case of (A) and (C) of FIG. 32, step S748 is executed. If the time indicated by the time stamp TMS is equal to or later than the end time Te, the process proceeds to step S860. For example, in the case of (B) and (D) of FIG. 32, step S860 is executed.

In step S748, the end address search routine sets the tail address of the HDD to be the end address END, as indicated in (A) and (C) of FIG. 32. If, as indicated in (B) and (D) of FIG. 32, data corresponding to the end time Te is stored in the midpoint of the storage area of the HDD, the end address search routine starts an end address detect routine in step S860 so as to determine the end address END by using a binary search algorithm.

Figure 35:
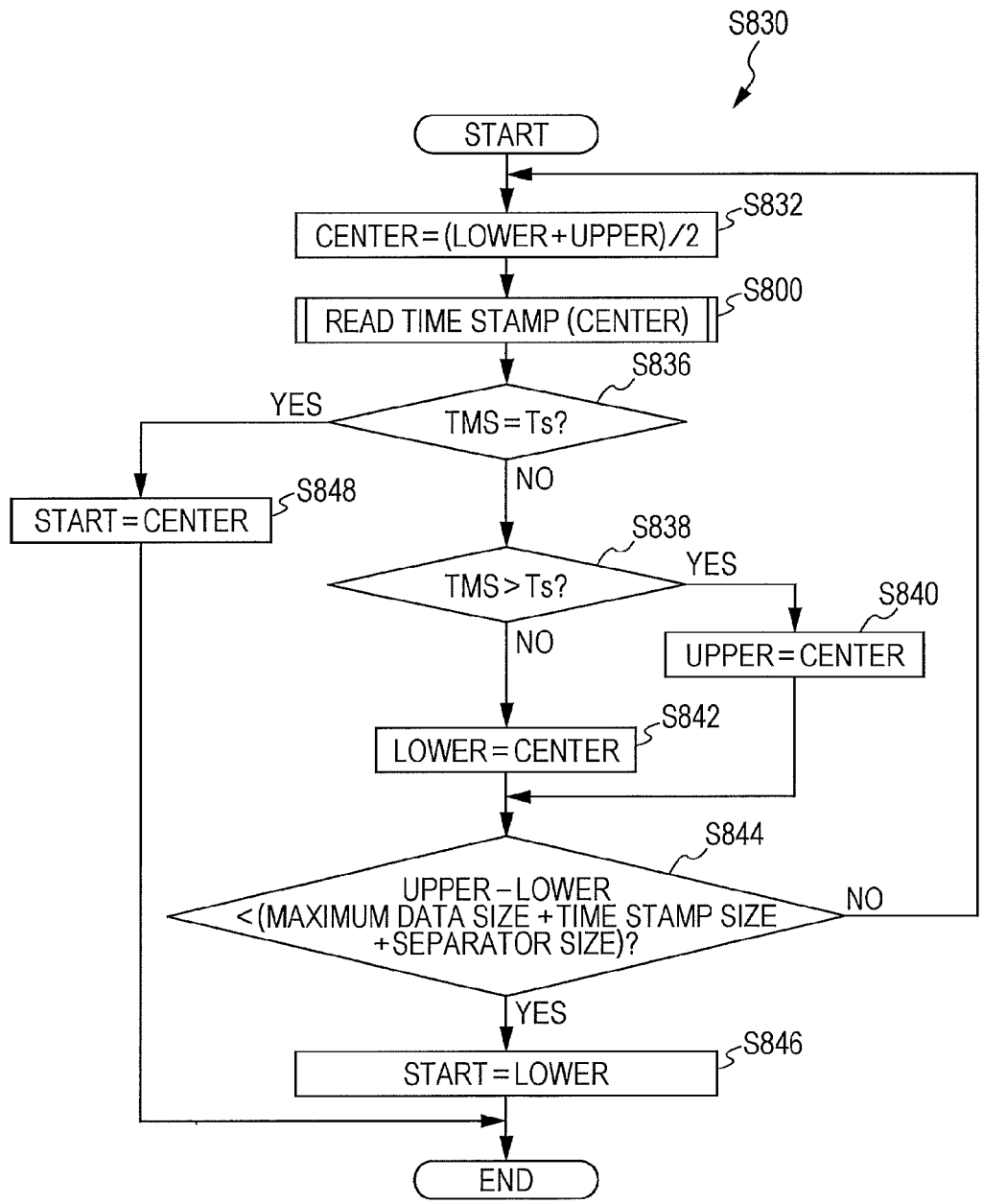
FIG. 35 illustrates an example of a start address detect routine started in step S830 of FIG. 33.

FIG. 35 illustrates an example of the start address detect routine started in step S830 of FIG. 33. The start address detect routine is executed for each HDD to be searched by the CPU of an associated motherboard MB. In the start address detect routine, the start address START positioned in the midpoint of a storage area of the HDD ((A) and (D) of FIG. 32) is detected by using the binary search algorithm.

In step S832, the start address detect routine sets an intermediate address that is half the head address (LOWER) and the tail address (UPPER) of an HDD to be a variable CENTER. In the following description, the value set as the variable CENTER may also be referred to as the "center address CENTER".

Then, in step S800, the start address detect routine starts the time stamp read routine and reads a time stamp, which is a time at which an item of data stored in the storage area of the HDD at the center address CENTER was captured. The start address detect routine then sets the value of the read time stamp to be the variable TMS.

Then, in step S836, the start address detect routine determines whether the time indicated by the time stamp TMS is the same as the start time Ts. If the time indicated by the time stamp TMS is the same as the start time Ts, it means that the start address START has been detected, and thus, the process proceeds to step S848. If the time indicated by the time stamp TMS is not the same as the start time Ts, the process proceeds to step S838 in order to detect the start address START.

In step S838, the start address detect routine determines whether the time indicated by the time stamp TMS is later than the start time Ts. If the time indicated by the time stamp TMS is later than the start time Ts (TMS>Ts), it means that the start address START is positioned closer to the head address LOWER than the center address CENTER, and thus, the process proceeds to step S840. If the time indicated by the time stamp TMS is earlier than the start time Ts, it means that the start address START is positioned closer to the tail address UPPER than the center address CENTER, and thus, the process proceeds to step S842.

In step S840, in order to search for the storage area of the HDD corresponding to address values smaller than the center address CENTER, the start address detect routine sets the center address CENTER to be a new tail address UPPER, and shifts the process to step S844. In step S842, in order to search for the storage area of the HDD corresponding to address values larger than the center address CENTER, the start address detect routine sets the center address CENTER to be a new head address LOWER, and shifts the process to step S844.

In step S844, the start address detect routine determines whether the area to be searched for has become smaller than the size of a data unit illustrated in FIG. 19. For example, the start address detect routine compares the difference between the current tail address UPPER and the current head address LOWER with the size of the data unit. The size of the data unit is the sum of the maximum data size, the size of the time stamp, and the size of the separator. If the area to be searched for has become smaller than the size of the data unit, the start address detect routine terminates the binary search algorithm and shifts the process to step S846. If the area to be searched for is equal to or larger than the size of the data unit, the process returns to step S832, and a new area obtained by setting an intermediate address that is half the head address (LOWER) and the tail address (UPPER) is searched for.

In step S846, the start address detect routine sets the current head address LOWER to be the start address START and terminates the processing. In step S848, the start address detect routine sets the current center address CENTER to be the start address START and terminates the processing.

Figure 36:
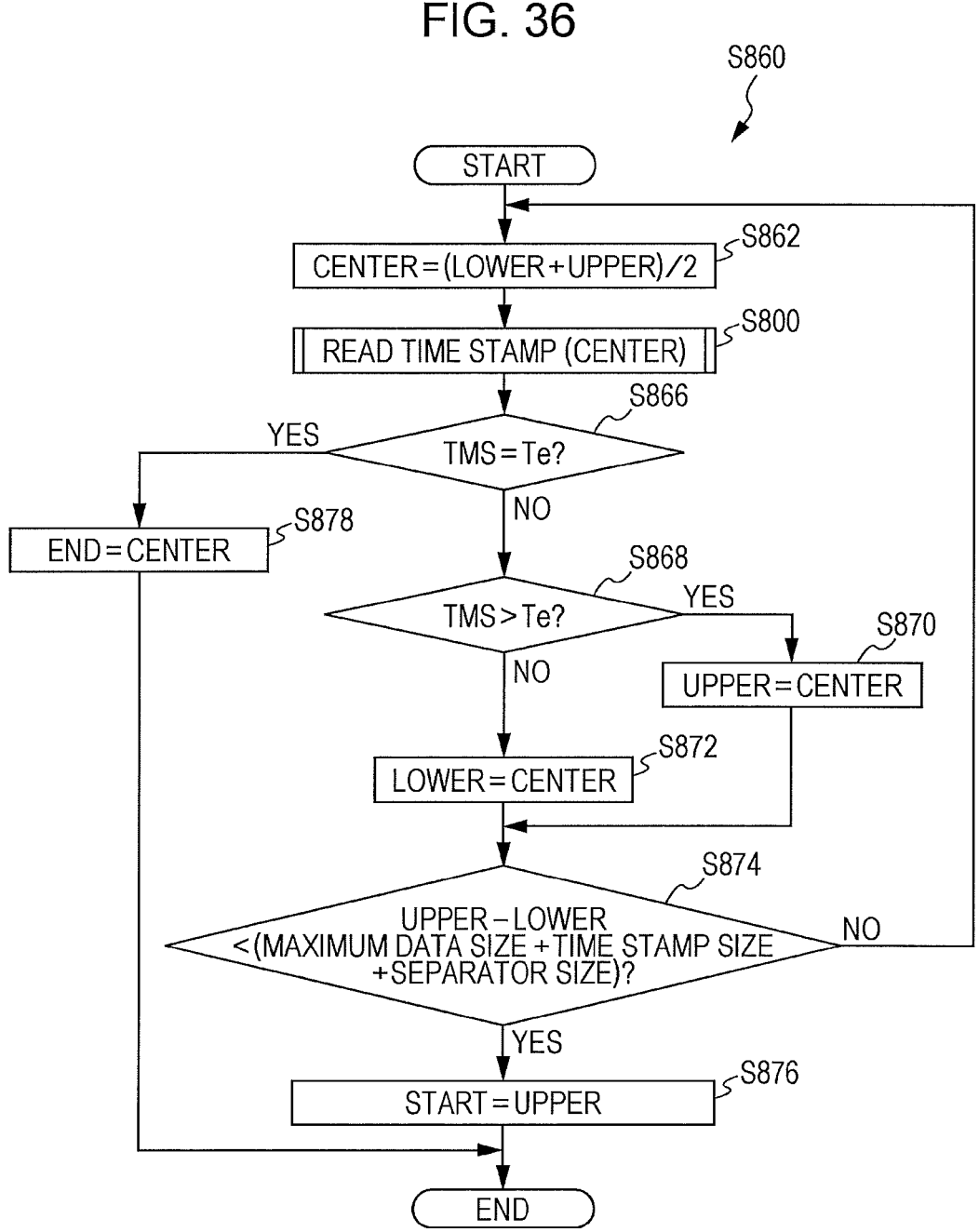
FIG. 36 illustrates an example of an end address detect routine started in step S860 of FIG. 34.

FIG. 36 illustrates an example of the end address detect routine started in step S860 of FIG. 34. The end address detect routine is executed for each HDD to be searched by the CPU of an associated motherboard MB. In the end address detect routine, the end address END positioned in the midpoint of a storage area of the HDD ((B) and (D) of FIG. 32) is detected by using the binary search algorithm.

In step S862, the end address detect routine sets an intermediate address that is half the head address (LOWER) and the tail address (UPPER) of an HDD to be a variable CENTER. Then, in step S800, the end address detect routine starts the time stamp read routine and reads a time stamp, which is a time at which an item of data stored in the storage area of the HDD at the center address CENTER was captured. The end address detect routine then sets the value of the read time stamp to be the variable TMS.

Then, in step S866, the end address detect routine determines whether the time indicated by the time stamp TMS is the same as the end time Te. If the time indicated by the time stamp TMS is the same as the end time Te, it means that the end address END has been detected, and thus, the process proceeds to step S878. If the time indicated by the time stamp TMS is not the same as the end time Te, the process proceeds to step S868 in order to detect the end address END.

In step S868, the end address detect routine determines whether the time indicated by the time stamp TMS is later than the end time Te. If the time indicated by the time stamp TMS is later than the end time Te (TMS>Te), it means that the end address END is positioned closer to the head address LOWER than the center address CENTER, and thus, the process proceeds to step S870. If the time indicated by the time stamp TMS is earlier than the end time Te, it means that the end address END is positioned closer to the tail address UPPER than the center address CENTER, and thus, the process proceeds to step S872.

In step S870, in order to search for the storage area of the HDD corresponding to address values smaller than the center address CENTER, the end address detect routine sets the center address CENTER to be a new tail address UPPER, and shifts the process to step S874. In step S872, in order to search for the storage area of the HDD corresponding to address values larger than the center address CENTER, the end address detect routine sets the center address CENTER to be a new head address LOWER, and shifts the process to step S874.

In step S874, as in step S844 of FIG. 35, the end address detect routine determines whether the area to be searched for has become smaller than the size of a data unit illustrated in FIG. 19. If the area to be searched for has become smaller than the size of the data unit, the end address detect routine terminates the binary search algorithm and shifts the process to step S876. If the area to be searched for is equal to or larger than the size of the data unit, the process returns to step S862, and a new area obtained by setting an intermediate address that is half the head address (LOWER) and the tail address (UPPER) is searched for.

In step S876, the end address detect routine sets the current tail address UPPER to be the end address END and terminates the processing. In step S878, the end address detect routine sets the current center address CENTER to be the end address END and terminates the processing.

Figure 37:
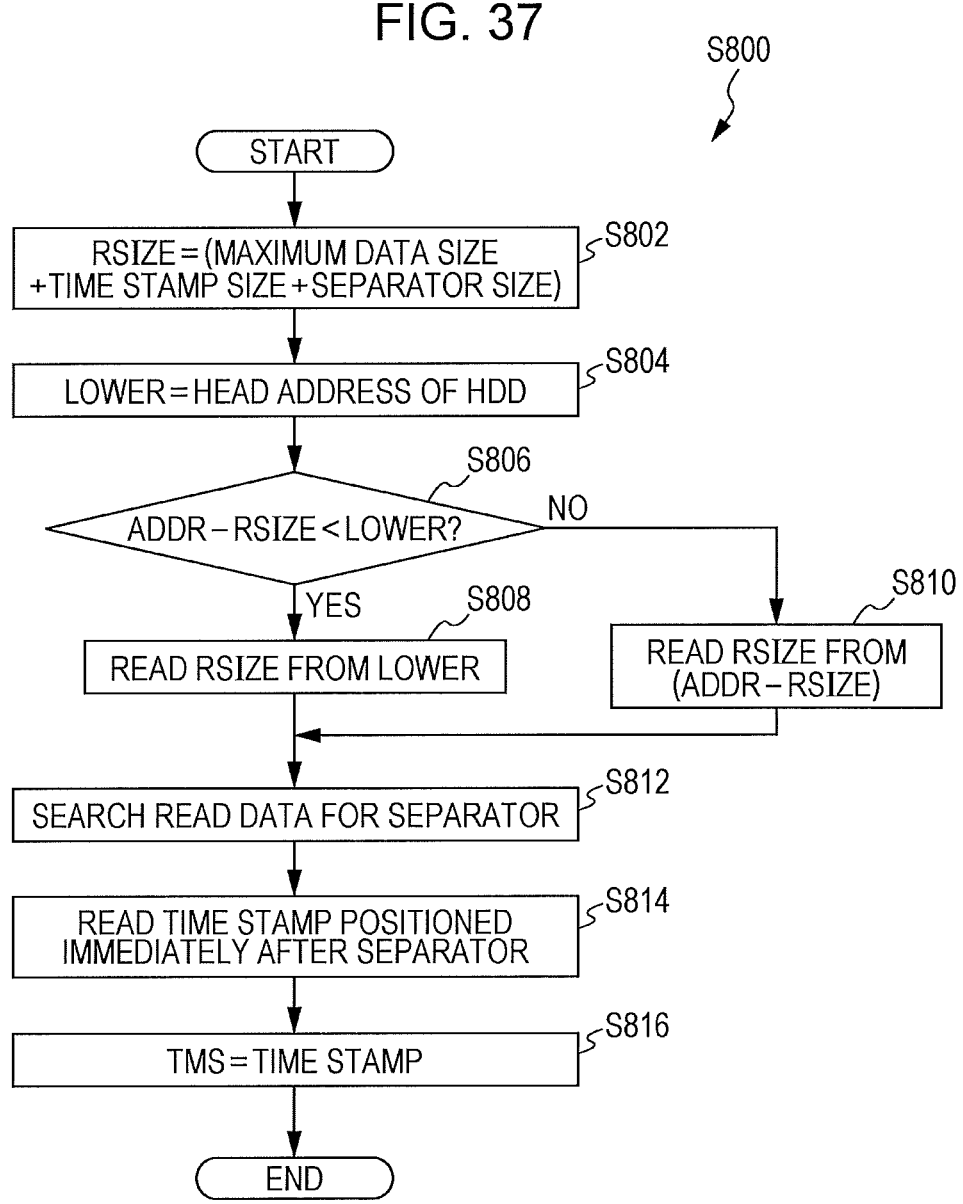
FIG. 37 illustrates an example of a time stamp read routine started in step S800 illustrated in FIGS. 33 through 36.

FIG. 37 illustrates an example of the time stamp read routine started in step S800 illustrated in FIGS. 33, 34, 35, and 36. The time stamp read routine is executed for each HDD to be searched by the CPU of an associated motherboard MB.

In step S802, the time stamp read routine sets the size of the data unit illustrated in FIG. 19 to be a variable RSIZE. In the following description, the size of the data unit may also be referred to as the "size RSIZE". The size RSIZE is the sum of the maximum data size, the size of the time stamp, and the size of the separator illustrated in FIG. 19.

Then, in step S804, the time stamp read routine stores the head address of the HDD in the variable LOWER. If the time stamp read routine is able to refer to the variable LOWER in step S712 of FIG. 33 and step S742 of FIG. 34, step S804 may be omitted.

Then, in step S806, the time stamp read routine determines whether the address obtained by subtracting the size RSIZE from an argument ADDR of the start address search routine or the end address search routine is smaller than the variable LOWER (head address).

For example, the argument ADDR indicates the head address of the HDD in the start address search routine and indicates the tail address of the HDD in the end address search routine. The argument ADDR also indicates an address positioned in a midpoint of a storage area of the HDD in the start address detect routine or the end address detect routine.

If the address obtained by subtracting the size RSIZE from the argument ADDR is smaller than the head address, the process proceeds to step S808. If the address obtained by subtracting the size RSIZE from the argument ADDR is not smaller than the head address, the process proceeds to step S810.

In step S808, the time stamp read routine reads data for an amount of the size RSIZE from the variable LOWER (head address) and shifts the process to step S812. In step S810, the time stamp read routine reads data for an amount of the size RSIZE from the address obtained by subtracting the size RSIZE from the argument ADDR, and shifts the process to step S812.

In step S812, the time stamp read routine searches for the read data from the head so as to detect the separator. Then, in step S814, the time stamp read routine reads the time stamp positioned immediately after the detected separator. Then, in step S816, the time stamp read routine sets the value of the read time stamp to be the variable TMS, and returns to the calling routine.

Figure 38:
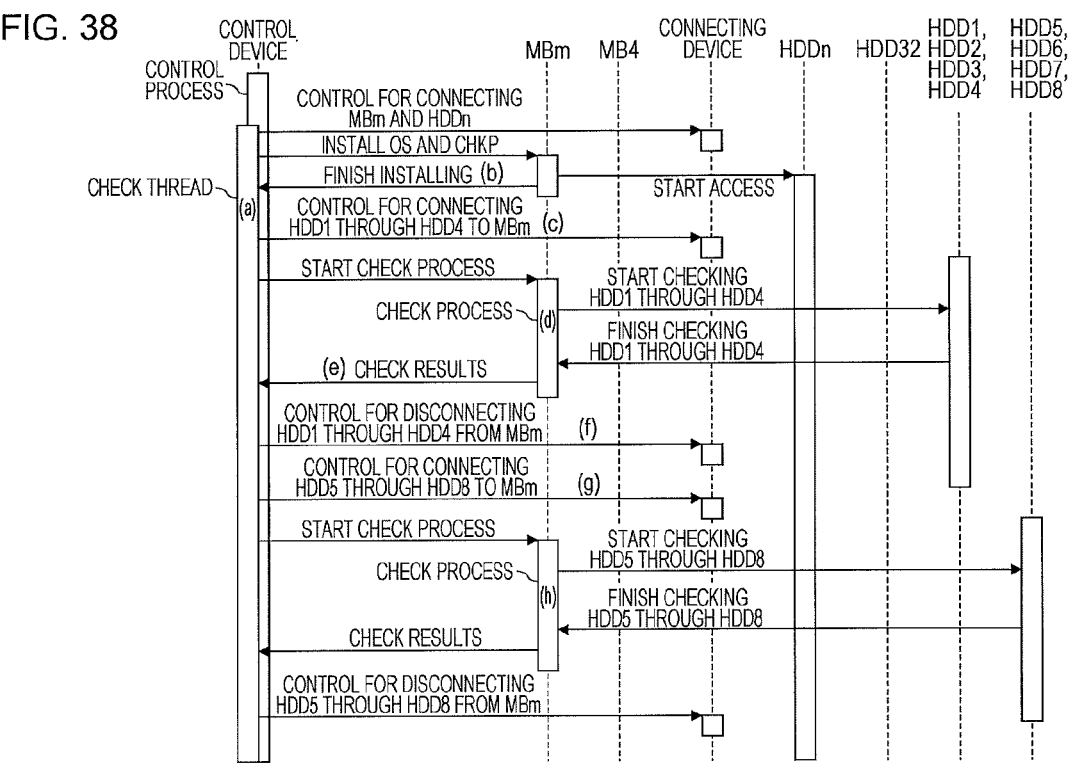
FIG. 38 illustrates an example of a sequence of a checking operation performed by the information processing system illustrated in FIG. 5.

FIG. 38 illustrates an example of a sequence of a checking operation performed by the information processing system SYS illustrated in FIG. 5. That is, FIG. 38 illustrates an example of a sequence concerning the information processing system SYS which operates as a check device for data-capturing HDDs. In the following description, the operation performed by the control device 400 illustrated in FIG. 7 includes an operation performed by the CPU4 of the control device 400, and the operation performed by the motherboards MBs includes an operation performed by the CPUs of the motherboards MBs.

The checking operation is performed by operating a plurality of motherboards MBs as check servers for checking data-capturing HDDs. However, for the sake of simple representation, in FIG. 38, a checking operation performed by only one motherboard MBm (m is a positive integer) is illustrated.

After the control process is started, the check thread is started by the control process without receiving a check request from an external source ((a) of FIG. 38). The check thread outputs control information for connecting an unused motherboard MBm within the motherboard pool 100 illustrated in FIG. 5 and unused startup HDDn (n is a positive integer) within the storage drive pool 200 to the connecting device 300. The connecting device 300 then connects the motherboard MBm and the HDDn on the basis of the control information. After the motherboard MBm and the HDDn have been connected to each other, the check thread installs an OS and a check program CHKP into the HDDn through the use of the motherboard MBm. Installation may be performed by transferring data from the storage device BT illustrated in FIG. 5 by using a remote installation method, such as a kickstart installation method.

After installing the OS and the check program CHKP into the HDDn, the motherboard MBm is restarted. The CPU of the motherboard MBm executes the OS and starts to access the HDDn. The motherboard MBm also sends an installation completion response indicating that installation has been completed to the check thread ((b) of FIG. 38).

Upon receiving an installation completion response, the check thread outputs control information for connecting, for example, the HDD1 through HDD4, which are not performing a capture operation, to the motherboard MBm to the connecting device 300 ((c) of FIG. 38). The connecting device 300 connects the HDD1 through HDD4 to the motherboard MBm on the basis of the control information.

In the example illustrated in FIGS. 38 through 55, data is redundantly written into a pair of HDDs. For example, data is redundantly written into the HDD1 and HDD2, and data is redundantly written into the HDD3 and HDD4. That is, the information processing system SYS functions as a RAID1 which performs data mirroring.

Then, the check thread outputs an instruction to start the check process to the motherboard MBm. The motherboard MBm starts the check process in response to this instruction ((d) of FIG. 38). The check process starts to check the HDD1 through HDD4, and upon completing checking of the HDD1 through HDD4, the check process sends check results to the check thread ((e) of FIG. 38).

Upon completing checking of the HDD1 through HDD4, the check thread outputs control information for disconnecting the HDD1 through HDD4 from the motherboard MBm to the connecting device 300 ((f) of FIG. 38). The connecting device 300 disconnects the HDD1 through HDD4 from the motherboard MBm on the basis of the control information.

Then, the check thread outputs control information for connecting the HDD5 through HDD8, which are not performing a capturing operation, to the motherboard MBm to the connecting device 300 ((g) of FIG. 38). The connecting device 300 connects the HDD5 through HDD8 to the motherboard MBm on the basis of the control information.

Then, the check thread outputs an instruction to start the check process to the motherboard MBm. The motherboard MBm starts the check process in response to this instruction ((h) of FIG. 38). The check process starts to check the HDD5 through HDD8, as in the HDD1 through HDD4, and upon completing checking of the HDD5 through HDD8, the check process sends check results to the check thread. Thereafter, HDDs which are not performing a capturing operation are sequentially checked.

FIG. 39 illustrates examples of the states of the tables TBLs when the check process illustrated in FIG. 38 is started. The tables MBTBL and HDDTBL illustrated in FIG. 8 have not changed, and thus, an illustration of these tables is omitted in FIG. 39. In this example, the motherboard MBm and HDDn illustrated in FIG. 38 is the motherboard MB3 and the HDD31, respectively. In FIG. 39, shaded areas are portions which have been set before the check thread starts the check process.

As illustrated in FIG. 38, before starting the check process, the check thread connects the motherboard MB3 and the HDD31 and installs the check program CHKP into the motherboard MB3. Accordingly, the check thread adds information indicating the connection between the motherboard MB3 and the HDD31 to the table CNTBL. The check thread also sets the state of the motherboard MB3 in the table MSTBL to "checking" and sets the state of the HDD31 in the table HSTBL to "started".

In the table HSTBL, the arrows with "mirror" indicate that two HDDs are retaining the same data. That is, by performing data mirroring on two HDDs, even if one HDD fails, destroyed data in the failed HDD is possible to restore by using data stored in the other HDD.

Figure 40:
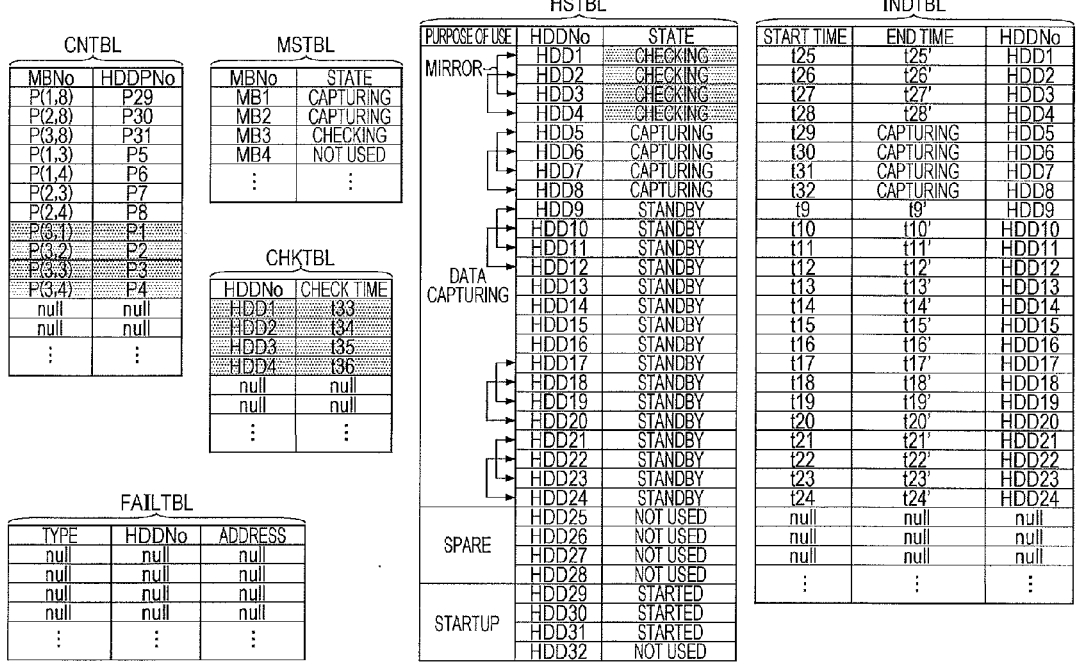
FIG. 40 illustrates an example of the states of the tables when the check process illustrated in FIG. 38 is being executed.

FIG. 40 illustrates an example of the states of the tables TBLs when the check process illustrated in FIG. 38 is being executed. In FIG. 40, shaded areas are portions of the tables TBLs in which the states have changed from the states illustrated in FIG. 39. The tables MBTBL and HDDTBL illustrated in FIG. 8 have not changed, and thus, an illustration of these tables is omitted in FIG. 40.

The check thread connects the motherboard MB3, which executes the check program CHKP, and HDDs (in this example, HDD1, HDD2, HDD3, and HDD4) and checks the HDDs. Accordingly, the check thread adds information indicating the connection between the motherboard MB3 and the HDD1 through HDD4 to the table CNTBL, and sets the states of the HDD1 through HDD4 in the table HSTBL to "checking". The check thread also stores HDD1 through HDD4 as HDDNo and time t33, t34, t35, and t36 at which checking of the HDD1 through HDD4, respectively, started in the table CHKTBL. The other states of the tables TBLs are the same as those illustrated in FIG. 39.

In this embodiment, for example, the data capturing operation is performed by the motherboards MB1 and MB2, and the data checking operation is performed by the motherboard MB3, which is different from the motherboards MB1 and MB2. Accordingly, as in the embodiment illustrated in FIGS. 1 through 4C, the motherboards MB1 and MB2, which are preforming a data capturing operation, are able to stably write data which demands a high throughput, such as voice data, into HDDs, without being influenced by the checking of HDDs. Meanwhile, the motherboard MB3 is able to concentrate on a checking operation without being influenced by interrupt of a data capturing operation performed in real time.

FIG. 41 illustrates an example of the check thread started in step S400 illustrated in FIG. 16. The check thread is implemented by executing the control program by the CPU4 of the control device 400.

In step S402, the check thread sets the number of motherboards MBs which will operate as check servers to be a variable N and sets the number of HDDs to be checked by each motherboard MB to be a variable M. The values to be set to be N and M are determined by the control process in advance, or are provided by the console CNSL together with a capture start instruction illustrated in FIG. 9.

Then, in step S404, the check thread initializes the table CHKTBL to be "null", as illustrated in FIG. 39. Then, in step S406, the check thread determines whether M motherboards MBs have been selected. If M motherboards MBs have been selected, the process proceeds to step S416. If not all M motherboards MBs have been selected, the process proceeds to step S408.

In step S408, the check thread refers to the table MSTBL and selects one unused motherboard MB. Then, in step S410, the check thread refers to the table HSTBL and selects one unused startup HDD.

Then, in step S412, the check thread controls the connecting device 300 so that the selected motherboard MB and the selected startup HDD may be connected to each other. Then, in step S414, the check thread updates the tables CNTBL, MSTBL, and HSTBL. Examples of the updated tables TBLs are illustrated in FIG. 39. The check thread repeats steps S408 through S414 until all the motherboards MBs that will perform a checking operation have been selected.

If it is found in step S406 that all the motherboards MBs have been selected, the check thread installs the OS and the check program CHKP into each of the M motherboards MBs in steps S416 through S424. More specifically, in step S416, the check thread determines whether the selected M motherboards MBs have been initialized. If the selected M motherboards MBs have been initialized, the process proceeds to step S424. If not all the selected M motherboards MBs have been initialized, the process proceeds to step S418. Steps S418, S420, S422, and S424 are similar to steps S216, S218, S220, and S222, respectively, illustrated in FIG. 17, except that the program to be installed is different, and thus, an explanation thereof will be omitted.

Figure 42:
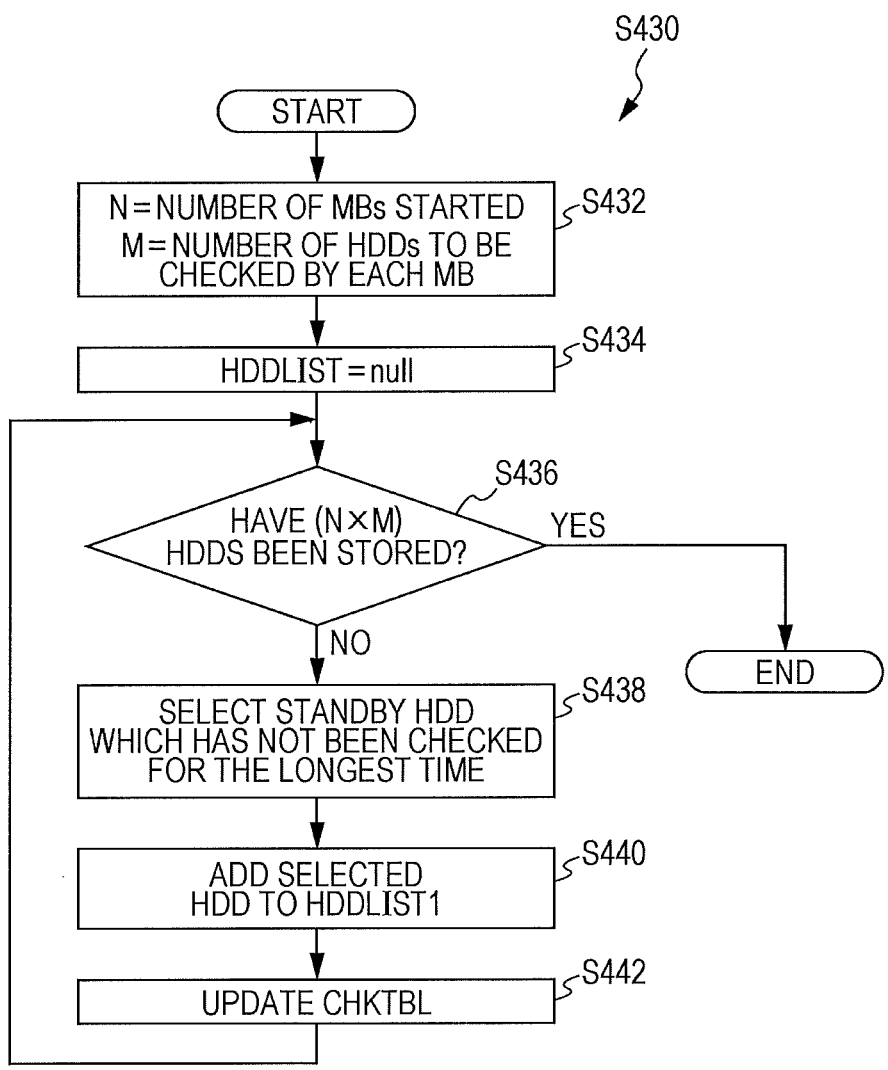
FIG. 42 illustrates an example of an HDD select routine called by step S430 of FIG. 41.
Figure 43:
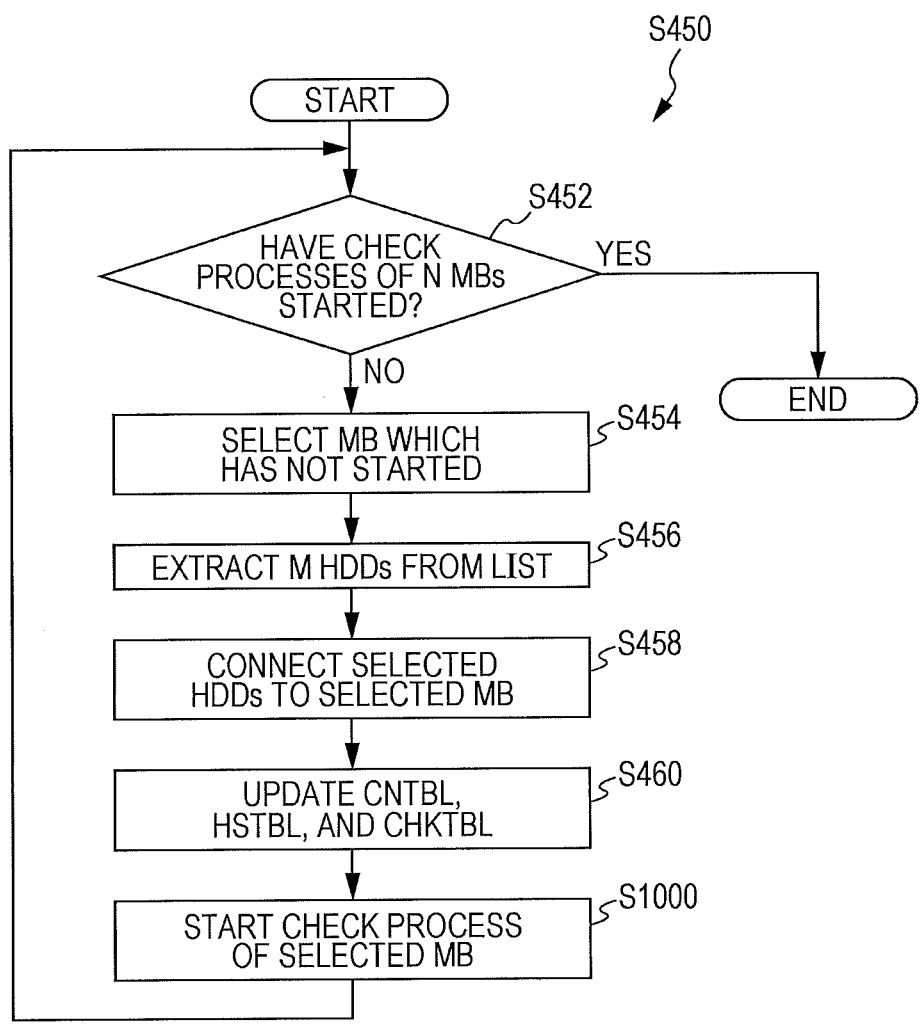
FIG. 43 illustrates an example of a check process start routine called by step S450 of FIG. 41.
Figure 44:
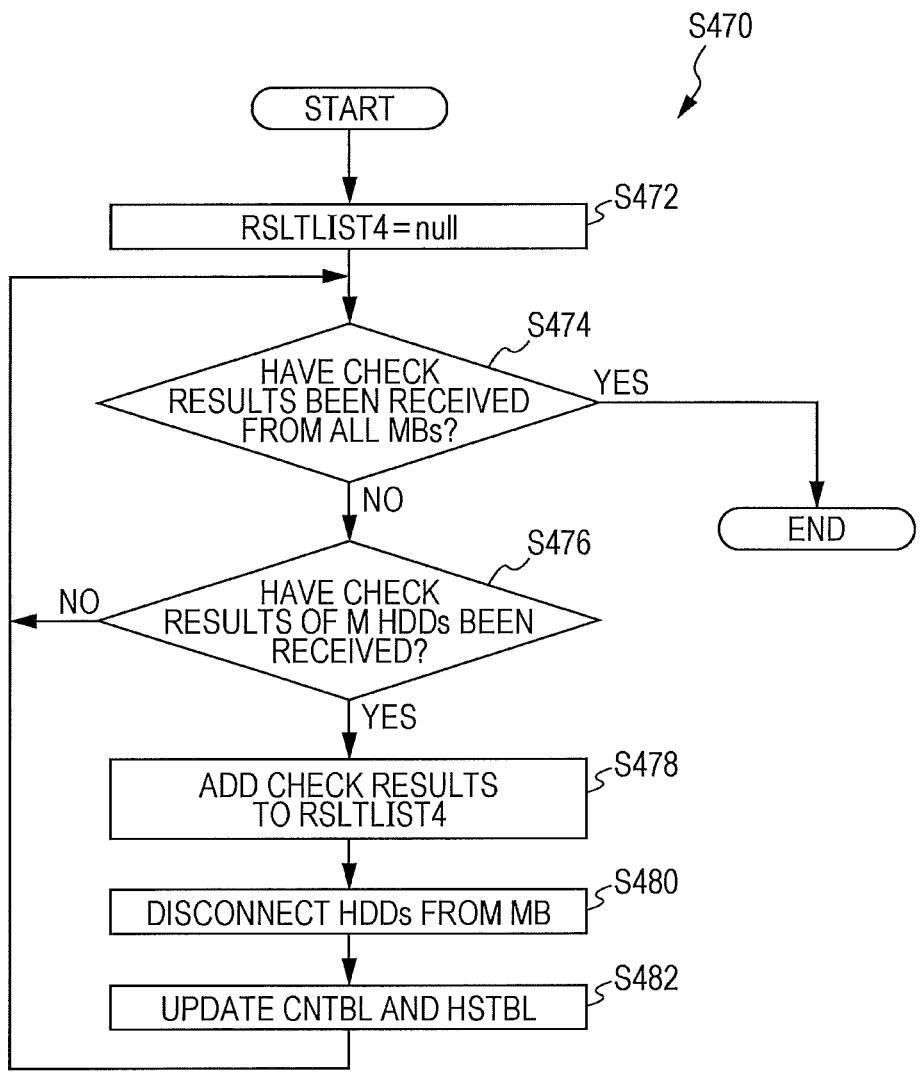
FIG. 44 illustrates an example of a check result receive routine called by step S470 of FIG. 41.

In step S430, the check thread starts an HDD select routine for selecting an HDD to be checked. In step S450, the check thread starts a check process start routine for starting a check process. In step S470, the check thread starts a check result receive routine for receiving check results. An example of the HDD select routine is illustrated in FIG. 42. An example of the check process start routine is illustrated in FIG. 43. An example of the check result receive routine is illustrated in FIG. 44.

Then, in step S426, the check thread determines whether information indicating the occurrence of an error in an HDD is included in the check results received from the check process. If information indicating the occurrence of an error is included in the check results, the process proceeds to step S900. If information indicating the occurrence of an error is not included in the check results, the process returns to step S430, and the check thread checks the next HDD. An error occurring in an HDD is a failure in the HDD or a correctable error occurring in a storage area of the HDD.

Figure 52:
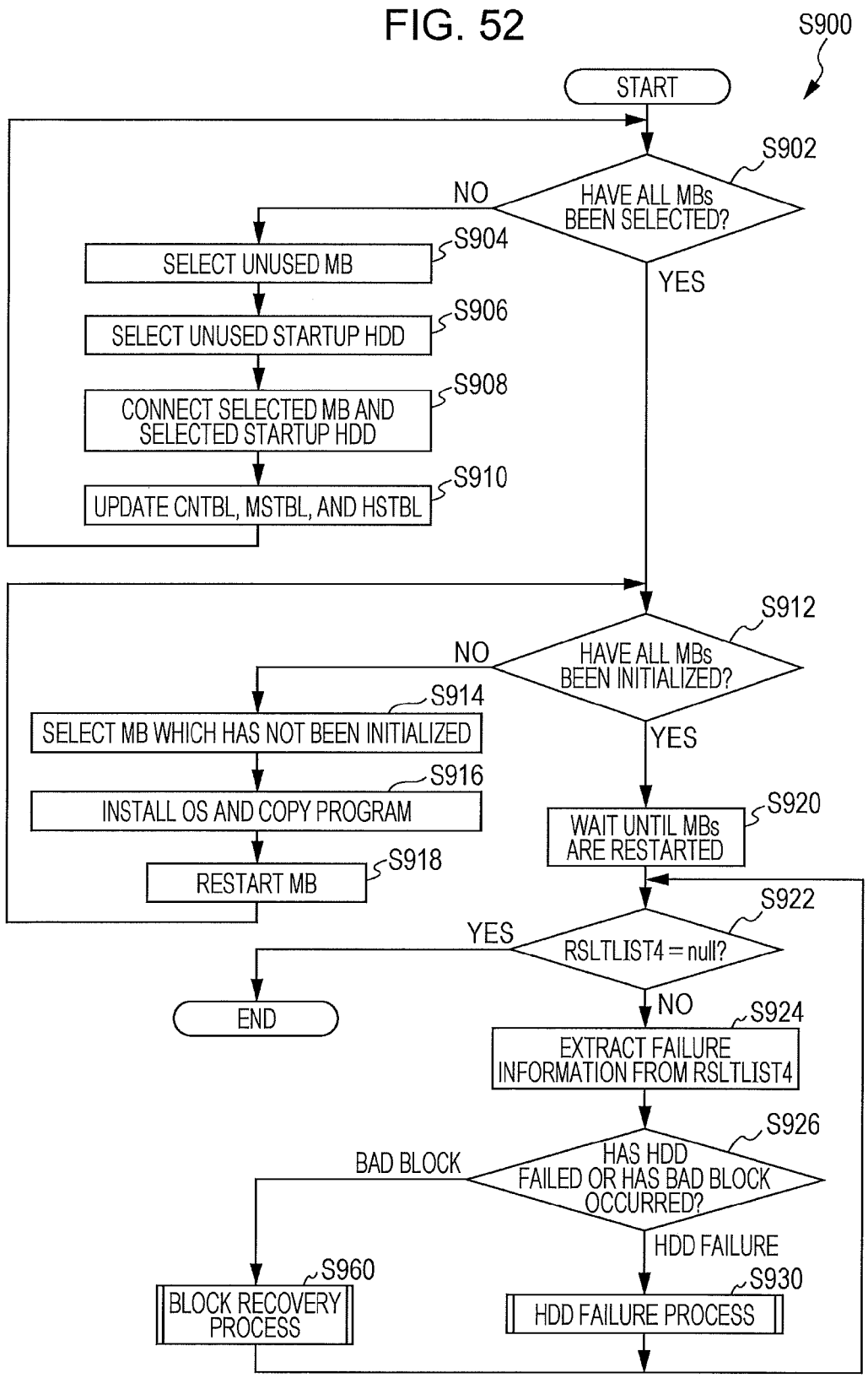
FIG. 52 illustrates an example of a copy process routine called by step S900 of FIG. 41.
Figure 53:
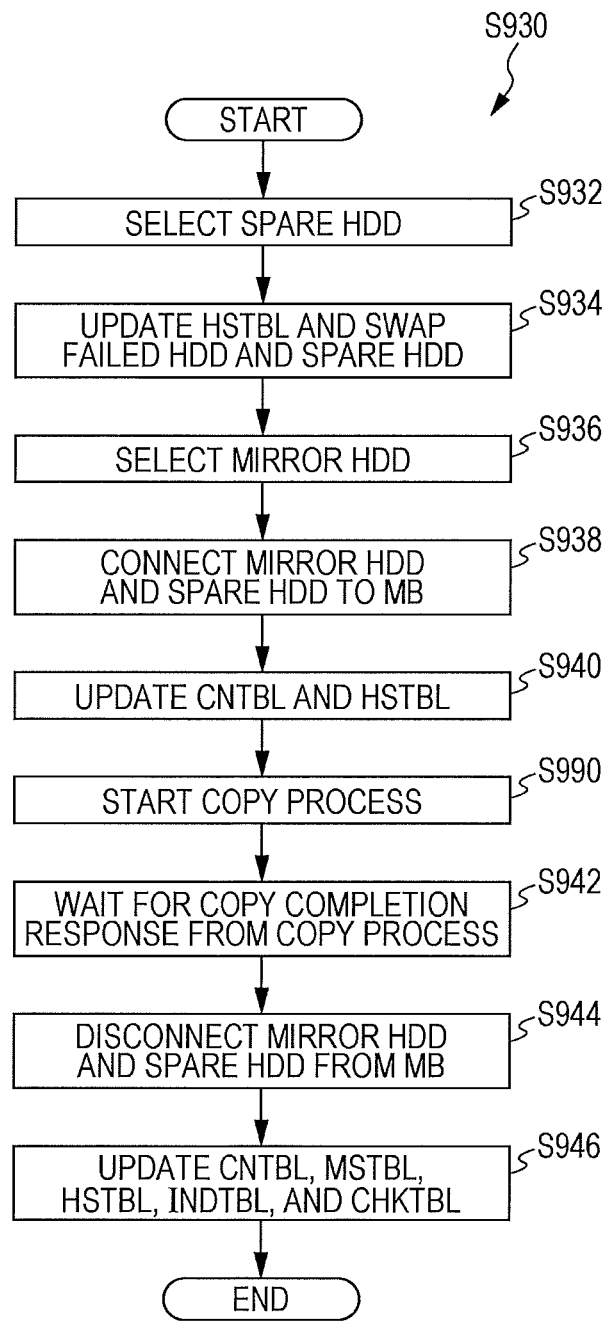
FIG. 53 illustrates an example of an HDD failure process routine called by step S930 of FIG. 52.
Figure 54:
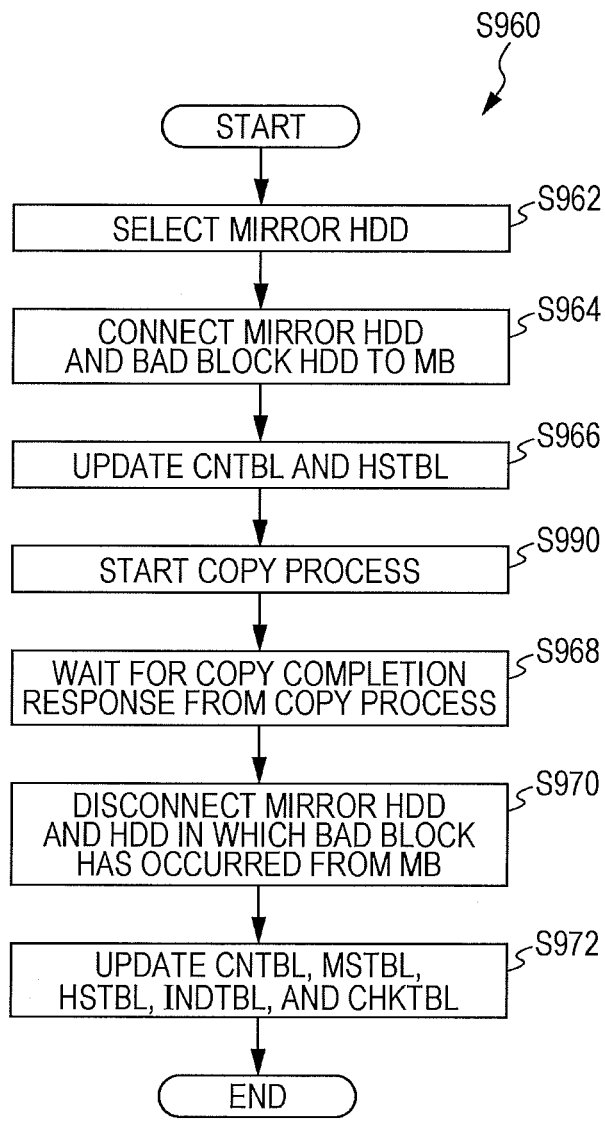
FIG. 54 illustrates an example of a block recovery process routine called by step S960 of FIG. 52.

In step S900, the check thread starts a copy process routine for recovering from an error, and then returns the process to step S430. An example of the copy process routine is illustrated in FIGS. 52, 53, and 54.

FIG. 42 illustrates an example of the HDD select routine called by step S430 of FIG. 41. The HDD select routine is executed by the CPU4 of the control device 400.

In step S432, as in step S402 of FIG. 41, the HDD select routine sets the number of motherboards MBs which have been started as check servers to be a variable N and sets the number of HDDs to be checked by each motherboard MB to be a variable M.

Then, in step S434, the HDD select routine initializes a list HDDLIST1 to be "null". In the list HDDLIST1, information concerning HDDs to be checked (for example, HDD numbers) is stored.

Then, in step S436, the HDD select routine determines whether HDDs which may be simultaneously checked are stored in the list HDDLIST1. The number of HDDs which may be simultaneously checked is represented by, for example, the product of the number N of started motherboards MBs and the number M of HDDs to be checked by each of the motherboards MBs. If all the HDDs to be checked are stored in the list HDDLIST1, the processing is terminated. If not all the HDDs to be checked are stored in the list HDDLIST1, the process proceeds to step S438.

In step S438, the HDD select routine selects a standby HDD which has not been checked for the longest time. Then, in step S440, the HDD select routine overwrites the list HDDLIST1 so as to add the HDD selected in step S438 to the list HDDLIST1. Then, in step S442, the HDD select routine updates the table CHKTBL illustrated in FIG. 7 and returns the process to step S436.

FIG. 43 illustrates an example of a check process start routine called by step S450 of FIG. 41. The check process start routine is executed by the CPU4 of the control device 400.

In step S452, the check process start routine determines whether check processes of N motherboards MBs have been started. If check processes of N motherboards MBs have been started, the processing is terminated. If not all check processes of N motherboards MBs have not been started, the process proceeds to step S454.

In step S454, the check process start routine selects one of motherboards MBs which have not been started. Then, in step S456, the check process start routine extracts items of information concerning M HDDs from among items of information stored in the list HDDLIST1.

Figure 45:
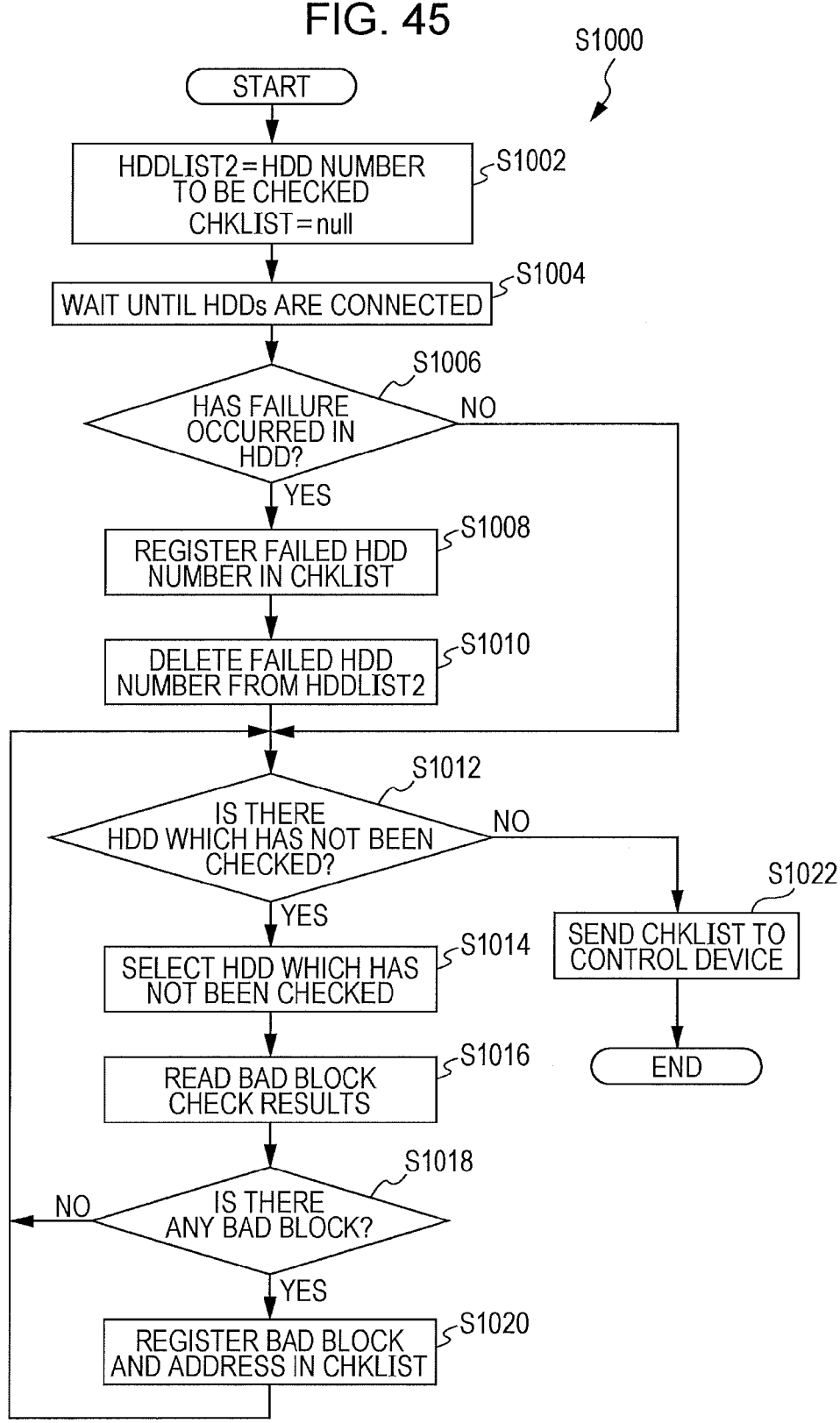
FIG. 45 illustrates an example of a check process start routine started in step S1000 of FIG. 43.

Then, in step S458, the check process start routine connects the selected motherboard MB and M HDDs extracted from the list HDDLIST1. Then, in step S460, the check process start routine updates the tables CNTBL, HSTBL, and CHKTBL. Examples of the updated tables TBLs are illustrated in FIG. 40. Then, in step S1000, the check process start routine starts the check process of the motherboard MB selected in step S454, and returns the process to step S452. An example of the check process is illustrated in FIG. 45.

FIG. 44 illustrates an example of the check result receive routine called by step S470 of FIG. 41. The check result receive routine is executed by the CPU4 of the control device 400.

In step S472, the check result receive routine initializes a list RSLTLIST4 to be "null". In the list RLSTLIST4, for example, check results or addresses of storage areas in which check results are stored are stored.

Then, in step S474, the check result receive routine determines whether check results have been received from all the motherboards MBs which are operating as check servers. If check results have been received, the processing is terminated. If check results have not been received from all the motherboards MBs, the process proceeds to step S476.

In step S476, the check result receive routine determines whether check results of M HDDs have been received from one of the motherboards MBs operating as check servers. If check results have been received, the process proceeds to step S478. If check results have not been received, the process returns to step S474. That is, in step S476, the check result receive routine waits until check results have been received.

In step S478, the check result receive routine adds check results in the list RSLTIST4. Then, in step S480, the check result receive routine controls the connecting device 300 so that the M HDDs may be disconnected from the motherboard MB which has output the check results.

Then, in step S482, the check result receive routine updates the tables CNTBL and HSTBL so as to reflect the disconnected HDDs in the tables, and then returns to step S474.

FIG. 45 illustrates an example of the check process start routine started in step S1000 of FIG. 43.

In step S1002, the check process receives HDD numbers to be checked from the check thread through, for example, a command line, and registers the received HDD numbers in a list HDDLIST2. The check process also initializes a check list CHKLIST in which check results are stored to be "null".

Then, in step S1004, the check process waits until HDDs to be checked are connected to the motherboard MB. Then, in step S1006, the check process determines whether the HDDs connected to the motherboard MB are accessible. If the HDDs are accessible, it means that a failure has not occurred in the HDDs, and the process proceeds to step S1012. If an access error has occurred, it means that a failure has occurred in an HDD, and thus, the process proceeds to step S1008. An access error is recognized, for example, when an error has occurred during at least one of write access and read access into and from a plurality of storage areas of an HDD.

In step S1008, the check process registers the failed HDD number in the check list CHKLIST. Then, in step S1010, the check process deletes the failed HDD number from the list HDDLIST2 received from the check thread.

In step S1012, the check process determines whether there is any HDD which has not been checked. If there is any HDD which has not been checked, the process proceeds to step S1014. If all the HDDs have been checked, the process proceeds to step S1022.

In step S1014, the check process selects an HDD which has not been checked. Then, in step S1016, the check process accesses the HDD and reads check results concerning bad blocks. The bad block is a block, which forms a storage area of an HDD, in which an error has occurred during data reading or data writing. The bad block may be disabled by replacing it by another block, thereby making it possible to correct an error. Bad blocks may be checked for by using, for example, a media check function of an HDD.

Then, in step S1018, the check process determines, on the basis of check results concerning bad blocks, whether there is a bad block. If there is a bad block, the process proceeds to step S1020. If there is no bad block, the process returns to step S1012. In step S1020, the check process registers, together with the HDD number, the detected bad block and the address of the bad block in the check list CHKLIST. The process then returns to step S1012.

If it is found in step S1012 that all the HDDs have been checked, the process proceeds to step S1022. In step S1022, the check process sends the content of the check list CHKLIST to the check thread executed by the controller 400. The check process is then terminated.

Figure 46:
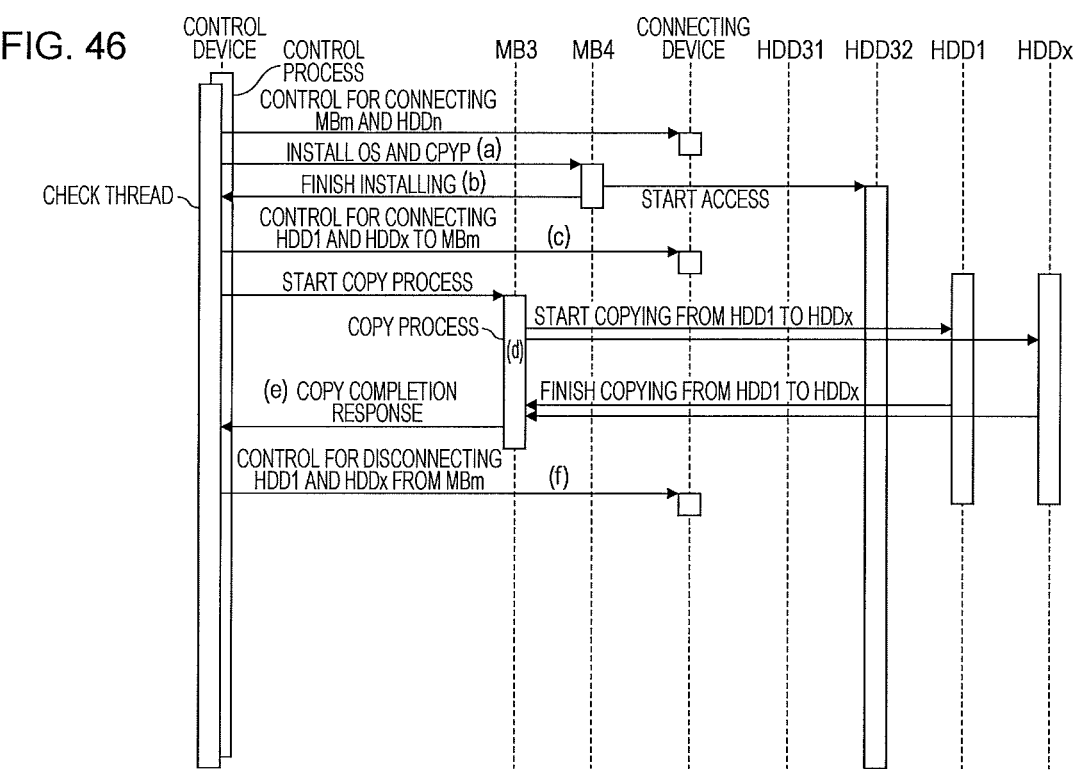
FIG. 46 illustrates an example of a sequence of a copy operation executed by the information processing system illustrated in FIG. 5.

FIG. 46 illustrates an example of a sequence of a copy operation executed by the information processing system SYS illustrated in FIG. 5. That is, FIG. 46 illustrates an example of a sequence concerning the information processing system SYS which operates as a copying device for HDD data. The sequence of a copy operation is executed when a failure of an HDD has been detected or when a bad block of an HDD has been detected in the check thread illustrated in FIG. 41. In the following description, the operation performed by the control device 400 illustrated in FIG. 7 includes an operation performed by the CPU4 of the control device 400, and the operation performed by the motherboards MBs includes an operation performed by the CPUs of the motherboards MBs.

The copy operation is performed by operating a plurality of motherboards MBs as copy servers for copying data into HDDs. However, for the sake of simple representation, in FIG. 46, a copy operation performed by only one motherboard MBm (m is a positive integer) is illustrated.

As in FIG. 38, the check thread controls the connecting device 300 so that the motherboard MBm and the HDDn may be connected to each other. After the motherboard MBm and the HDDn have been connected, as in FIG. 38, the check thread installs an OS and a program, such as a copy program CPYP, into the HDDn through the use of the motherboard MBm ((a) of FIG. 46).

After installing the OS and the copy program CPYP into the HDDn, the check thread restarts the motherboard MBm. The CPU of the motherboard MBm executes the OS and starts to access the HDDn. The motherboard MBm also sends an installation completion response indicating that installation has been completed to the check thread ((b) of FIG. 46).

Upon receiving an installation completion response, the check thread controls the connecting device 300 so that the motherboard MBm may be connected to an HDD (for example, HDD1) which forms a mirroring pair with an HDD in which a failure has occurred and also to an HDDx ((c) of FIG. 46). The HDDx is an HDD which will replace a failed HDD or a failed HDD (for example, an HDD which forms a mirroring pair with HDD1).

Then, the check thread outputs an instruction to start a copy process to the motherboard MBm. The motherboard MBm starts the copy process in response to this instruction ((d) of FIG. 46). The copy process executes processing for copying data retained in the HDD1 into HDDx. The HDDx is, for example, a spare unused HDD which may be used when a failure of an HDD is detected by the check thread. Alternatively, the HDDx is, for example, an HDD having a bad block detected by the check thread.

After a copy operation has been executed, the copy process sends a copy completion response indicating that a copy operation has been completed to the check thread ((e) of FIG. 46). Upon receiving the copy completion response, the check thread controls the connecting device 300 so that the HDD1 and HDDx may be disconnected from the motherboard MBm ((f) of FIG. 46).

Figure 47:
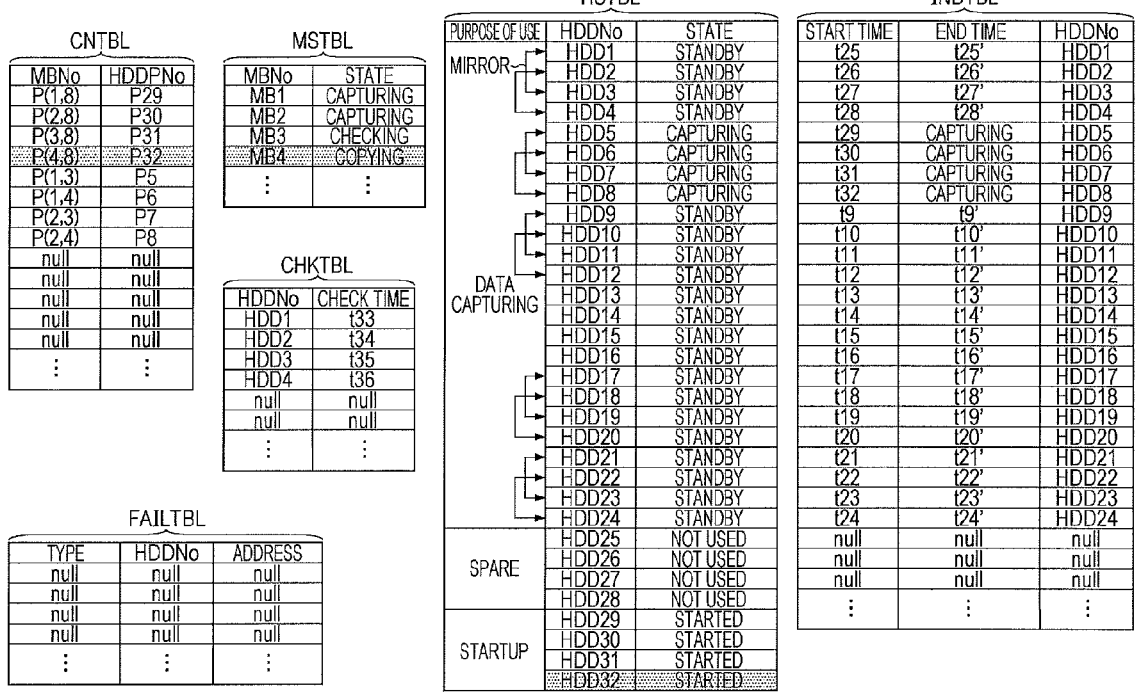
FIG. 47 illustrates an example of the states of the tables when a copy process illustrated in FIG. 46 is started.

FIG. 47 illustrates an example of the states of the tables TBLs when the copy process illustrated in FIG. 46 is started. In FIG. 47, shaded areas are portions which have changed when the copy process was started. The tables MBTBL and HDDTBL illustrated in FIG. 8 have not changed, and thus, an illustration of these tables is omitted in FIG. 47. In the table HSTBL, the arrows with "mirror" indicate that the same data is redundantly retained, as in FIG. 39. In this example, the motherboard MBm illustrated in FIG. 46 is the motherboard MB4 and the HDDn is the HDD32.

In this example, as illustrated in FIG. 46, before starting the copy process, the check thread connects the motherboard MB4 and the HDD32 and installs the copy program CPYP into the motherboard MB4. Accordingly, the check thread adds information indicating the connection between the motherboard MB4 and the HDD32 to the table CNTBL. The check thread also sets the state of the motherboard MB4 in the table MSTBL to be "copying" and the state of the HDD32 in the table HSTBL to "started".

Figure 48:
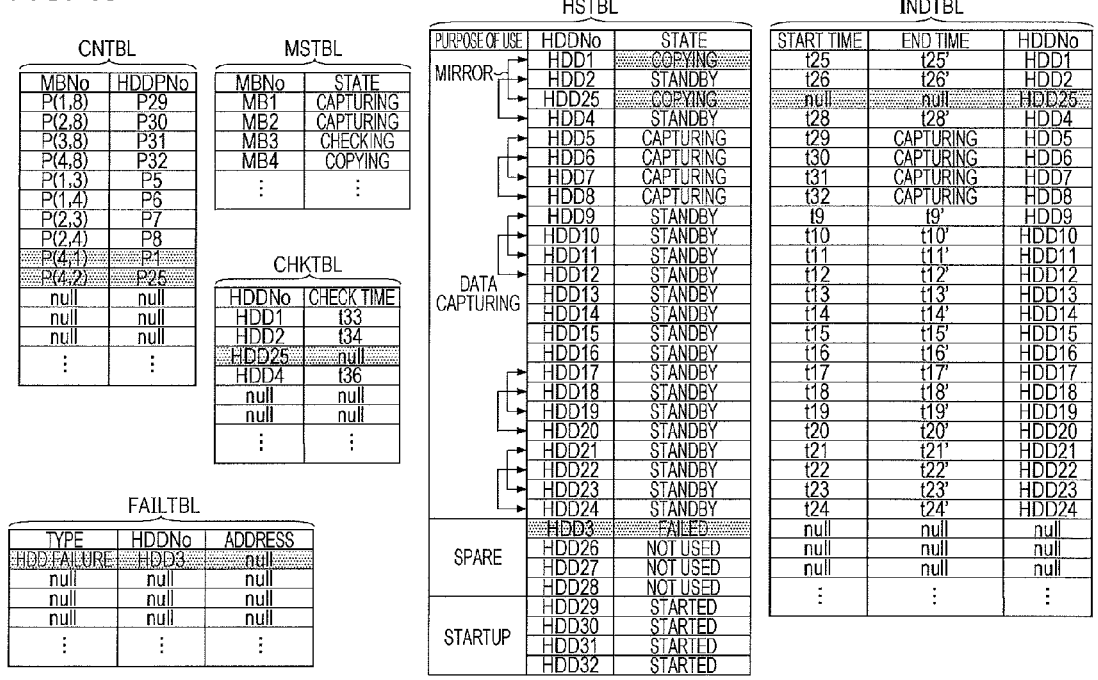
FIG. 48 illustrates an example of the states of the tables when the copy process illustrated in FIG. 46 is being executed.

FIG. 48 illustrates an example of the states of the tables TBLs when the copy process illustrated in FIG. 46 is being executed. In FIG. 48, shaded areas are portions of the tables TBLs in which the states have changed from the states illustrated in FIG. 47. The tables MBTBL and HDDTBL illustrated in FIG. 8 have not changed, and thus, an illustration of these tables is omitted in FIG. 48.

In this example, a failure of the HDD3 is detected by the check process illustrated in FIG. 38, and data stored in the HDD1, which forms a mirroring pair with the HDD3, is copied into the spare HDD25.

The check thread connects the motherboard MB4 that will execute the copy program CPYP to the HDD1 and HDD25 that performs a copy operation. Accordingly, the check thread adds information indicating the connection between the motherboard MB4 and the HDD1 and HDD25 to the table CNTBL. The check thread also changes the purpose of use of the HDD25 in the table HSTBL from "spare" to "data capturing" and changes that of the HDD3 from "data capturing" to "spare". The check thread also changes the states of the HDD1 and HDD25 in the table HSTBL to "copying" and the state of the HDD3 to "failed".

The check thread also replaces the record (line) of the table INDTBL in which the HDD3 is registered by that in which the HDD25 is registered (the start time and the end time are initialized to be "null"). The check thread also replaces the record (line) of the table CHKTBL in which the HDD3 is registered by that in which the HDD25 is registered (the check time is initialized to be "null"). The check thread also registers in the table FAILTBL information indicating a failure of the HDD3 (HDD failure). The other states of the tables TBLs are the same as those of FIG. 47.

FIG. 49 illustrates an example of the states of the tables TBLs after the copy process illustrated in FIG. 46 has been executed. In FIG. 49, shaded areas are portions of the tables TBLs in which the states have changed from the states illustrated in FIG. 48. The tables MBTBL and HDDTBL illustrated in FIG. 8 have not changed, and thus, an illustration of these tables is omitted in FIG. 49. In this example, by executing the copy process, the HDD25 which has replaced the HDD3 is set to be a state in which it may perform a data capturing operation.

Upon completing the copy process, the check thread deletes information indicating the connection between the motherboard MB4 and the HDD1 and HDD25 from the table CNTBL, and sets the state of the motherboard MB4 in the table MSTBL to be "not used". The check thread also changes the states of the HDD1 and HDD25 in the table HSTBL from "copying" illustrated in FIG. 48 to "standby", and the state of the HDD32 from "started" illustrated in FIG. 48 to "not used". The check thread also changes the check time of the HDD1 and HDD25 in the table CHKTBL to t37, which is a time at which the copy operation was finished. The check thread also sets the start time and the end time of the record (line) of the table INDTBL in which the HDD25 is registered to be t25 and t25', which are the same as those of HDD1.

Figure 50:
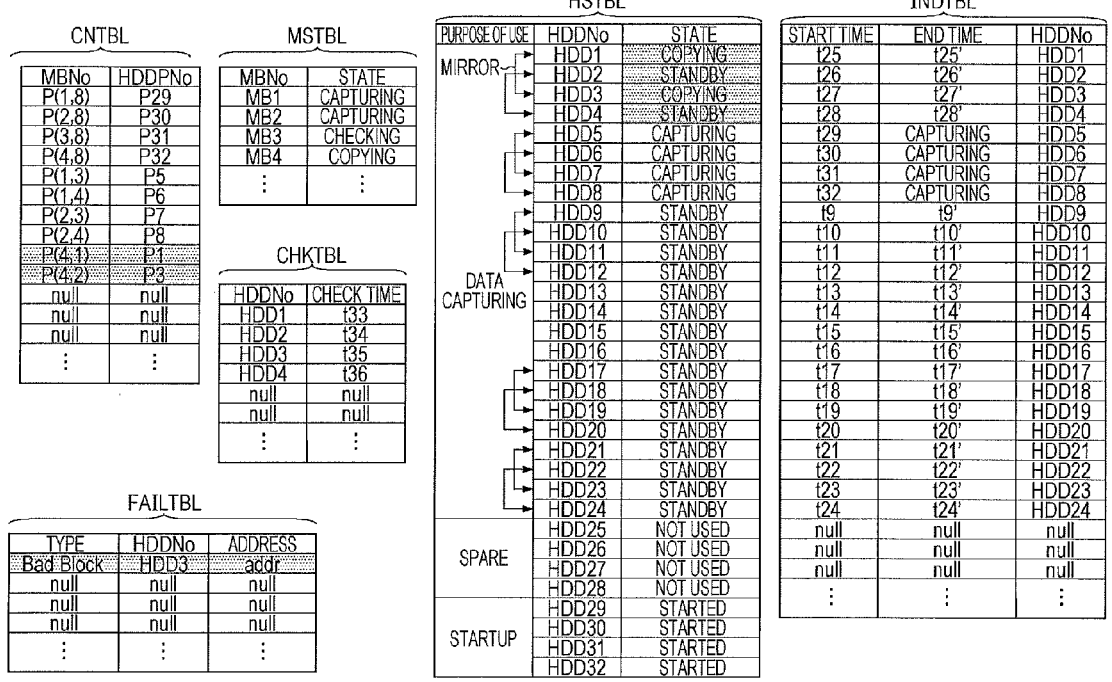
FIG. 50 illustrates another example of the states of the tables when the copy process illustrated in FIG. 46 is being executed.

FIG. 50 illustrates another example of the states of the tables TBLs when the copy process illustrated in FIG. 46 is being executed. In FIG. 50, shaded areas are portions of the tables TBLs in which the states have changed from the states illustrated in FIG. 47. The tables MBTBL and HDDTBL illustrated in FIG. 8 have not changed, and thus, an illustration of these tables is omitted in FIG. 50.

In this example, a bad block of the HDD3 is detected by the check process illustrated in FIG. 38, and the HDD3 and the HDD1, which forms a mirroring pair with the HDD3, are connected to the motherboard MB4. Then, data stored in the HDD1 is copied into the HDD3, thereby recovering data stored in the bad block. A detailed explanation of operations similar to those indicated by the tables TBLs FIG. 48 will be omitted.

As in FIG. 48, the check process adds information indicating the connection between the motherboard MB4 and the HDD1 and HDD3 to the table CNTBL, and sets the states of the HDD1 and HDD3 in the table HSTBL to be "copying". The check thread also registers information (Bad Block) indicating the occurrence of a bad block in the HDD3 in the table FAILTBL, together with an address "addr" of the bad block.

FIG. 51 illustrates another example of the states of the tables TBLs after the copy process illustrated in FIG. 46 has been executed. In FIG. 51, shaded areas are portions of the tables TBLs in which the states have changed from the states illustrated in FIG. 50. The tables MBTBL and HDDTBL illustrated in FIG. 8 have not changed, and thus, an illustration of these tables is omitted in FIG. 51.

In this example, by executing the copy process, the HDD3, in which data of a bad block has been recovered from, is set, together with the HDD1, to be the standby state in which a data capturing operation may be performed. Since the HDD3, which is registered in the table FAILTBL, is restored, the first line of the table FAILTBL is set to be "null". A detailed explanation of operations similar to those indicated by the tables TBLs FIG. 49 will be omitted.

Upon completing the copy process, the check thread deletes information indicating the connection between the motherboard MB4 and the HDD1 and HDD3 from the table CNTBL, and sets the state of the motherboard MB4 in the table MSTBL to be "not used". The check thread also changes the states of the HDD1 and HDD3 in the table HSTBL from "copying" illustrated in FIG. 50 to "standby", and changes the state of the HDD32 from "started" illustrated in FIG. 50 to "not used".

FIG. 52 illustrates an example of the copy process routine called by step S900 of FIG. 41. The copy process routine is implemented by executing the control program by the CPU4 of the control device 400.

In step S902, the copy process routine determines whether a specified number of motherboard MBs have been selected. If a specified number of motherboards MBs have been selected, the process proceeds to step S912. If not all the specified number of motherboards MBs have been selected, the process proceeds to step S904. The number of motherboards MBs may be determined by the control process in advance, or may be received by the console CNSL, together with a capture start instruction illustrated in FIG. 9.

Then, in step S904, the copy process routine refers to the table MSTBL and selects one of unused motherboards MBs. Then, in step S906, the copy process routine refers to the table HSTBL and selects an unused startup HDD.

Then, in step S908, the copy process routine controls the connecting device 300 so that the selected motherboard MB and the selected startup HDD may be connected to each other. Then, in step S910, the copy process routine updates the tables CNTBL, MSTBL, and HSTBL. Examples of the updated tables TBLs are illustrated in FIG. 47. The copy process routine then repeats steps S904, S906, S908, and S910 until all the motherboards MBs which will perform a copy operation have been selected.

If it is found in step S902 that all the motherboards MBs have been selected, the copy process routine installs the OS and the copy program CPYP into each of the M motherboards MBs in steps S912 through S918. Steps S912 through S920 are similar to steps S214 through S222, respectively, illustrated in FIG. 17, except that the program to be installed is different, and thus, an explanation thereof will be omitted.

Then, in step S922, the copy process routine determines whether the list RSLTLIST4 in which information concerning errors in HDDs is stored indicates "null". If the list RSLTLIST4 indicates "null", it means that there is no HDD in which an error has occurred, and thus, the copy process routine is terminated. If the list RSLTLIST4 does not indicate "null", it means that there is an HDD in which an error has occurred, and thus, the process proceeds to step S924.

Then, in step S924, the copy process routine extracts HDD failure information. In step S926, the copy process routine determines whether an HDD has failed or whether a bad block has occurred in an HDD. If an HDD has failed, the process proceeds to step S930. If a back block has occurred in an HDD, the process proceeds to step S960.

In step S930, the copy process routine starts an HDD failure process routine. In step S960, the copy process routine starts a block recovery process routine. An example of the HDD failure process routine is illustrated in FIG. 53. An example of the block recovery process routine is illustrated in FIG. 54. After step S930 or S960, the process returns to step S922.

FIG. 53 illustrates an example of the HDD failure process routine called by step S930 of FIG. 52. The HDD failure process routine is implemented by executing the control program by the CPU4 of the control device 400.

In step S932, the HDD failure process routine refers to the field of "spare" of the table HSTBL and selects an unused spare HDD which will replace a failed HDD. Then, in step S934, the HDD failure process routine updates the table HSTBL so that the failed HDD number stored in the field of "data capturing" may be replaced by the spare HDD number and so that the failed HDD number may be stored in the field of "spare". After step S934, the spare HDD and the failed HDD have been swapped.

Then, in step S936, the HDD failure process routine selects a mirror HDD which forms a mirroring pair with the failed HDD. Then, in step S938, the HDD failure process routine controls the connecting device 300 so that the mirror HDD and the spare HDD may be connected to the motherboard MB which will perform a copy operation. Then, in step S940, the HDD failure process routine updates the table CNTBL so as to reflect the connection between the motherboard MB and the HDDs, and sets the states of the HDDs which will be subjected to a copy process in the table HSTBL to be "copying". Examples of the states of the updated table TBLs are illustrated in FIG. 48.

In step S990, the HDD failure process routine starts the copy process. An example of the copy process is illustrated in FIG. 55. Then, in step S942, the HDD failure process routine waits for a copy completion response from the copy process. Then, in step S944, upon receiving a copy completion response, the HDD failure process routine controls the connecting device 300 so that the mirror HDD and the spare HDD may be disconnected from the motherboard MB which has executed a copy operation.

In step S946, the HDD failure process routine updates the tables CNTBL, MSTBL, HSTBL, INDTBL, and CHKTBL. Examples of the updated tables TBLs are illustrated in FIG. 49. The HDD failure process routine is then terminated.

FIG. 54 illustrates an example of the block recovery process routine called by step S960 of FIG. 52. The block recovery process routine is implemented by executing the control program by the CPU4 of the control device 400.

In step S962, the block recovery process routine selects a mirror HDD which forms a mirroring pair with an HDD in which a bad block has been detected. Then, in step S964, the block recovery process routine controls the control device 300 so that the mirror HDD and the HDD in which a bad block has been detected may be connected to a motherboard MB which will execute a copy operation. Then, in step S966, the block recovery process routine updates the tables CNTBL and HSTBL. Examples of the updated tables TBL are illustrated in FIG. 50.

Then, in step S990, the block recovery process routine starts the copy process. An example of the copy process is illustrated in FIG. 55. Then, in step S968, the block recovery process routine waits for a copy completion response from the copy process. Then, in step S970, upon receiving a copy completion response, the block recovery process routine controls the control device 300 so that the mirror HDD and the HDD in which a bad block has occurred may be disconnected from the motherboard MB which has executed a copy operation.

Then, in step S972, the block recovery process routine updates the tables CNTBL, MSTBL, HSTBL, INDTBL, and CHKTBL. Examples of the updated tables TBL are illustrated in FIG. 51. The block recovery process routine is then terminated.

FIG. 55 illustrates an example of the copy process started in step S990 illustrated in FIGS. 53 and 54. The copy process is implemented by executing the copy program CPYP by the CPU of the motherboard MB.

In step S992, the copy process waits until HDDs are connected to the motherboard MB in step S938 of FIG. 53 or step S964 of FIG. 54.

Then, in step S994, the copy process obtains, through, for example, a command line, the mirror HDD number, which is a copy source number, the HDD number, which is a copy destination number, and a copy range within which data will be copied. The copy destination is a spare HDD or an HDD in which a bad block has occurred.

Then, in step S996, the copy process executes a copy operation. Then, in step S998, the copy process sends a copy completion response indicating that a copy operation has been completed to the check thread.

As in the embodiment illustrated in FIGS. 1 through 4C, by preforming a data capturing operation while sequentially switching HDDs which will be connected to the motherboards MB1 and MB2, it is possible to stably write data into selected HDDs without being influenced by the other HDDs. Since the motherboards MB1 and MB2 do not perform a search operation or a check operation, they are able to continuously perform a checking operation, thereby suppressing a decrease in the data writing rate, which would be caused by the interrupt of a search operation or a check operation.

The motherboard MB3 which executes a search operation is operated independently of the motherboard MB1 that executes a data capturing operation, and thus, it is able to search for data without being interrupted by the data capturing operation. The motherboard MB4 which executes a check operation is operated independently of the motherboard MB1 that executes a data capturing operation, and thus, it is able to check data without being interrupted by the data capturing operation.

In the data capturing operation, under the control of the control device 400, when the write address has exceeded the threshold VT1, processing for connecting a new HDD is started. Thus, a motherboard MB is able to write captured data into HDDs without causing the loss of data even while the HDDs are being switched.

Under the control of the control device 400, by interrupting the supply of power to standby HDDs which retain data obtained by a data capturing operation, it is possible to store data in HDDs without causing the loss of data while implementing a reduction in the power consumption. By interrupting the supply of power to motherboards MBs and HDDs which do not perform a search operation or a check operation, it is possible to reduce the power consumption of the information processing system SYS, unlike a case in which power is supplied to such MBs and HDDs. Even in this case, HDDs to which the supply of power is cut still retain an OS and a program therein, and thus, it is possible to execute a search operation or a check operation by restarting an associated motherboard MB.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing system comprising:
a plurality of processors;
a plurality of memory devices;
a connecting device that connects each of the plurality of processors to at least one of the plurality of memory devices; and
a control device that controls the plurality of processors and the connecting device, wherein
a first processor, among the plurality of processors, is configured to:
write data into a first memory device, among the plurality of memory devices, and
transmit a connection request for requesting the control device to connect a second memory, among the plurality of memory devices, with the first processor when it is determined that an amount of data stored in the first memory device exceeds a predetermined threshold,
the control device is configured to control the connecting device to connect the second memory device with the first processor when the connection request is received,
the first processor is configured transmit a disconnection request for requesting the control device to disconnect a connection between the first memory device and the first processor when the first processor starts writing data into the second memory device,
the control device is configured to control the connecting device to disconnect the connection between the first memory device and the first processor when the disconnection
request is received, and
the controller device is configured to select a memory device, from among the plurality of memory devices, in which an oldest data is stored, when the connection request is received and it is determined that an unused memory device in which data are not stored does not exist in the plurality of memory devices and to connect the first processor with the selected memory device.

2. The information processing system according to claim 1, wherein
the control device causes the first memory device to perform an installation of a program for executing writing data into the first memory device before starting writing data into the first memory device by the first processor; and
the first processor transmits an installation completion response indicating that the installation of the program has been completed to the control device when the installation of the program has been completed.

3. The information processing system according to, claim 1, wherein the control device is configured to:
receive a search request for searching data stored in one of the plurality of memory devices, the search request including time information indicating a time when the data to be searched was generated;
specify a third memory device which stores information corresponding to the time information from among the plurality of memory devices; and
control the connecting device to connect the third memory device with a second processor among the plurality of processors while maintaining a connection between the first processor and the second memory device,
the second processor is configured to:
search for data stored in the third memory device; and
inform the control device of a search result related to the data stored in the third memory device, and
the control device is configured to control the connecting device to disconnect the connection between the third memory device and the second processor.

4. The information processing system according to claim 3, wherein
the control device includes a storage device configured to store information corresponding to the time information; and
the control device is configured to specify the third memory device by referring to the information stored in the storage device.

5. The information processing system according to claim 3, wherein the control device is configured to:
control the connecting device to connect the third memory device with the first processor, when it is determined that the second memory device stores information corresponding to the time information while maintaining the connection between first processor and the second memory device; and
control the connecting device to disconnect the connection between the first processor and the second memory device.

6. The information processing system according to claim 3, wherein the control device causes the third memory device to perform an installation of a program for searching data stored in the third memory device before starting searching of the data stored in the third memory device by the second processor.

7. The information processing system according to claim 1, wherein:
the first processor redundantly writes data into a plurality of the first memory devices;
the control device controls the connecting device so that a fourth memory device, which is one of the plurality of first memory devices in which data is redundantly stored and which is not connected to the first processor, will be connected to a third processor, which is one of the plurality of processors;
the third processor checks the fourth memory device and informs the control device of a check result; and
when the check result indicates a failure in the fourth memory device, the control device controls the connecting device so that a fifth memory device, which is one of the plurality of memory devices, will be connected to the third processor, copies data which is redundantly stored in a sixth memory device as in the fourth memory device into the fifth memory device, and changes the allocation of the failed fourth memory device to the first processor to the allocation of the fifth memory device to the first processor.

8. The information processing system according to claim 7, wherein, when the check result indicates a correctable error, the data stored in the sixth memory device is copied into the fourth memory device in which an error has occurred.

9. The information processing system according to claim 7, wherein the control device performs checking by sequentially switching the memory devices to be connected to the third processor.

10. The information processing system according to claim 7, wherein, before checking one of the plurality of first memory devices, the control device connects one of the plurality of memory devices to the third processor and installs a program for checking the first memory device into the memory device connected to the third processor.

11. A control method for a control device which connects, via a connecting device, each of a plurality of processors that each executes processing to at least one of a plurality of memory devices that each stores data, the control method comprising:
controlling the connecting device to connect a second memory device among the plurality of memory devices with a first processor among the plurality of processors, when it is determined that an amount of data stored in a first memory device among the plurality of memory devices exceeded a predetermined threshold;
controlling the connecting device to disconnect a connection between the first memory device and the first processor when the first processor starts writing data into the second memory device; and
selecting, by the controller device, a memory device in which an oldest data is stored as the second memory device, when a connection request is received and it is determined that an unused memory device in which data are not stored does not exist in the plurality of memory devices.

12. A control method for an information processing system which includes a plurality of processors, a plurality of memory devices, a connecting device that connects each of the plurality of processors to at least one of the plurality of memory devices, and a control device that controls the plurality of processors and the connecting device, the control method comprising:
writing, by a first processor among the plurality of processors, data into a first memory device among the plurality of memory devices;
transmitting a connection request for requesting the control device to connect a second memory among the plurality of memory devices with the first processor when it is determined that an amount of data stored in the first memory device exceeded a predetermined threshold;

controlling, by the control device, the connecting device to connect the second memory device with the first processor when the connection request is received;

transmitting, by the first processor, a disconnect request for requesting the control device to disconnect a connection between the first memory device and the first processor when the first processor starts writing data into the second memory device;

controlling, by the control device, the connecting device to disconnect the connection between the first memory device and the first processor when the disconnection request is received; and selecting, by the controller device, a memory device in which an oldest data is stored as the second memory device, when a connection request is received and it is determined that an unused memory device in which data are not stored does not exist in the plurality of memory devices.

13. The control method according to claim 12, further comprising:

causing, by the control device, the first memory device to perform an installation of a program for executing writing data into the first memory device before starting writing data into the first memory device by the first processor; and transmitting, by the first processor, an installation completion response indicating that the installation of the program has been completed to the control device when the installation of the program has been completed.

14. The control method according to claim 12, further comprising:

receiving, by the control device, a search request for searching data stored in one of the plurality of memory devices, the search request including time information indicating a time when the data to be searched was generated;

specifying a third memory device which stores information corresponding to the time information from among the plurality of memory devices;

controlling the connecting device to connect the third memory device with a second processor among the plurality of processors while maintaining a connection between the first processor and the second memory device;

searching, by the second processor, for data stored in the third memory device;

informing the control device of a search result related to the data stored in the third memory device, and controlling, by the control device, the connecting device to disconnect the connection between the third memory device and the second processor.

15. The control method according to claim 14, wherein:

the control device includes a storage device configured to store information corresponding to the time information; and the specifying includes specifying the third memory device by referring to the information stored in the storage device.

16. The control method according to claim 14, further comprising:

controlling, by the control device, connecting device to connect the third memory device with the first processor, when it is determined that the second memory device stores information corresponding to the time information while maintaining the connection between first processor and the second memory device; and controlling the connecting device to disconnect the connection between the first processor and the second memory device.

17. The control method according to claim 12, further comprising causing, by the control device, the third memory device to perform an installation of a program for searching data stored in the third memory device before starting searching of the data stored in the third memory device by the second processor.

18. The control method according to claim 12, wherein:

the first processor redundantly writes data into a plurality of the first memory devices;

the control device controls the connecting device so that a fourth memory device, which is one of the plurality of first memory devices in which data is redundantly stored and which is not connected to the first processor, will be connected to a third processor, which is one of the plurality of processors;

the third processor checks the fourth memory device and informs the control device of a check result; and when the check result indicates a failure in the fourth memory device, the control device controls the connecting device so that a fifth memory device, which is one of the plurality of memory devices, will be connected to the third processor, copies data which is redundantly stored in a sixth memory device as in the fourth memory device into the fifth memory device, and changes the allocation of the failed fourth memory device to the first processor to the allocation of the fifth memory device to the first processor.

\* \* \* \* \*